(12) United States Patent
Ikeda et al.

(10) Patent No.: US 7,593,045 B2
(45) Date of Patent: Sep. 22, 2009

(54) DIGITAL CAMERA, IMAGE OUTPUT METHOD, AND PROGRAM FOR OUTPUTTING SELECTED IMAGE DATA

(75) Inventors: Shunichiro Ikeda, Yokohama (JP); Shinya Takeichi, Kawasaki (JP); Jun Fujisawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 621 days.

(21) Appl. No.: 11/009,603

(22) Filed: Dec. 13, 2004

(65) Prior Publication Data

US 2005/0134939 A1     Jun. 23, 2005

(30) Foreign Application Priority Data

Dec. 15, 2003   (JP) ............................. 2003-416723

(51) Int. Cl.
*H04N 5/262*     (2006.01)
*H04N 5/222*     (2006.01)

(52) U.S. Cl. .................................. 348/239; 348/333.05

(58) Field of Classification Search ............ 348/231.99, 348/231.2, 231.3, 231.6, 239, 333.05, 333.11, 348/333.12; 396/310, 311
See application file for complete search history.

(56) References Cited

U.S. PATENT DOCUMENTS

| | | | |
|---|---|---|---|
| 5,477,264 A * | 12/1995 | Sarbadhikari et al. | 348/231.6 |
| 6,229,566 B1 * | 5/2001 | Matsumoto et al. | 348/231.2 |
| 6,483,540 B1 | 11/2002 | Akasawa et al. | 348/239 |
| 6,504,960 B2 | 1/2003 | Takahashi | 382/305 |
| 6,727,909 B1 * | 4/2004 | Matsumura et al. | 345/629 |
| 7,054,508 B2 | 5/2006 | Hanamoto | 382/305 |
| 7,207,735 B2 | 4/2007 | Narusawa et al. | 400/76 |
| 2001/0035875 A1 * | 11/2001 | Suzuki et al. | 345/723 |
| 2001/0048802 A1 * | 12/2001 | Nakajima et al. | 386/46 |
| 2002/0006235 A1 | 1/2002 | Takahashi | 382/305 |
| 2002/0019833 A1 * | 2/2002 | Hanamoto | 707/500 |
| 2003/0234875 A1 * | 12/2003 | Miyata | 348/231.2 |
| 2004/0028290 A1 * | 2/2004 | Gamble | 382/284 |
| 2004/0032599 A1 * | 2/2004 | Atkins et al. | 358/1.9 |

FOREIGN PATENT DOCUMENTS

| | | |
|---|---|---|
| JP | 10-42194 | 2/1998 |
| JP | 10-55186 | 2/1998 |
| JP | 11-8818 | 1/1999 |
| JP | 11-8819 | 1/1999 |
| JP | 11-127323 | 5/1999 |
| JP | 2002-49907 | 2/2002 |
| JP | 2002-171436 | 6/2002 |
| JP | 2002-176615 | 6/2002 |
| JP | 2003-209809 | 7/2003 |
| WO | WO 03/085510 | 10/2003 |

* cited by examiner

*Primary Examiner*—Timothy J Henn
(74) *Attorney, Agent, or Firm*—Fitzpatrick, Cella, Harper & Scinto

(57) ABSTRACT

A digital camera according to this invention includes an image data memory unit which stores sensed image data, an output information memory unit which stores output information describing an image output method, an image data selector which selects designated image data as an output target from image data stored in the image data memory unit, and an output unit which outputs the image data selected by the image data selector in accordance with the output information stored in the output information memory unit.

15 Claims, 77 Drawing Sheets

FIG. 6

```
<?xml version="1.0" standalone="no"?>
<!DOCTYPE svg PUBLIC "-//W3C//DTD SVG 1.0//EN"
  "http://www.w3.org/TR/2001/REC-SVG-20010904/DTD/svg10.dtd">
<svg width="500" height="500">
  <image id="1" x="50" y="45" width="270" height="225" xlink:href="" />    ~601
  <image id="2" x="200" y="225" width="270" height="225" xlink:href="" />  ~602
</svg>
```

FIG. 9

| id | FILE NAME |
|---|---|
| 1 | 00012.jpg |
| 2 | 00005.jpg |
| 3 | |
| 4 | |

```
<?xml version="1.0" standalone="no"?>
<!DOCTYPE svg PUBLIC "-//W3C//DTD SVG 1.0//EN"
  "http://www.w3.org/TR/2001/REC-SVG-20010904/DTD/svg10.dtd">
<svg width="500" height="500">
<image id="1" x="50" y="45" width="270" height="225" xlink:href="00012.jpg" />
<image id="2" x="200" y="225" width="270" height="225" xlink:href="00005.jpg" />
</svg>
```

FIG. 16

```
<?xml version="1.0" standalone="no"?>
<!DOCTYPE svg PUBLIC "-//W3C//DTD SVG 1.0//EN"
 "http://www.w3.org/TR/2001/REC-SVG-20010904/DTD/svg10.dtd">
<svg width="500" height="500">
    <title> Party </title>
    <desc> 2 in 1 </desc>
    <rect x="10" y="10" width="480" height="480"
          fill="none" stroke="blue" stroke-width="30" />

<image id="1" x="250"  y="50"   width="200" height="160" xlink:href="" />
    <image id="2" x="50"   y="250"  width="200" height="160" xlink:href="" />
</svg>
```

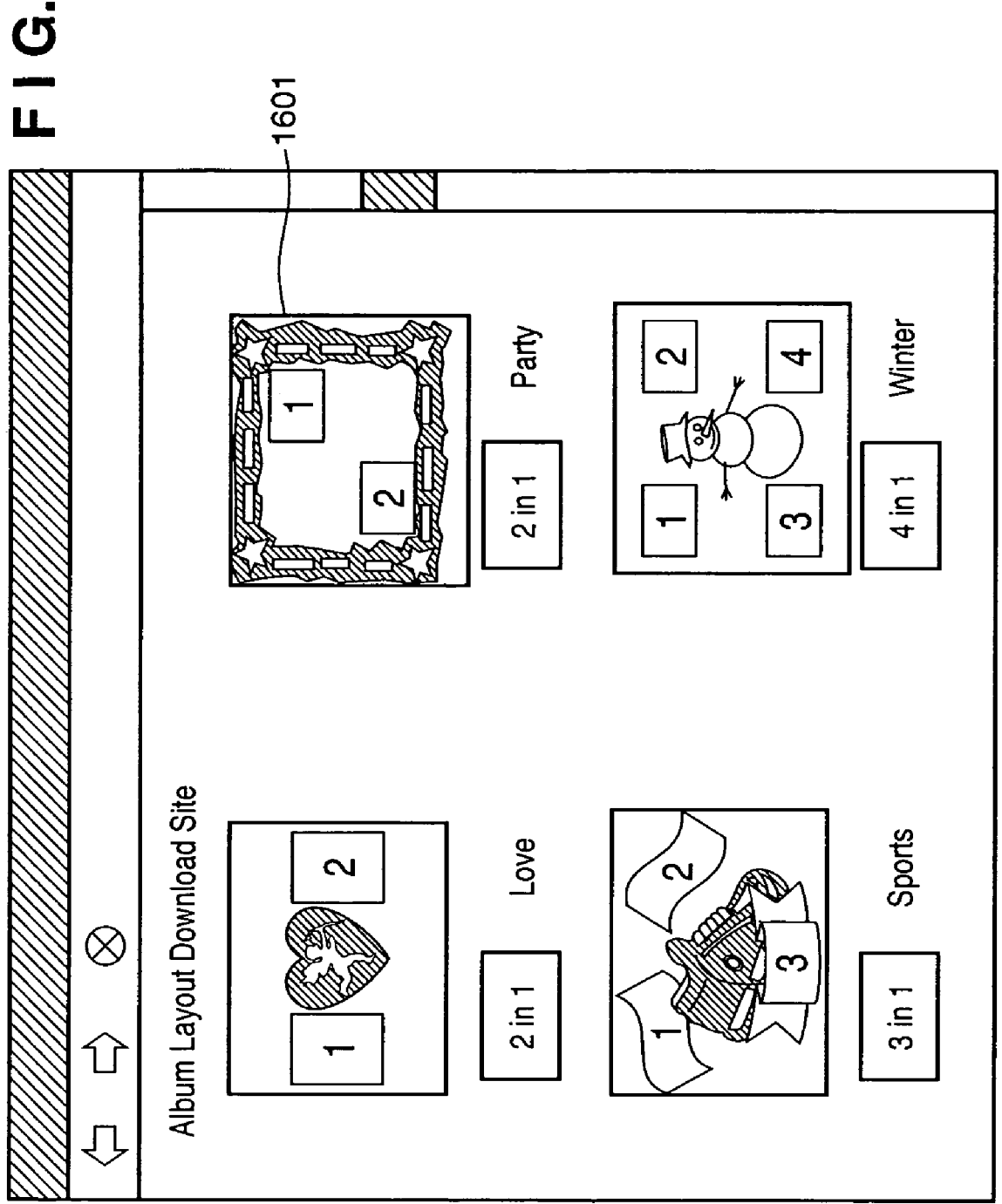

FIG. 21

| id | FILE NAME |
|---|---|
| 1 | ABC0002.jpg |
| 2 | ABC0004.jpg |
| 3 | |
| 4 | |

```
<?xml version="1.0" standalone="no"?>
<!DOCTYPE svg PUBLIC "-//W3C//DTD SVG 1.0//EN"
    "http://www.w3.org/TR/2001/REC-SVG-20010904/DTD/svg10.dtd">
<svg width="500" height="500">
    <title> Party </title>
    <desc> 2 in 1 </disc>
    <rect x="10" y="10" width="480" height="480"
          fill="none" stroke="blue" stroke-width="30" />

<image id="1" x="250" y="50"  width="200" height="160" xlink : href="ABC0002.jpg" />
    <image id="2" x="50"  y="250" width="200" height="160" xlink : href="ABC0004.jpg" />
</svg>
```

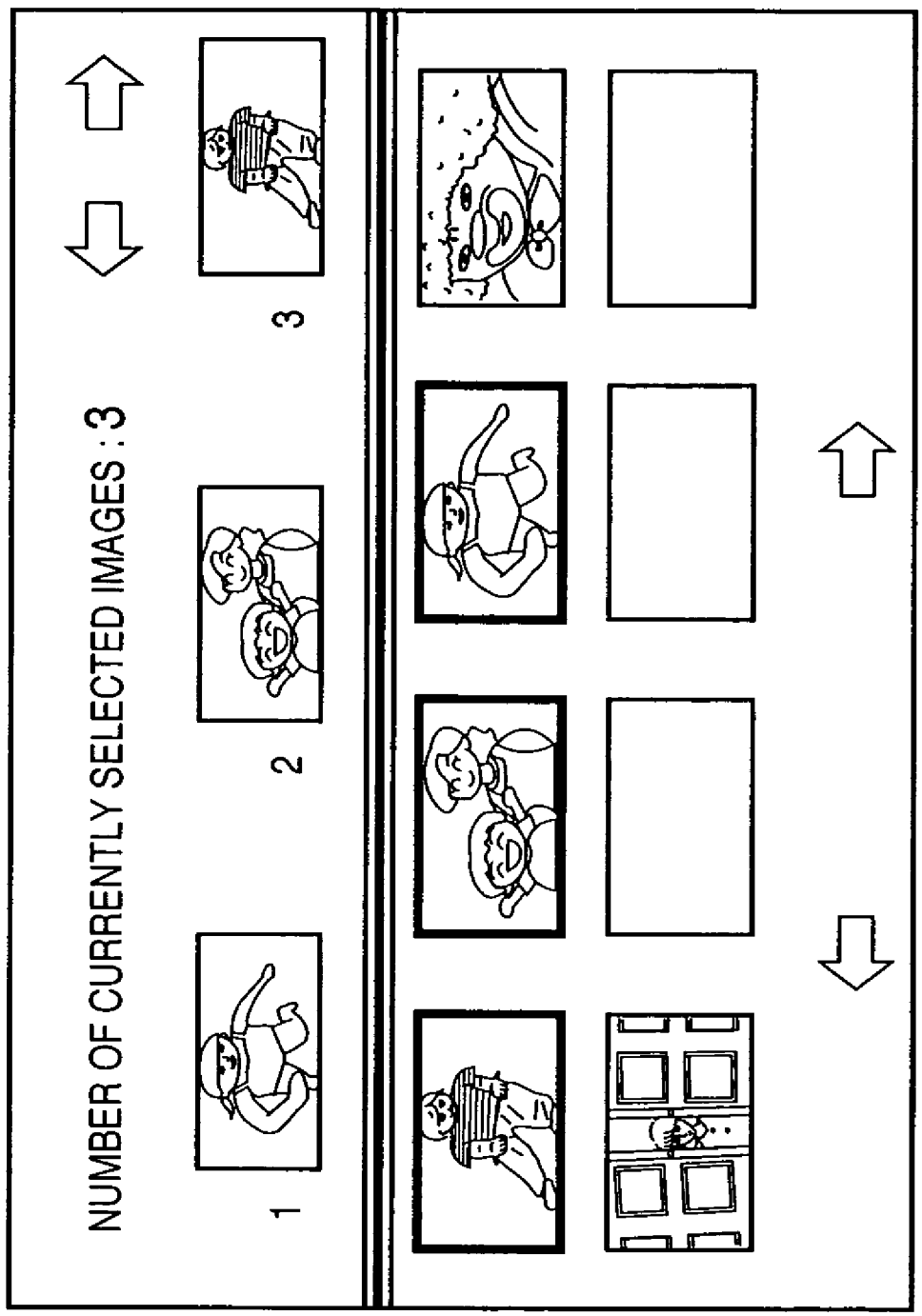

FIG. 30

```
<?xml version="1.0" standalone="no"?>
<!DOCTYPE svg PUBLIC "-//W3C//DTD SVG 1.0//EN"
          "http://www.w3.org/TR/2001/REC-SVG-20010904/DTD/svg10.dtd">
<svg width="500" height="500">
        <image id= "1" x= "0" y= "0"  width="240" height="160"
                xlink : href="">
        </image>
        <image id= "2" x= "0" y= "0"  width="240" height="160"
                xlink : href=""
                transform="translate(-240 0)">
                <animateTransform begin="2s" dur="1s" repeatCount="1"
                        attributeName="transform" attributeType="XML"
                        type="translate" fill="freeze"
                        values="0, 0 ; 240, 0" additive="sum"/>
        </image>
        <image id= "3" x= "0" y= "0"  width="240" height="160"
                xlink : href=""
                transform="translate(-240 0)">
                <animateTransform begin="3s" dur="1s" repeatCount="1"
                        attributeName="transform" attributeType="XML"
                        type="translate" fill="freeze"
                        values="0, 0 ; 240, 0" additive="sum"/>
        </image>
</svg>
```

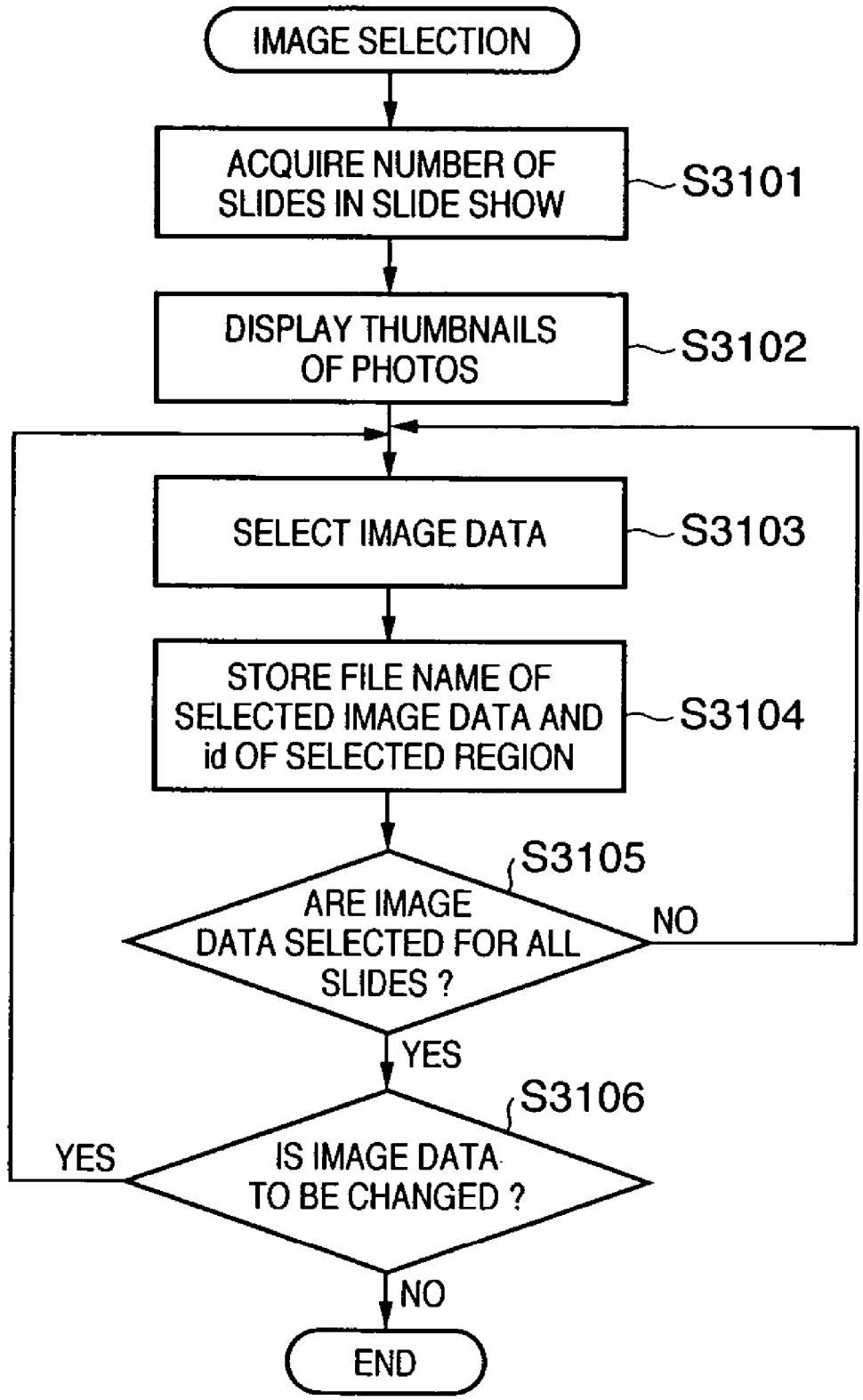

FIG. 35

```
<?xml version="1.0" standalone="no"?>
<!DOCTYPE svg PUBLIC "-//W3C//DTD SVG 1.0//EN"
          "http://www.w3.org/TR/2001/REC-SVG-20010904/DTD/svg10.dtd">
<svg width="500" height="500">
          <image id= "1" x= "0" y= "0"  width="240" height="160"
                    xlink : href="00012. jpg">
          </image>
          <image id= "2" x= "0" y= "0"  width="240" height="160"
                    xlink : href="00005. jpg"
                    transform="translate(-240 0)">
                    <animateTransform begin="2s" dur="1s" repeatCount="1"
                              attributeName="transform" attributeType="XML"
                              type="translate" fill="freeze"
                              values="0, 0 ; 240, 0" additive="sum"/>
          </image>
          <image id= "3" x= "0" y= "0"  width="240" height="160"
                    xlink : href="00102. jpg"
                    transform="translate(240 0)">
                    <animateTransform begin="3s" dur="2s" repeatCount="1"
                              attributeName="transform" attributeType="XML"
                              type="translate" fill="freeze"
                              values="0, 0 ; -240, 0" additive="sum"/>
          </image>
</svg>
```

FIG. 38

```
<?xml version="1.0" standalone="no"?>
<!DOCTYPE svg PUBLIC "-//W3C//DTD SVG 1.0//EN"
            "http://www.w3.org/TR/2001/REC-SVG-20010904/DTD/svg10.dtd">
<svg width="250" height="250">
   <title> Slide in </title>
   <desc> Right 3 sec </disc>
            <image id= "1" x= "0" y= "0"   width="240" height="160"
                        xlink : href="">
            </image>
            <image id= "2" x= "0" y= "0"   width="240" height="160"
                        xlink : href=""
                        transform="translate(-240 0)">
                <animateTransform begin="3s" dur="1s" repeatCount="1"
                            attributeName="transform" attributeType="XML"
                            type="translate" fill="freeze"
                            values="0, 0 ; 240, 0" additive="sum"/>
            </image>
</svg>
```

FIG. 43

| id | FILE NAME |
|---|---|
| 1 | ABC0002.jpg |
| 2 | ABC0004.jpg |
| 3 | ABC0005.jpg |
| 4 | |

```
<?xml version="1.0" standalone="no"?>
<!DOCTYPE svg PUBLIC "-//W3C//DTD SVG 1.0//EN"
          "http://www.w3.org/TR/2001/REC-SVG-20010904/DTD/svg10.dtd">
<svg width="250" height="250">
   <title> Slide in </title>
   <desc> Right 3 sec </desc>
            <image id= "1" x= "0" y= "0"  width="240" height="160"
                       xlink : href="ABC0002. jpg">
            </image>
            <image id= "2" x= "0" y= "0"  width="240" height="160"
                       xlink : href="ABC0004. jpg"
                       transform="translate(-240 0)">
                <animateTransform begin="3s" dur="1s" repeatCount="1"
                           attributeName="transform" attributeType="XML"
                           type="translate" fill="freeze"
                           values="0, 0 ; 240, 0" additive="sum"/>
            </image>
            <image id= "3" x= "0" y= "0"  width="240" height="160"
                       xlink : href="ABC0005.jpg"
                       transform="translate(-240 0)">
                <animateTransform begin="6s" dur="1s" repeatCount="1"
                           attributeName="transform" attributeType="XML"
                           type="translate" fill="freeze"
                           values="0, 0 ; 240, 0" additive="sum"/>
            </image>
</svg>
```

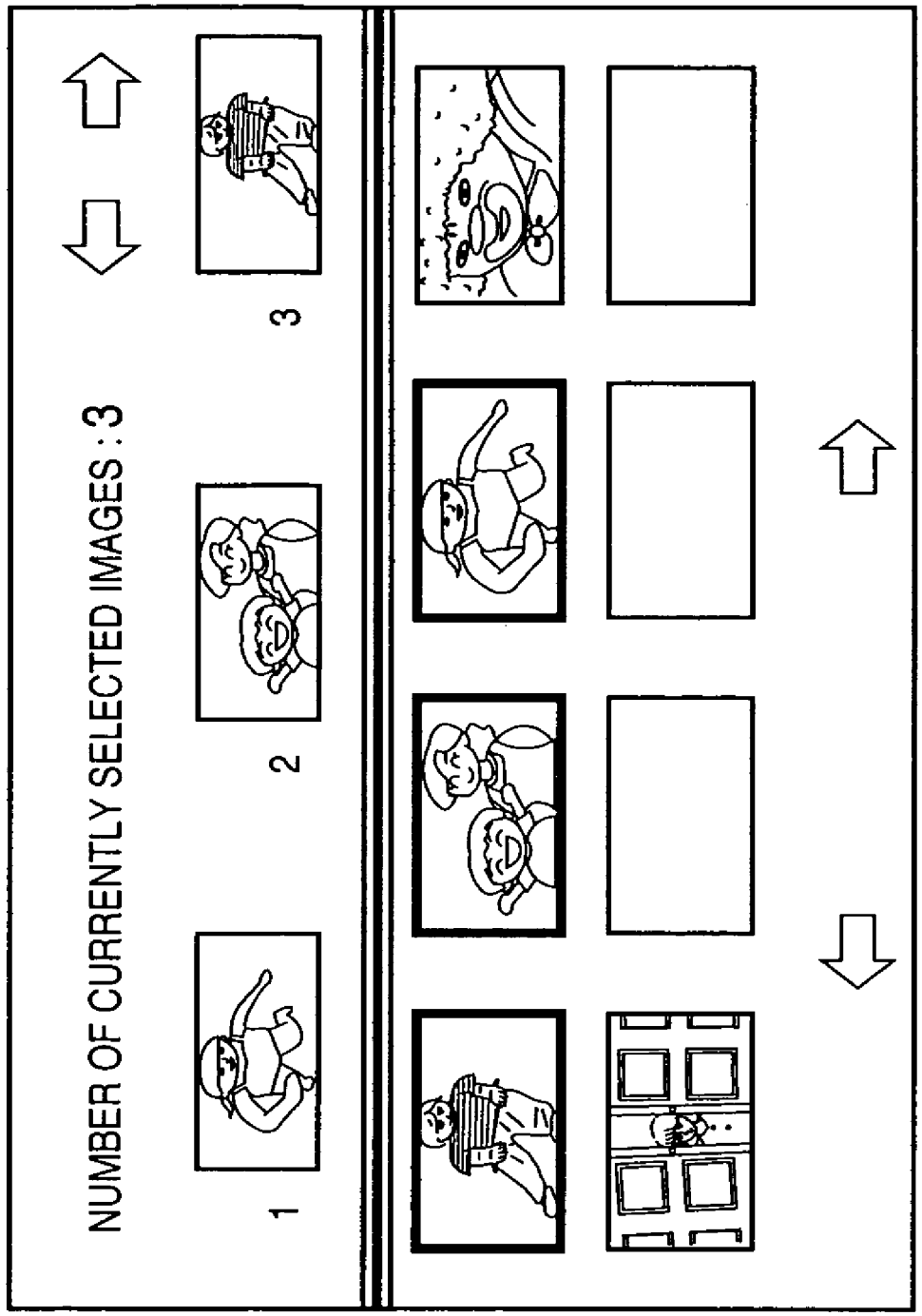

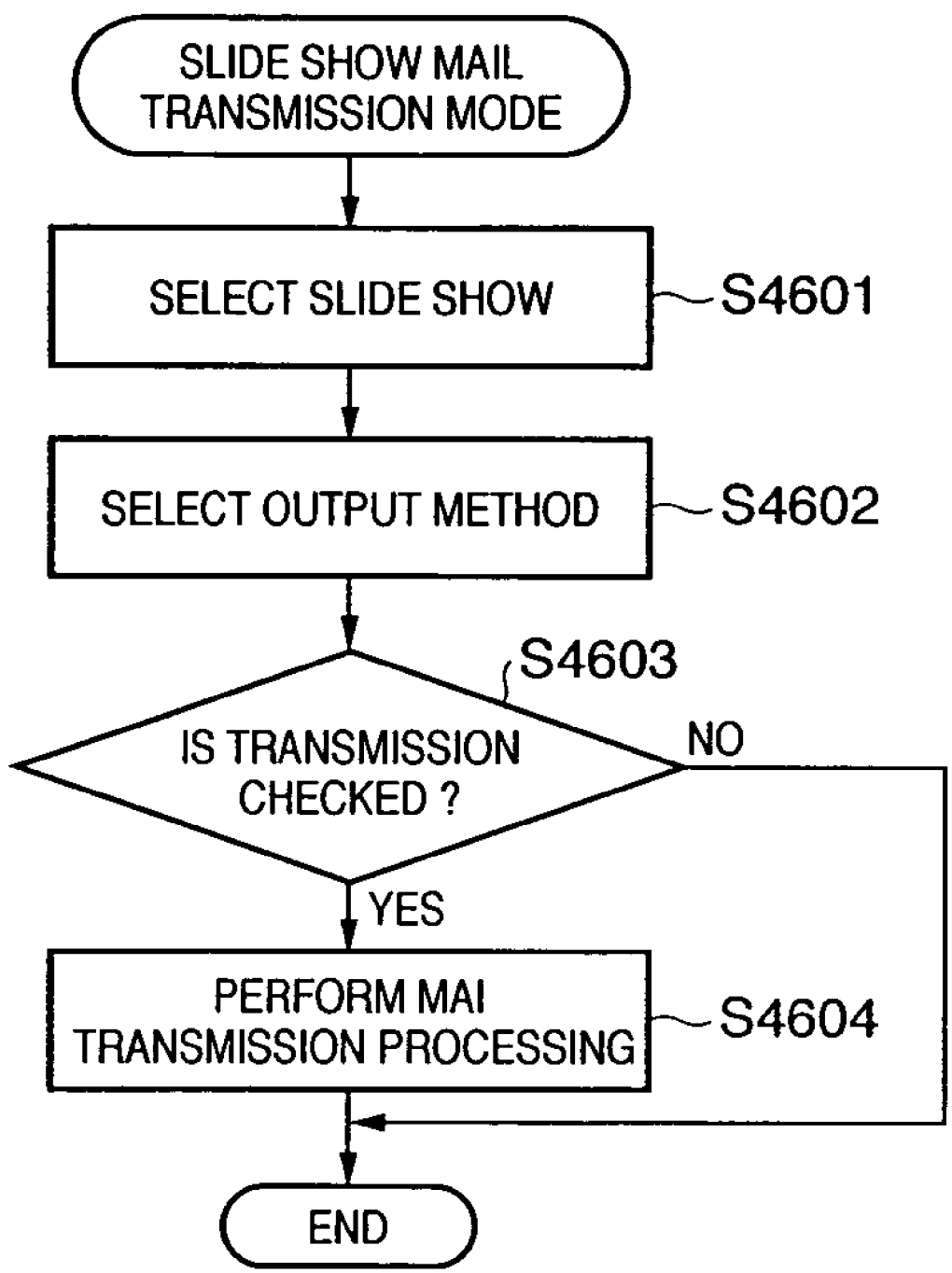

FIG. 47
EFFECT: Slide in　Right 3 sec　NUMBER OF IMAGES: 10
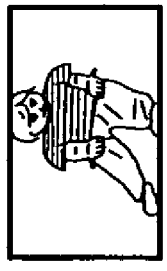
1
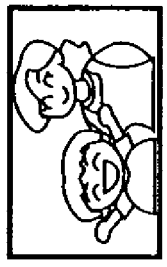
2
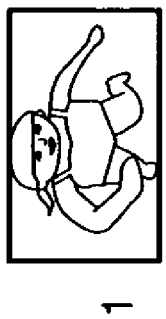
3
↑
↓
SLIDE SHOW LIST
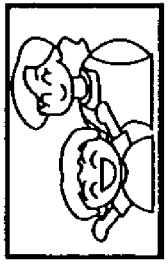
Outing
Picnic

FIG. 51

```
<?xml version="1.0" standalone="no"?>
<!DOCTYPE svg PUBLIC "-//W3C//DTD SVG 1.0//EN"
           "http://www.w3.org/TR/2001/REC-SVG-20010904/DTD/svg10.dtd">
<svg width="500" height="500">
           <image xlink : href=""/>
</svg>
```

FIG. 52

```
<filter id="Bevel" filterUnits="objectBoundingBox" x="-10%" y="-10%"
width="150%" height="150%">
  <feGaussianBlur in="SourceAlpha" stdDeviation="3" result="blur"/>
  <feSpecularLighting in="blur" surfaceScale="5" specularConstant="0.5"
      specularExponent="10" result="specOut"
      style="lighting-color : rgb (255, 255, 255)">
    <fePointLight x="-5000" y="-10000" z="20000"/>
  </feSpecularLighting>
  <feComposite in="specOut" in2="SourceAlpha" operator="in" result="specOut2"/>
  <feComposite in="SourceGraphic" in2="specOut2" operator="arithmetic" k1="0"
      k2="1" k3="1" k4="0" result="litPaint"/>
</filter>
```

F I G. 53

```
<text transform= "matrix(1 0 0 1 0 20. 8125)">
<tspan x="0" y="0" style="stroke : none ; font-family : 'HGSoeiKakupoptai' ; font-size : 24 ;">
Athletic Meeting
</tspan>
</text>
```

FIG. 54

```
<?xml version="1.0" encoding="utf-8"?>
<!DOCTYPE svg PUBLIC "-//W3C//DTD SVG 20000303 Stylable//EN"
"http://www.w3.org/TR/2000/03/WD-SVG-20000303/DVD/svg-20000303-stylable.dtd">
<svg width="500" height="500">
  <g>
    <text transform="matrix(1 0 0 1 0 20.8125)">
      <tspan x="0" y="0" style="stroke:none ; font-family: 'HGSoeiKakupoptai';font-size : 24;">
      Athletic Meeting
      </tspan>
    </text>
  </g>
</svg>
```

FIG. 62

```
<?xml version="1.0"?>
<!DOCTYPE svg PUBLIC "-//W3C//DTD SVG 20010904//EN"
  "http://www.w3.org/TR/2001/REC-SVG-20010904/DTD/svg10.dtd">
<svg width="183.5" height="147.0" viewBox="0 0 1835 1470" xmlns="http://www.w3.org/2000/svg">
  <filter id="Matrix" filterUnits="objectBoundingBox"
    x="0%" y="0%" width="100%" height="100%">
    <feColorMatrix type="Matrix" in="SourceGraphic" result="grayscale"
      values=".24 .67 .08 0 0
              .24 .67 .08 0 0
              .24 .67 .08 0 0
              1 1 1 1 0"/>
    <feColorMatrix type="Matrix" in="grayscale" result="sepia"
      values="0.7 0.3 0 0 0
              0.3 0 0 0 0
              0 0 0 0 0
              1 1 1 1 0"/>
  </filter>
  <image xlink : href=" "filter=" url (#Matrix)"/>
</svg>
```

FIG. 64

```
<?xml version="1.0"?>
<!DOCTYPE svg PUBLIC "-//W3C//DTD SVG 20010904//EN"
 "http://www.w3.org/TR/2001/REC-SVG-20010904/DTD/svg10.dtd">
<svg width="183.5" height="147.0" viewBox="0 0 1835 1470" xmlns="http://www.w3.org/2000/svg">
  <filter id="Matrix" filterUnits="objectBoundingBox"
    x="0%" y="0%" width="100%" height="100%">
    <feColorMatrix type="Matrix" in="SourceGraphic" result="grayscale"
      values=".24 .67 .08 0 0
              .24 .67 .08 0 0
              .24 .67 .08 0 0
              1 1 1 1 0"/>
    <feColorMatrix type="Matrix" in="grayscale" result="sepia"
      values="0.7 0.3 0 0 0
              0.3 0 0 0 0
              0 0 0 0 0
              1 1 1 1 0"/>
  </filter>
  <image xlink : href="00021.jpg" filter="url (#Matrix)"/>
</svg>
```

F I G. 69

```
<?xml version="1.0" standalone="no"?>
<!DOCTYPE svg PUBLIC "-//W3C//DTD SVG 1.0//EN"
  "http://www.w3.org/TR/2001/REC-SVG-20010904/DTD/svg10.dtd">
<svg width="250" height="250">
  <title> Gray scale </title>
  <desc />
  <defs>
    <filter id="gray" filterUnits="objectBoundingBox"
        x="0%" y="0%" width="100%" height="100%">
      <feColorMatrix type="luminanceToAlpha" in="SourceGraphic" result="gray"/>
      <feColorMatrix type="matrix"
          values="0 0 0 1 0
                  0 0 0 1 0
                  0 0 0 1 0
                  0 0 0 0 1"/>
    </filter>
  </defs>
  <image style="filter : url(#gray)" x="0" y="0" width="200" height="140"
      xlink : href=" "/>
</svg>
```

FIG. 73
PLEASE SELECT IMAGE FOR WHICH
SPECIAL EFFECT IS TO BE SET
   
   
 

F I G. 74

FIG. 75

```
<?xml version="1.0" standalone="no"?>
<!DOCTYPE svg PUBLIC "-//W3C//DTD SVG 1.0//EN"
    "http://www.w3.org/TR/2001/REC-SVG-20010904/DTD/svg10.dtd">
<svg width="250" height="250">
    <title> Gray scale </title>
    <desc />
    <defs>
        <filter id="gray" filterUnits="objectBoundingBox"
            x="0%" y="0%" width="100%" height="100%">
            <feColorMatrix type="luminanceToAlpha" in="SourceGraphic" result="gray"/>
            <feColorMatrix type="matrix"
                values="0 0 0 1 0
                        0 0 0 1 0
                        0 0 0 1 0
                        0 0 0 0 1"/>
        </filter>
    </defs>
    <image style="filter : url(#gray)" x="0" y="0" width="280" height="180"
        xlink : href="ABC0002.jpg"/>
</svg>
```

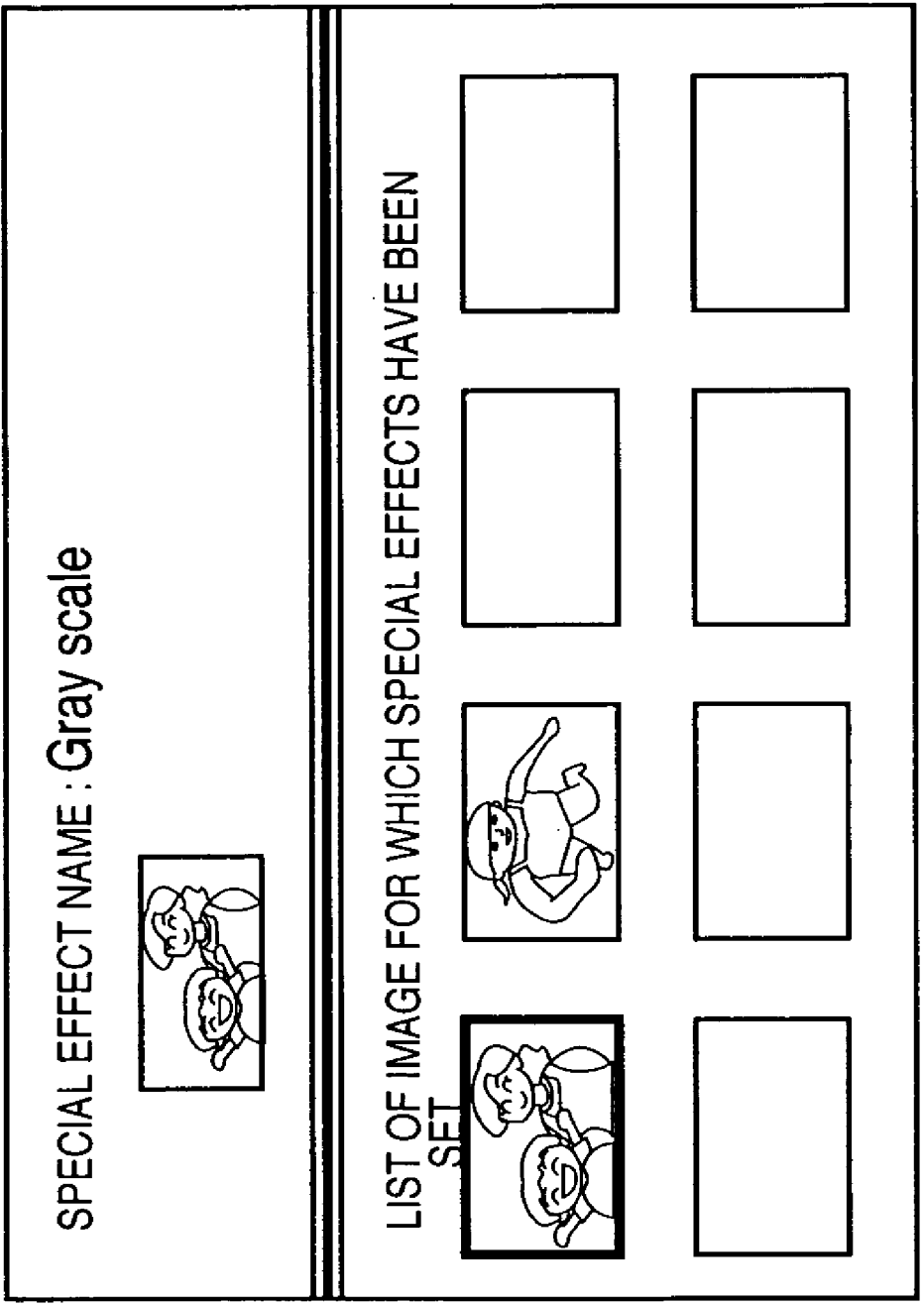

DIGITAL CAMERA, IMAGE OUTPUT METHOD, AND PROGRAM FOR OUTPUTTING SELECTED IMAGE DATA

FIELD OF THE INVENTION

The present invention relates to an image sensing device such as a digital camera and, more particularly, to a digital camera which can perform image processing such as image layout processing, slide show processing, superimposition of characters and the like, and special effect processing, an image output method for the camera, and a program for the camera.

BACKGROUND OF THE INVENTION

Recently, a so-called digital camera apparatus which converts an input video signal into digital image data by using a photoelectric conversion device such as a CCD (Charge-Coupled Device) and stores the digital image data in a storage device has been put into practice and widely used as a means for creating digital images. Some of such digital camera apparatuses have a function of setting a simple layout rule for a plurality of images selected by the user. Outputting layout set by this function and image data to a printer or the like can perform index printing or multi-image printing of a plurality of images. As a typical method of setting such a layout rule, a method based on the DPOF (Digital Print Order Format) version 1.10 specifications is known. In a digital camera complying with DPOF, image data (photos) as print targets and a layout rule are recorded in a memory card in the camera in a format complying with HTML, together with the image data. When the layout rule and image data are input to a printer complying with DPOF, the printer prints the designated images in the designated layout (see Japanese Patent Laid-Open No. 11-127323).

In general, a digital camera includes a display unit such as a liquid crystal display, and can play back recorded photos (images) by displaying them on the display unit. The above DPOF function includes a so-called slide show function of consecutively displaying a plurality of images on the display unit or the like at a set timing.

However, layout rules which can be set by a conventional digital camera such as a digital camera apparatus complying with DPOF are limited to simple rules, e.g., a rule which defines the number of images to be arranged on one sheet of paper. It is therefore impossible for such an apparatus to obtain a high-quality electronic photo album rich in expression, which can be realized by freely arranging images at arbitrary positions on a sheet of paper or providing visual ornaments around images. In addition, how a final arrangement is achieved by processing a layout rule depends on the installation specifications of a display device or printer apparatus which interprets the layout rule. For this reason, depending on the apparatus to be used, a layout expression is not reproduced as intended by the creator.

As a method of solving such drawbacks, there is available a method of transferring image data taken by a digital camera apparatus to a computer, creating an electronic photo album by using a program which operates on the computer, and printing it as needed. Such a program is called a photo album application, which generally provides a high-quality layout function rich in expression to allow a plurality of images to be freely arranged. In the method of solving the above problems by using such a photo album application, image data must be transferred first from a digital camera to a computer. In addition, the user must be skilled in the use of the photo album application on the computer. For this reason, this method cannot provide the convenience of creating an electronic photo album by using the digital camera alone. Furthermore, the operation from sensing images to creating and printing an electronic photo album is a cumbersome procedure, requiring many steps.

Display timings in a slide show function which can be set by a conventional digital camera such as a digital camera apparatus complying with DPOF are limited to simple timings such as the display time of one image. For this reason, the conventional camera cannot realize a high-performance slide show rich in expression, e.g., designating the display time of each image independently or providing a visual effect for switching display between images.

As a method of solving such a drawback, there is available a method of creating a slide show by transferring the image data taken by a digital camera apparatus to a computer and using a program which operates on the computer. Such a program is called a presentation application, which generally provides a flexible timing information setting function and a visual effect function rich in expression, thereby allowing the creation of a high-performance slide show. In this method of solving the above problem by using such a presentation application, image data must be transferred first to a computer apparatus. In addition, the user must be skilled in the use of the presentation application. This makes it impossible to obtain the convenience of creating a slide show by using the digital camera apparatus alone. Furthermore, the operation from sensing images to creating a slide show is a cumbersome procedure, requiring many steps.

In conventional digital camera apparatuses, there is provided no function of adding title information such as a title or caption to a photographed image, or even if it is provided, the function is limited such that characters cannot be enlarged/reduced. For this reason, a digital camera alone cannot provide a satisfactory function of helping information organization, e.g., displaying images while adding the information of photographing conditions or the names of photographing site of the images. This imposes serious restrictions on the operation of storing and managing a large amount of image data in a storage device incorporated in the digital camera apparatus.

As a method of solving such a drawback, there may be used a method of managing the image data taken by a digital camera apparatus by transferring them to a computer, adding title information to each image data by using a program which operates on the computer, and transferring the resultant data to the digital camera apparatus again. In such a method using a computer, image data needs to be transferred first to the computer apparatus, and the user must be skilled in the use of an image processing program such as a photo retouch application in the computer. This makes it impossible to obtain the convenience of creating a tiled image by using the digital camera apparatus alone. Furthermore, the operation from photographing images to adding title information and transferring the resultant data to the digital camera apparatus is a cumbersome procedure, requiring many steps.

Some digital camera apparatuses have a function of allowing a user to set a special effect at the time of image sensing operation. This function makes it possible to sense images while applying special effects such as color tone conversion and soft focus (see, for example, Japanese Patent Laid-Open No. 2002-176615).

A special effect which can be set by a conventional digital camera apparatus is designed to be applied to image data when it is stored in a storage device. For this reason, an image with a special effect cannot be displayed on the digital camera before recording the image. That is, the user cannot photograph an object after checking whether an intended special effect is applied to an image of the object. In addition, since photographed image itself is directly processed when a special effect is to be applied to it, even if the user wants to use the image data from which the special effect is canceled or to which another special effect is applied, image data without any special effect, which should be used as a material, cannot be obtained.

As a method of solving such a drawback, there is available a method of providing a special effect for the image data taken by a digital camera apparatus by transferring the image data to a computer apparatus and using a photo retouch application program which operates on the computer apparatus. The user can interactively apply various special effects to image data as a material by using the photo retouch application.

In the method of solving the above problem by using the photo retouch application, image data must be transferred first to the computer apparatus. It is therefore impossible to obtain the convenience of creating an image with a special effect by using the digital camera apparatus alone. Furthermore, the operation from image sensing to creating an image with a special effect is a cumbersome procedure, requiring many steps.

As described above, many restrictions are imposed on the conventional digital camera in outputting and processing images photographed by the camera alone. In order to allow the user to output and process images by using desired methods, therefore, it is indispensable to process the images by using the computer.

SUMMARY OF THE INVENTION

The present invention has been made in consideration of the above prior art, and has as its object to provide a digital camera and image processing method which can perform complicated processing such as image layout processing, slide show processing, and superimposition processing, and special effect processing by using the digital camera alone.

More specifically, it is another object of the present invention to provide a digital camera and image processing method which allows the camera apparatus alone to handle a high-quality electronic photo album rich in expression which allows a plurality of images to be freely arranged.

It is still another object of the present invention to provide a digital camera and image processing method which allows the digital camera apparatus lone to handle a high-performance slide show using flexible timing settings and visual effects rich in expression.

It is still another object of the present invention to provide a digital camera and image processing method which improve the convenience of enjoying images by allowing the single digital camera apparatus to output images with title information.

The present invention has been made in consideration of the above situation, and has as its object to provide an image processing technique of allowing a user to easily sense an image as intended while checking the applied state of a special effect or the like at the time of image sensing operation.

It is still another object of the present invention to provide an image processing technique of allowing the acquisition of an image to which a special effect or the like is applied without directly processing image data itself.

In order to achieve the above objects, the present invention has the following arrangements.

A digital camera according to the present invention comprises
an image data memory unit which stores sensed image data;
an output information memory unit which stores output information describing an image output method;
an image data selector which selects designated image data as an output target from image data stored in the image data memory unit; and
an output unit which outputs the image data selected by the image data selector in accordance with the output information stored in the output information memory unit.

According to another aspect, the present invention has the following arrangements.

A digital camera according to the present invention comprises
an image data memory unit which stores sensed image data;
an additional information memory unit which stores additional information describing information to be added to the image data;
an image data selector which selects designated image data as an output target from the image data stored in the image data memory unit; and
an output unit which outputs the image data selected by the image data selector in accordance with the additional information stored in the additional information memory unit.

According to another aspect, the present invention has the following arrangements.

An image processing apparatus according to the present invention comprises
an image data memory unit which stores sensed image data;
a template information memory unit which stores template information describing an image output method;
an image data selector which selects designated image data as an output target from image data stored in the image data memory unit; and
an output unit which outputs the image data selected by the image data selector in accordance with the template information stored in the template information memory unit.

According to another aspect, the present invention has the following arrangements.

An image processing apparatus according to the present invention comprises
an image sensing unit which creates image data by photoelectrically converting an object image;
an image output unit which outputs an image with a special effect obtained by applying a special effect to the image data created by the image sensing unit; and
a recording unit which records the image data created by the image sensing unit and information of the special effect in association with each other when an image sensing instruction is issued.

According to another aspect, the present invention has the following arrangements.

An image processing apparatus according to the present invention comprises
an image sensing unit which creates image data by photoelectrically converting an object image;
an image output unit which outputs an image obtained by compositing an animation with the image data created by the image sensing unit; and
a recording unit which records the image data created by the image sensing unit and information of the animation in association with each other when an image sensing instruction is issued.

According to the present invention, complicated processing such as image layout processing, slide show processing, or superimposition processing can be performed by using the digital camera alone. In addition, as a result of such processing, since data complying with standardized specifications is generated, excellent data compatibility can be realized between the computer and other output devices and the like. In addition, in a computer or another output device or the like, the data created by the digital camera according to the present invention can be output by using a standard viewer (output program).

According to the present invention, a high-quality electronic photo album rich in expression which allows a plurality of images to be freely arranged can be handled by using the digital camera apparatus alone.

According to the present invention, since image data and layout information can be handled independently, various electronic photo albums can be obtained by combining different pieces of layout information for the same image data.

According to the present invention, if layout information is expressed by using the XML standard, since the layout information can be edited by using a general tool or text editor complying with XML, the load of creating layout information can be reduced.

According to the present invention, if an electronic photo album is expressed by using the SVG standard, the electronic photo album can be displayed by using general Internet browsing software complying with SVG. This can improve the convenience of enjoying electronic photo albums.

According to the present invention, a high-performance slide show using flexible timing settings and visual effects rich in expression can be handled by the digital camera apparatus alone.

According to the present invention, since image data and slide show information can be handled independently, various slide shows can be obtained by combining different pieces of slide show information for the same image data.

According to the present invention, if slide show information is expressed by using the XML standard, since the slide show information can be edited by using a general tool or text editor complying with XML, the load of creating slide show information can be reduced.

According to the present invention, if a slide show is expressed by using the SMIL or SVG standard, the slide show can be played back by using general Internet browsing software complying with SMIL or SVG. This can improve the convenience of enjoying slide shows.

According to the present invention, since a titled image can be created and displayed by using the digital camera apparatus alone, the convenience of enjoying images can be improved.

According to the present invention, an image to which title information is added can be obtained without directly processing image data itself.

According to the present invention, since image data and title information can be handled independently, various titled images can be obtained by combining different pieces of title information for the same image data.

According to the present invention, if special effect information such as title information is expressed by using the XML standard, since the special effect information can be edited by using a general tool or text editor complying with XML, the load of creating special effect information can be reduced.

According to the present invention, if a titled image is expressed by using the SVG standard, the titled image can be displayed by using general Internet browsing software complying with SVG. This can improve the convenience of enjoying titled images.

According to the present invention, outputting an image obtained by applying a special effect or the like to image data makes it possible for the user to easily sense an image as intended while checking the applied state of the special effect or the like at the time of photographing operation.

In addition, recording image data and special effect information and the like in association with each other makes it possible to record an image to which a special effect or the like is applied without directly processing the image data itself. This allows image data and special effect information and the like to be handled independently of each other. Therefore, various images can be recorded by combining different special effects and the like for the same image data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a view showing an example of the description of layout information in the first embodiment of the present invention;

FIG. 9 is a view showing a method of storing file names in the first embodiment of the present invention;

FIG. 11 is a view showing an example of the description of a photo album in the first embodiment of the present invention;

FIG. 16 is a view showing an example of the description of layout information in the modification to the first embodiment of the present invention;

FIG. 17 is a view schematically showing a method of acquiring layout information in the modification to the first embodiment of the present invention;

FIG. 21 is a view showing a method of storing file names in the modification to the first embodiment of the present invention;

FIG. 22 is a view showing an example of the description of a photo album in the modification to the first embodiment of the present invention;

FIG. 23 is a view schematically showing the contents displayed on a window in the modification to the first embodiment of the present invention;

FIG. 30 is a view showing an example of the description of slide show information in the second embodiment of the present invention;

FIG. 31 is a flowchart showing the flow of image data selection processing in the second embodiment of the present invention;

FIG. 35 is a view showing an example of the description of a slide show in the second embodiment of the present invention;

FIG. 38 is a view showing an example of the description of slide show information in the modification to the second embodiment of the present invention;

FIG. 43 is a view showing a method of storing file names in the modification to the second embodiment of the present invention;

FIG. 44 is a view showing an example of the description of a slide show in the modification to the second embodiment of the present invention;

FIG. 45 is a view schematically showing the contents displayed on a window in the modification to the second embodiment of the present invention;

FIG. 46 is a flowchart showing the flow of processing in a mail transmission mode in the modification to the second embodiment of the present invention;

FIG. 47 is a view schematically showing the contents displayed on a window in the modification to the second embodiment of the present invention;

FIG. 51 is a view showing an example of the description of a title information template in the third embodiment of the present invention;

FIG. 52 is a view showing an example of the description of special effect information in the third embodiment of the present invention;

FIG. 53 is a view showing an example of the description of title information in the third embodiment of the present invention;

FIG. 54 is a view showing an example of the description of a titled image in the third embodiment of the present invention;

FIG. 62 is a view showing an example of the description of special effect information in the fourth embodiment of the present invention;

FIG. 64 is a view showing an example of the description of an image with a special effect in the fourth embodiment of the present invention;

FIG. 69 is a view showing an example of the description of special effect information in the fifth embodiment of the present invention;

FIG. 73 is a view schematically showing the contents displayed on a window in the fifth embodiment of the present invention;

FIG. 74 is a view schematically showing the contents displayed on a window in the fifth embodiment of the present invention;

FIG. 75 is a view showing an example of the description of an image with a special effect in the fifth embodiment of the present invention;

FIG. 77 is a view schematically showing the contents displayed on a window in the fifth embodiment of the present invention.

DETAILED DESCRIPTION OF THE PREFERRED EMBODIMENTS

The first to third embodiments will be described as optimal embodiments for carrying out the present invention. The first embodiment is directed to a digital camera which allows the user to lay out photographic images taken by operating the digital camera body, display the images in the layout on the display of the digital camera body, and print the images from a printer connected to the digital camera. The second embodiment is directed to a digital camera which can play a so-called slide show, i.e., displaying the photographic images taken by operating the digital camera body on the display of the digital camera body or a display connected to the digital camera in accordance with the sequence, timing, and visual effect designated by the user. The third embodiment is directed to a digital camera which can display a titled image on the display of the digital camera body by adding a title having undergone a desired process to the photographic image taken by operating the digital camera body and print the image from a printer connected to the digital camera.

First Embodiment

Figure 1:
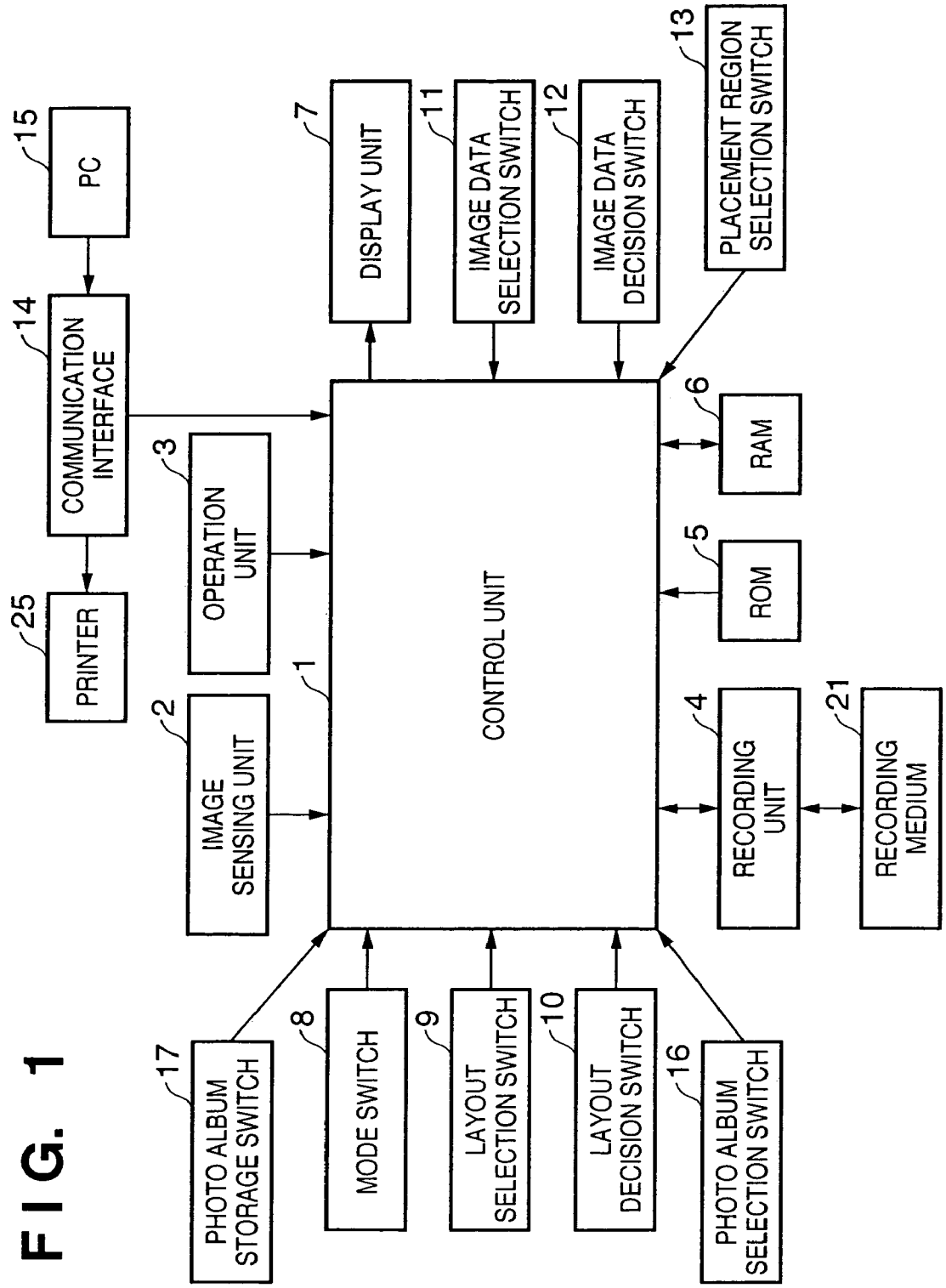
FIG. 1 is a block diagram showing the arrangement of a digital camera according to the first embodiment of the present invention.

The first embodiment of the present invention will be described below with reference to the accompanying drawings. FIG. 1 is a block diagram showing the arrangement of a digital camera according to the first embodiment of the present invention. Referring to FIG. 1, a control unit 1 receives signals from an image sensing unit 2, operation unit 3, mode switch 8, layout selection switch 9, layout decision switch 10, image data selection switch 11, image data decision switch 12, placement region selection switch 13, communication interface 14, photo album selection switch 16, and photo album storage switch 17. The control unit 1 outputs, to a display unit 7 and recording unit 4, signals associated with images and the like to be displayed or recorded. The control unit 1 is connected to a ROM 5 and RAM 6.

Of the above components, the control unit 1, image sensing unit 2, operation unit 3, recording unit 4, ROM 5, RAM 6, display unit 7, mode switch 8, layout selection switch 9, layout decision switch 10, image data selection switch 11, image data decision switch 12, placement region selection switch 13, photo album selection switch 16, and photo album storage switch 17 are provided for the main body of the digital camera.

Of the above components, the control unit 1 includes a processor, bus, I/O, and the like and controls the overall digital camera. The control unit 1 performs layout processing, a slide show, title image compositing operation, and the like as well as control for image sensing operation, predetermined image processing, and the like. The image sensing unit 2 converts an object image into a digital signal and inputs it to the control unit 1. The operation unit 3 can send an operation signal to the control unit 1 upon operation of a switch. The mode switch 8 is a switch which switches the current mode of the digital camera to one of a photographing mode, playback mode, photo album editing mode, and photo album browsing mode. The layout selection switch 9 has a function of selecting one piece of layout information. The layout decision switch 10 has a function of deciding layout information. The image data selection switch 11 has a function of selecting one image data. The image data decision switch 12 has a function of deciding image data.

The recording unit 4 is an interface for recording imaged data on the recording medium 21 and loading image data from the recording medium 21. The recording unit 4 can load layout information and can write and load layout setting information. The communication interface 14 is an interface for acquiring data such as layout information from an external unit, and is connected to a PC 15 through a communication cable or radio.

The display unit 7 serves not only as the finder of the digital camera but also as a display when a sensed image is played back. The display unit 7 also has a function of interpreting the contents described according to the SVG standard, dynamically generating an image, and displaying it. The display unit 7 therefore includes a controller including, for example, a processor and memory, independently of the control unit 1.

The printer 25 can interpret the contents described according to the SVG standard and form an image corresponding to the description.

<Album Editing Processing>

Figure 2:
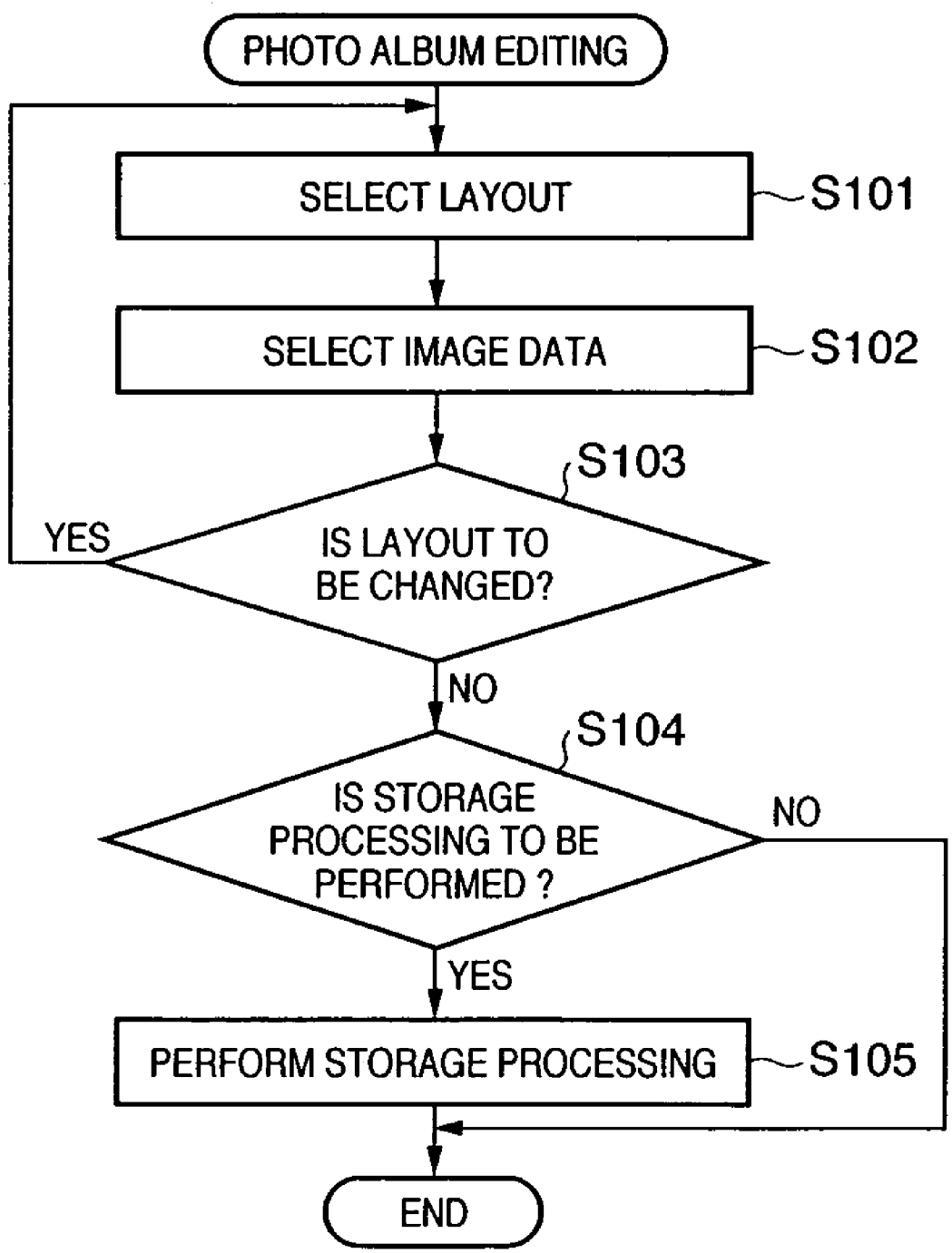
FIG. 2 is a flowchart showing the flow of photo album editing processing in the first embodiment of the present invention.

A photo album editing mode in the digital camera according to this embodiment, which has the arrangement shown in FIG. 1, will be described next. Photo album editing processing is started by the control unit 1 which receives a signal from the mode switch 8 when the current mode of the digital camera is set to the photo album editing mode with the mode switch 8. FIG. 2 is a flowchart showing the flow of photo album editing processing. The sequence shown in FIG. 2 is executed by the control unit 1.

In step S101, the user is made to select a layout. FIGS. 5A to 5D show layout examples. Layout information can contain the designations of the following information: the placement positions of regions, the sizes of the regions, the order of the stacked layers, and the rotation angles of the layers. FIGS. 5A to 5D show template examples displayed in accordance with various types of layout information. The layout file shown in FIG. 6 corresponds to a template like the one shown in FIG. 5A. Note that layout information is information in general which defines the layout of images, including the above various kinds of definitions, and a template is layout information which defines one layout (or images corresponding to the layout information). In this embodiment, the layout information stored in the recording medium 21 or downloaded from a personal computer contains at least one template. The user is made to select one of such templates.

When the user selects one template by operating the layout decision switch 10 in step S101, the flow advances to step S102. In step S102, the user selects images to be inserted in the image regions contained in the template decided in step S101. When the layout is to be changed, the sequence is repeatedly executed from step S101 (step S103). If the layout is not changed, it is checked in step S104 whether or not storage processing is designated. If YES in step S104, the selected template and image data are stored in the recording medium 21 or the like.

(Layout Selection Processing)

Figure 3:
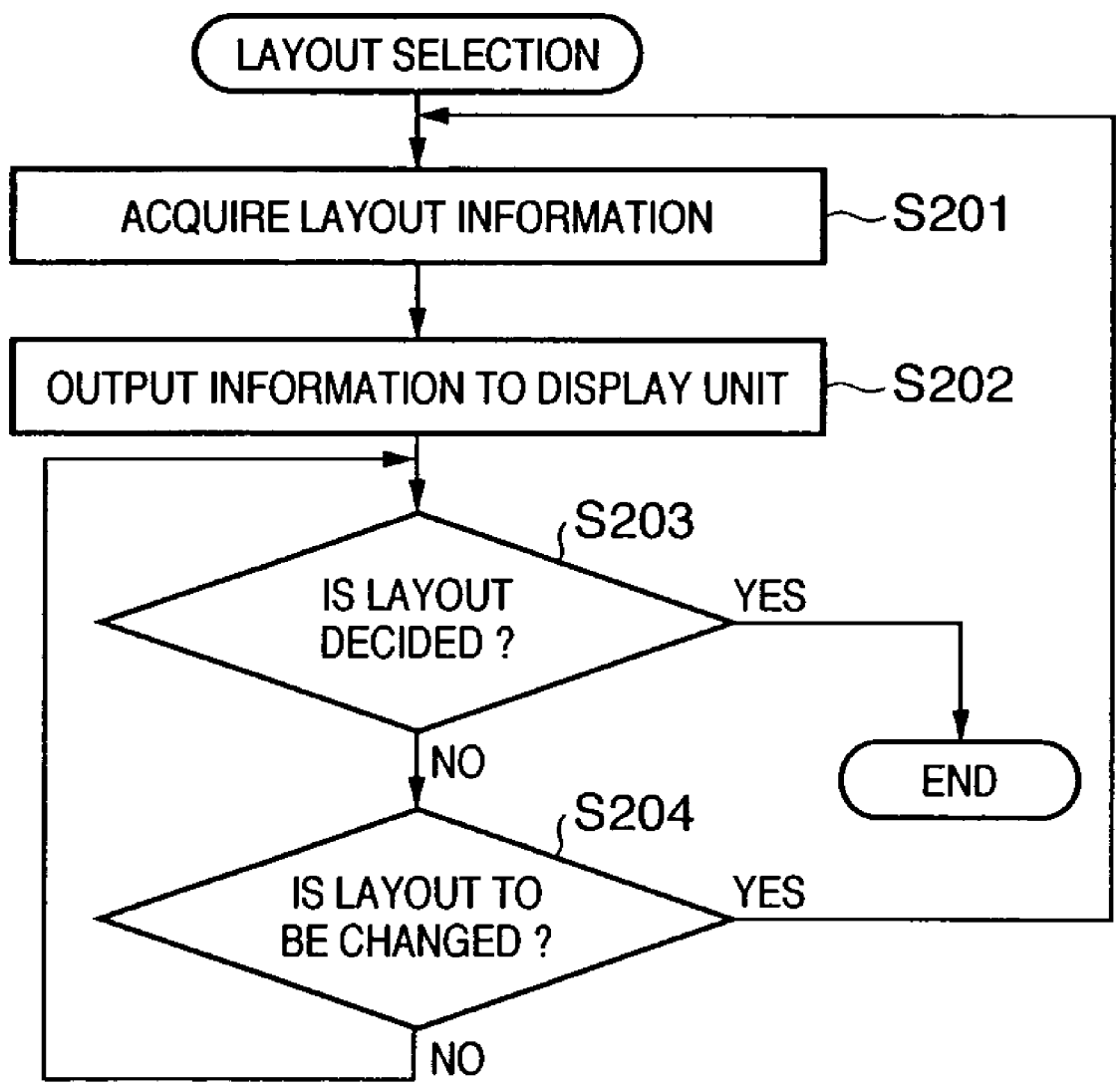
FIG. 3 is a flowchart showing the flow of layout information selection processing in the first embodiment of the present invention.

The layout information selection step (step S101) in FIG. 1 will be described next along with the flow of the layout information selection processing shown in FIG. 3. Referring to FIG. 3, first of all, one template is acquired from the layout information stored in the ROM 5 or recording medium 21 and loaded into the RAM 6 (step S201). The images of the layout defined by the loaded template are then displayed on the display unit 7 (step S202). The display step of step S202 will be described in detail later with reference to FIG. 12. When the user operates the layout decision switch 10 so as to decide to use the template selected with the layout selection switch 9 (step S203), the layout selection step is completed. If layout information contains a plurality of templates, the template to be selected can be changed by using the layout selection switch 9 (step S204). In this case, when a template is newly selected, the sequence is repeated from the acquisition of layout information corresponding to the selected template (step S201). The layout selection switch 9 may be a simple push button. The next template is selected by pressing this button. The last template may loop back to the first template.

Figure 4:
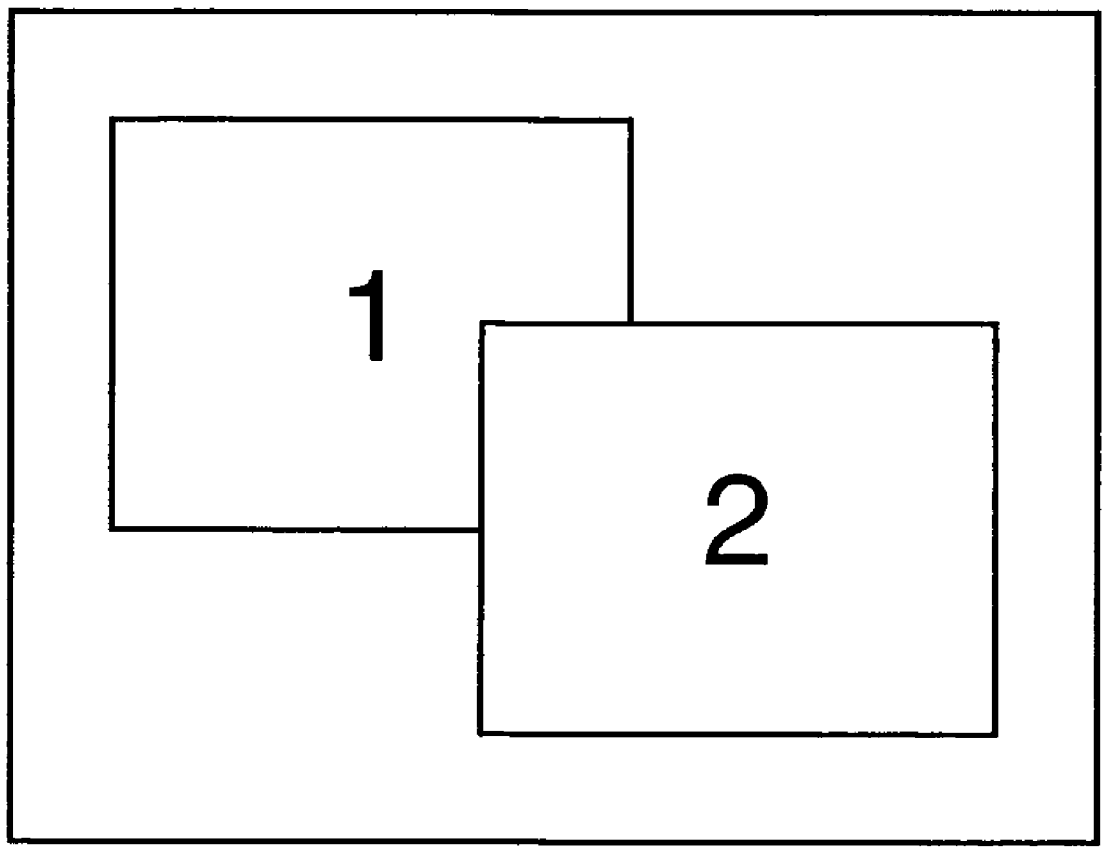
FIG. 4 is a view schematically showing the contents displayed on a window in the first embodiment of the present invention.
Figure 5A:
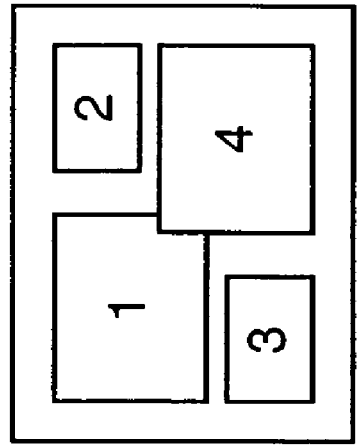
FIGS. 5A to 5D are views showing layout information output examples in the first embodiment of the present invention.
Figure 5B:
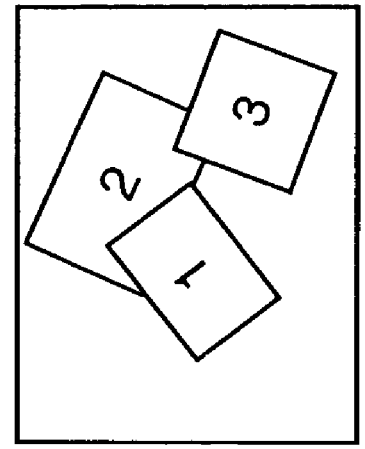
Figure 5C:
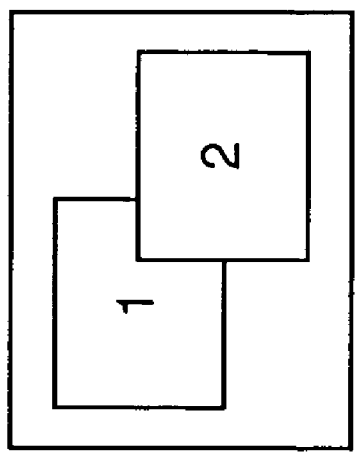
Figure 5D:
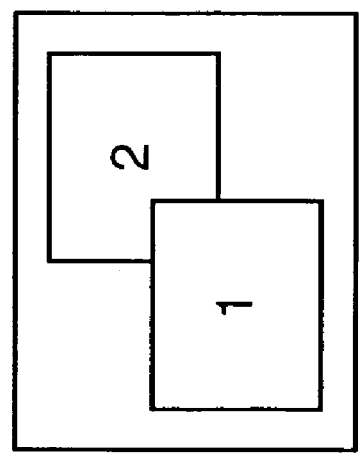

Layout information is described by using the SVG (Scalable Vector Graphics) standard. FIG. 6 shows an example of the layout information described by SVG. In the template contained in the layout information shown in FIG. 6, the upper left coordinates and vertical and horizontal sizes of the respective regions are set as attributes of <image> elements 601 and 602. In the layout information, the initial value of the "xlink:href" attribute of each <image> element which designates an image data file inserted in the template is made blank. In addition, the id attributes are serially numbered from 1. These numbers are the identifiers of the regions to be arranged. With regard to the element 601 in FIG. 6, for example, the identifier (id) attribute is 1, the upper left coordinates are (50, 45), the width is 270, the height is 225, and the image data file name is blank. Each layout information is stored as a file in the ROM 5 or recording unit 4. Of these pieces of information, layout information corresponding to one template selected with the layout selection switch 9 is input to the control unit 1 and stored in the RAM 6. As shown in FIG. 4, then, the layout information corresponding to the selected template is interpreted by the display unit 7, and the frames of the layout and the identifiers of the image regions are imaged and displayed. Since the layout information contains no image data, identifiers are displayed in the frames of the template in which images should be displayed.

In order to make layout information have a plurality of templates, for example, a template file is prepared for each template, with the layout information in FIG. 6 being prepared as a template file forming a template. In this case, the layout information is comprised of a plurality of files. Alternatively, since one template is represented by the <svg> element (the portion between the <svg> tag and the </svg> tag) in FIG. 6, <svg> elements each representing a template may be described in a row by the number of templates to form one file. In this case, layout information is formed from one file regardless of the number of templates.

Note that it may suffice not only to select a template file described in the SVG format but also to extract a partial region from the corresponding template image, enlarge/reduce the region, and composite it with the image. Since the SVG format is for a vector image, even if the image is enlarged/reduced, image quality deterioration, e.g., aliasing of an edge portion, is small. This makes it possible to realize new operation, i.e., using only a partial region of a template.

Even with one template, therefore, various expressions can be made by, for example, changing the position and size of a composite image frame and using only the position of a preferred background image. In addition, the sizes of the respective templates can be changed to combine them with other templates.

In order to realize such an arrangement, the template selection in FIG. 3 or image compositing operation like that described later is preferably provided with a step of extracting a desired region from a template to be used and changing the size of the template or extracted region. This step can be located at any position after the template selection.

As a method of extracting a template, a method using an element for extracting a portion the image defined by the template is available. According to this method, for example, a step of adding an extracting element for extracting the region designated by the user to the end of a template is added immediately after a template selection step. When this method is used, there is no need to change a text defining a template except for the addition of an element for extracting a portion of an image (more specifically, a tag representing the element) and, if necessary, an element for magnifying an extracted portion to a desired size. This makes it possible to extract a template without using any apparatus having a tool such as a text editor which can edit SVG data.

(Image Data Selection Processing)

Figure 7:
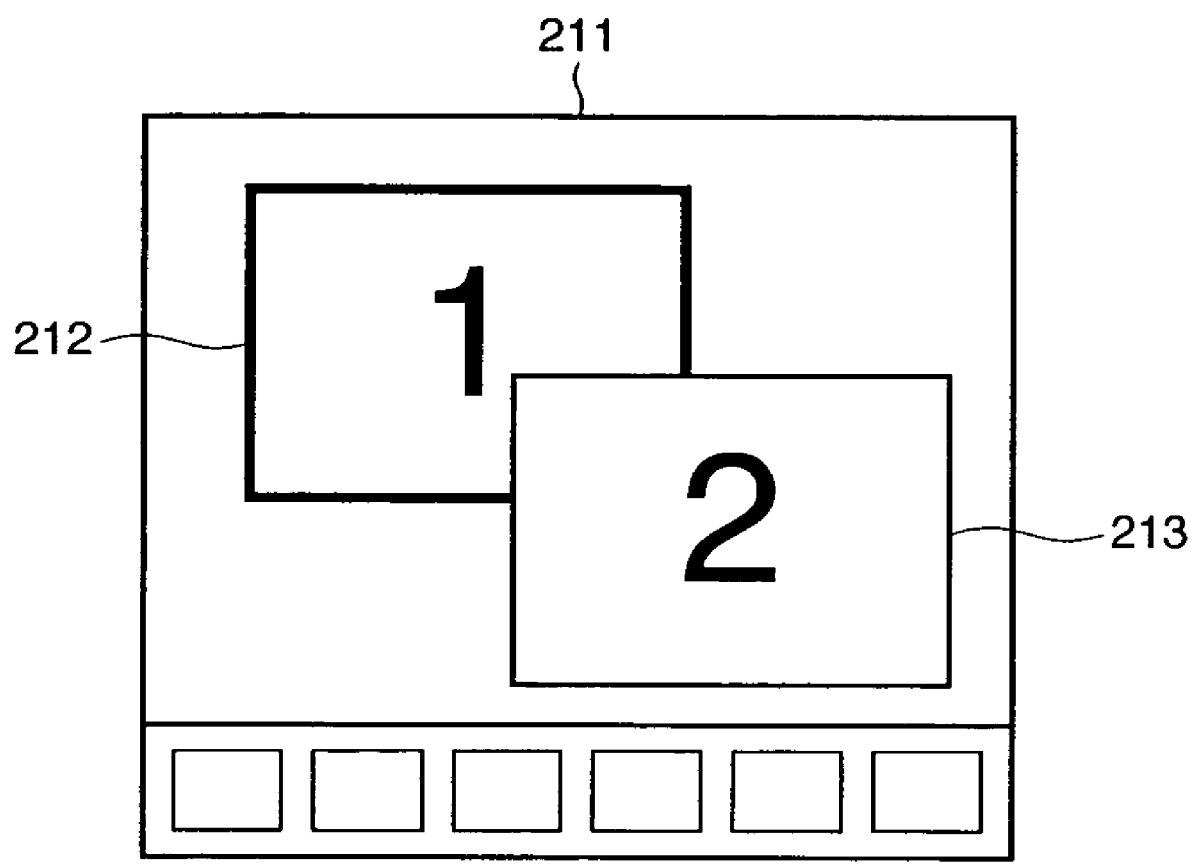
FIG. 7 is a view schematically showing the contents displayed on a window in the first embodiment of the present invention.
Figure 10:
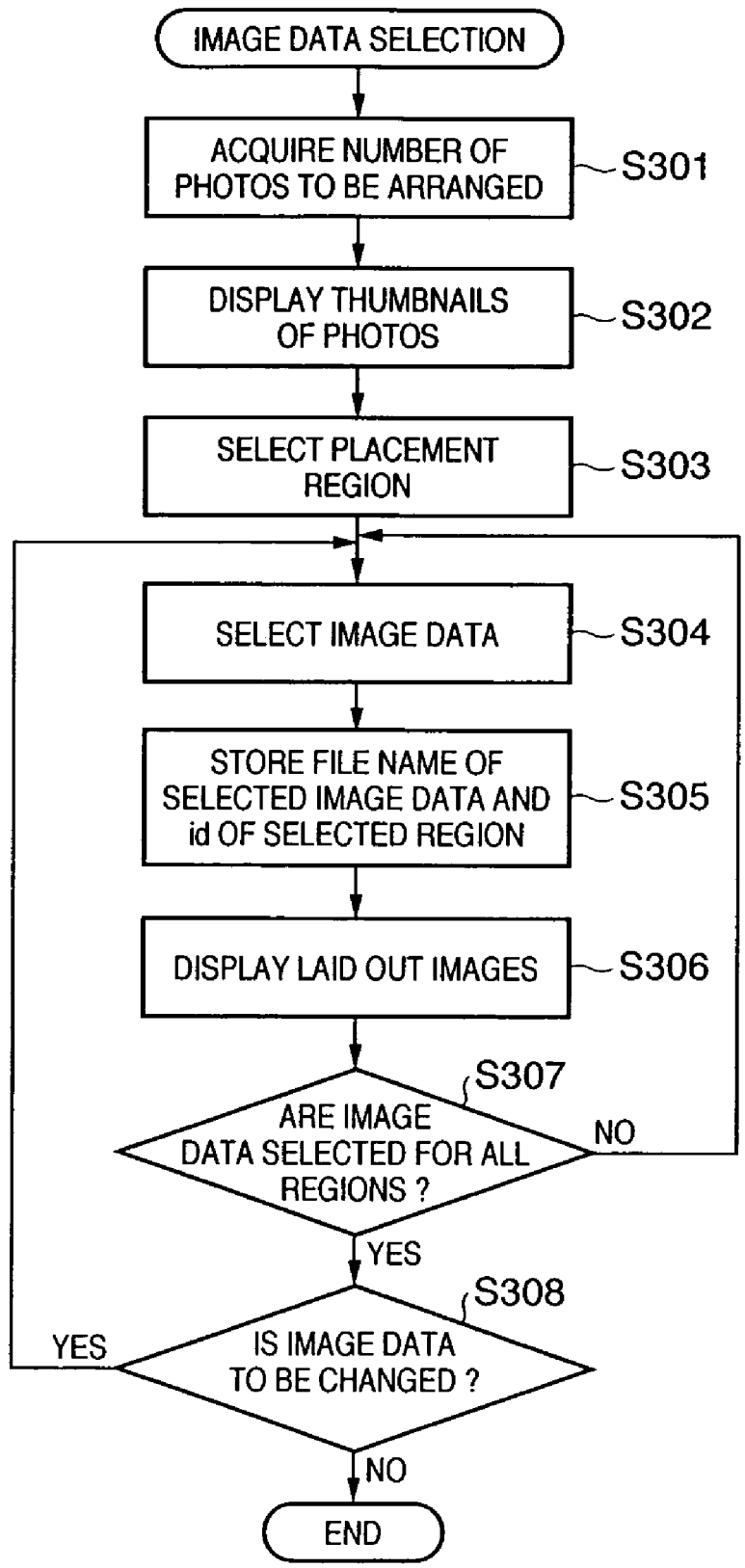
FIG. 10 is a flowchart showing the flow of image data selection processing in the first embodiment of the present invention.

The image data selection step of step S102 will be described next along with the flow of the image data selection processing shown in FIG. 10. First of all, the number of image data to be arranged is acquired from the template stored in the RAM 6 and currently selected (step S301). The number of image data to be inserted in a given template can be obtained by counting the number of <image> elements contained in the template. In the image selection step, as shown in FIG. 7, photographic images which can be selected are displayed as thumbnails on the lower part of the template (step S302). Regions in which images are to be placed are displayed on the upper part of the template as shown in FIG. 7 on the basis of the layout information of the selected template (to be also referred to as selected layout information hereinafter) and are selected with the placement region selection switch 13 (step S303). By operating the switch 13, regions are cyclically selected one by one from candidate regions.

Figure 8:
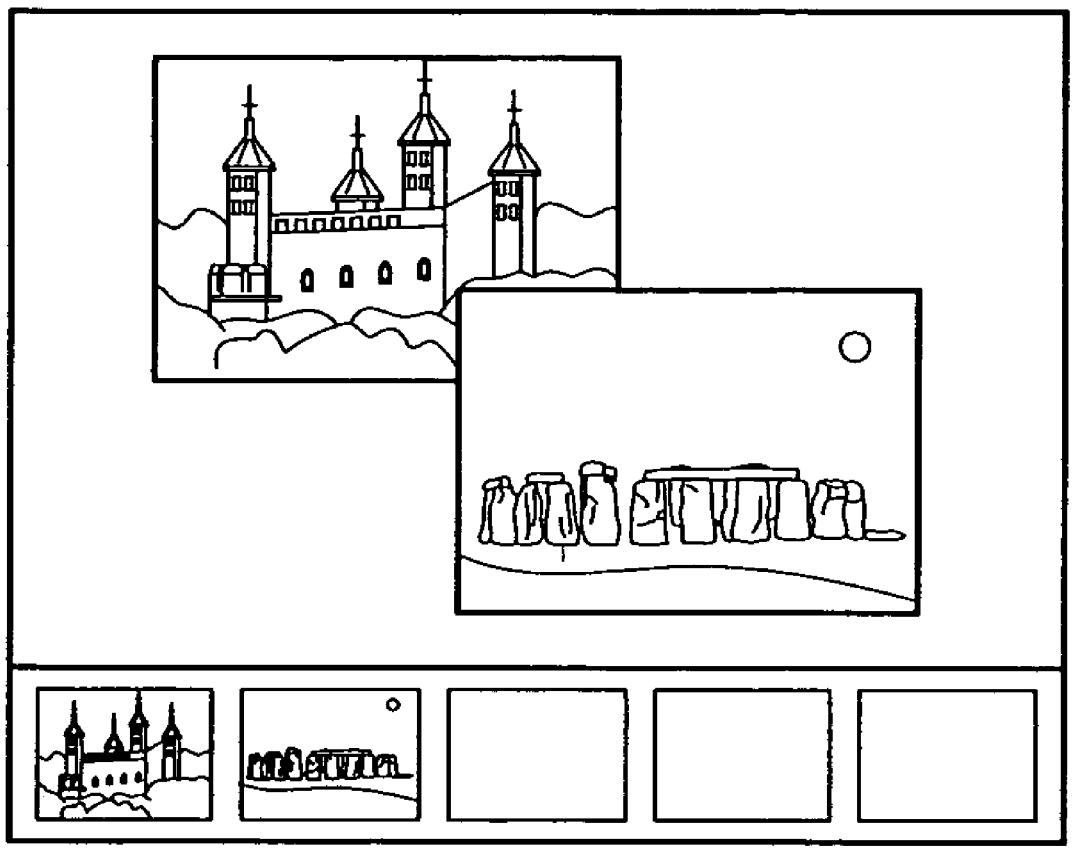
FIG. 8 is a view schematically showing the contents displayed on a window in the first embodiment of the present invention.
Figure 9:
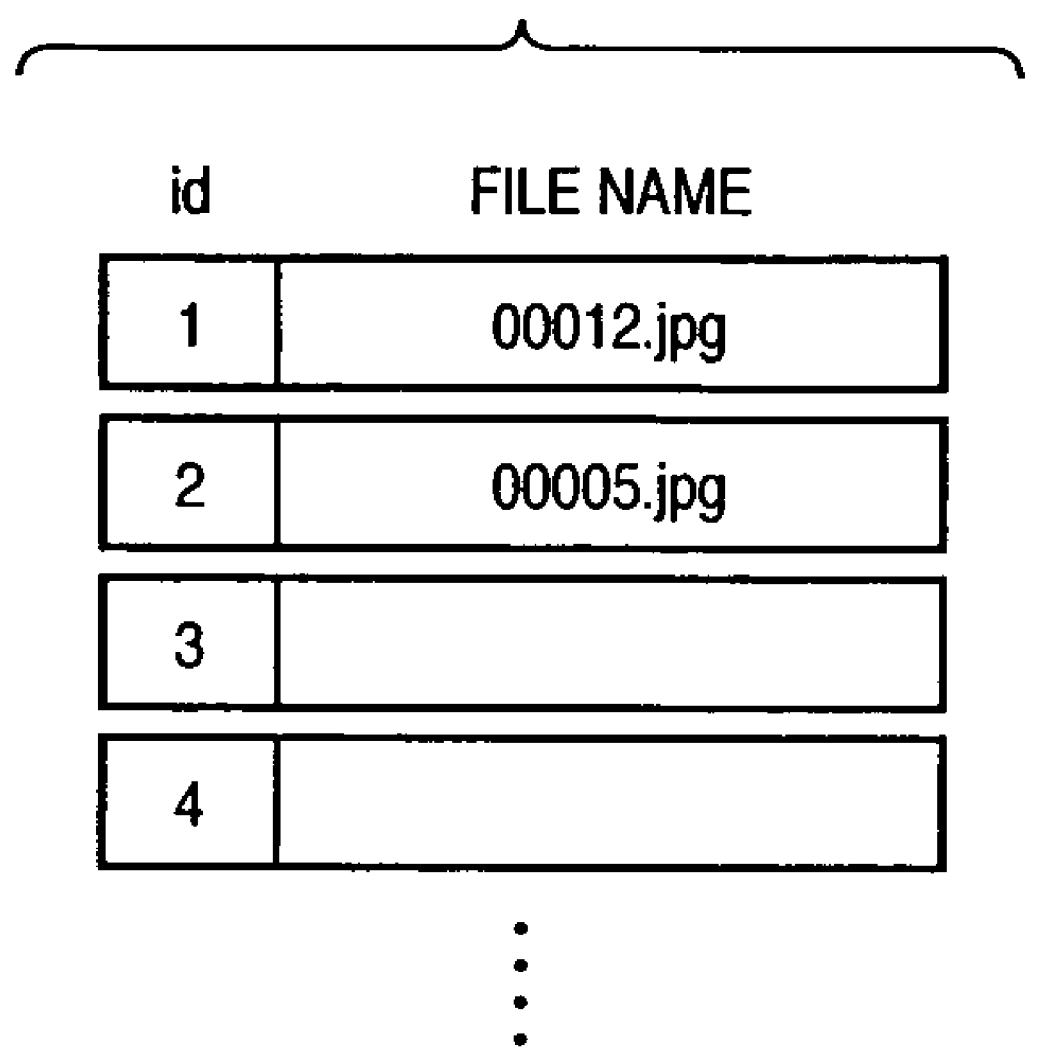

A photographic image to be placed in the selected region is selected with the image data selection switch 11, and is decided with the image data decision switch 12 (step S304). By operating the switch 11, photos are cyclically selected one by one from candidate photos. The image file name of the selected photo is made to correspond to the id of the selected region and stored in the form of a file list in the RAM 6 as shown in FIG. 9 (step S305). The value of xlink:href of the <image> element contained in the layout information in the RAM 6, which is blank, is changed to the image file name which is made to correspond to the id identical to the id attribute value of the <image> element. As shown in FIG. 8, then, the selected image is fitted in the selected region and displayed on the display unit 7 (step S306). Although the processing in step S306 is performed by the display unit 7 in this embodiment, the control unit 1 may interpret the description based on SVG to form an image and cause the display unit 7 to display it. The flow returns to step S301 to repeat this processing until images are placed in all the regions (step S307) and the user stops changing the image data (step S308).

(Display Processing)

Figure 12:
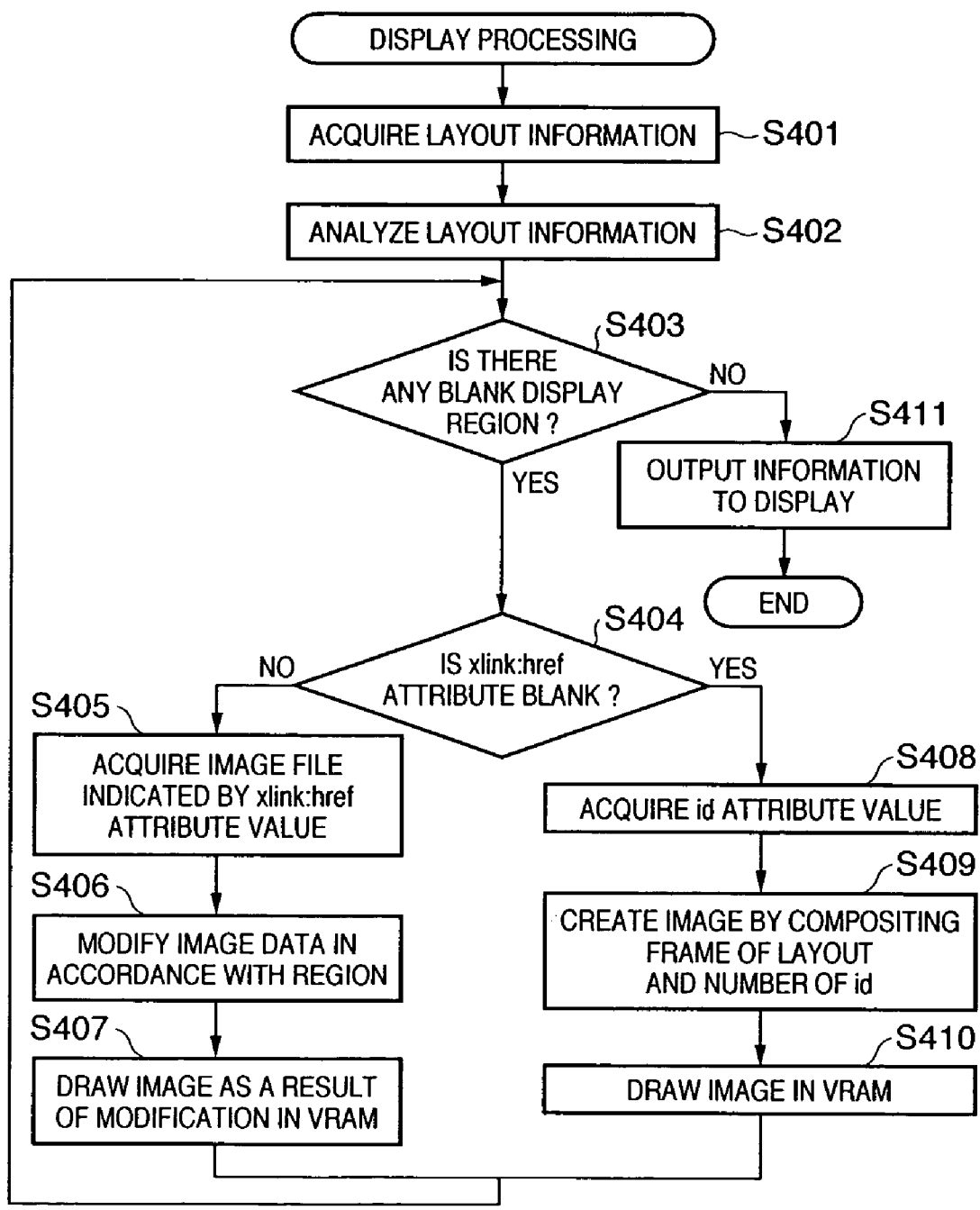
FIG. 12 is a flowchart showing the flow of image display processing in the first embodiment of the present invention.

The display step of step S202 in FIG. 3 and step S306 in FIG. 10 will be described next along with the flow of the display processing shown in FIG. 12. The display unit 7 receives layout information (step S401) and analyzes the description based on SVG (step S402). Subsequently, it is checked whether or not display processing is performed for all the regions contained in the layout information, and the processing is repeated until no blank display region is left (step S403). First of all, it is checked whether or not the "xlink:href" attribute is blank (step S404). If there is a blank region, image data to be placed in the region is undecided. For this reason, the id attribute value, i.e., the identifier of the region, is acquired (step S408), and an image in which a layout frame and the identifier are arranged is generated and output to the VRAM (step S409). The layout frame is determined in accordance with the width and height defined by the <svg> element. For example, referring to FIG. 6, a frame image having a width of 500 pixels and a height of 500 pixels is displayed in accordance with width=500 and height=500. In this case, if the thickness, color, and the like of the frame line are defined, the frame line is displayed in accordance with the definitions. If they are not defined, the frame line is formed with a predetermined thickness (e.g., two pixels) and color (e.g., black). The frames and identifiers of image regions can be determined in the same manner as described above.

If the "xlink:href" attribute is not blank, since its attribute value indicates the file name of image data to be placed in the region, the corresponding image file is acquired (step S405). The image data is then modified in accordance with the region (step S406). The resultant data is output to the VRAM (step S407). When data for all the regions are completely output to the VRAM, display performed. This processing is then terminated. Image data modification can be done by thinning out pixels or interpolating pixels in accordance with the size of the region. The image can be fitted in the region by compositing the modified image data with the layout frame image so as to match the upper left corner point of the image with the designated position within the layout frame. In this case, for example, the order of overlapping images can also be defined in the layout information by sequentially overwriting and compositing images, starting from the upper <image> element.

When the display processing in step S102 in FIG. 2 is terminated, the flow may return to the routine in FIG. 1, and the layout information may be changed to another template as needed. In this case, the flow returns to layout selection processing (step S101) with the layout selection switch 9.

(Storage Processing)

The photo album storage processing in step S105 in FIG. 2 will be described next. Layout information in which images have already been arranged is stored in the RAM 6. If storage is designated with the photo album storage switch 17 in step S404, a file in the SVG format like that shown in FIG. 11 is output to the recording unit 4 (recording medium 21), and the processing is terminated. A file name may be given to the album by the user or mechanically assigned. FIG. 11 shows photo album data in which an image data file with "00012.jpg" is written in the region with id=1 in the template shown in FIG. 6, and an image file with "00005.jpg" is written in the region with id=2.

In the above case, the layout information is present in the ROM 5 or the recording medium 21 of the recording unit. However, layout information may be acquired from an external input apparatus such as the PC 15 through the communication interface 14. The layout information is in the text format, as shown in FIG. 6, and the standard description language called SVG is used in this embodiment. For this reason, layout information can be generated by editing a text using a commercially available personal computer. Referring to FIG. 1, layout information is generated by using the PC 15, and the PC 15 is connected to the communication interface 14 to transfer the layout information to the control unit 1. The layout information is then stored in the RAM 6 (or the recording medium 21). This layout information can be handled in the same manner as the layout information stored in the ROM 5 or the recording medium of the recording unit 4.

<Photo Album Browsing Mode>

Figure 13:
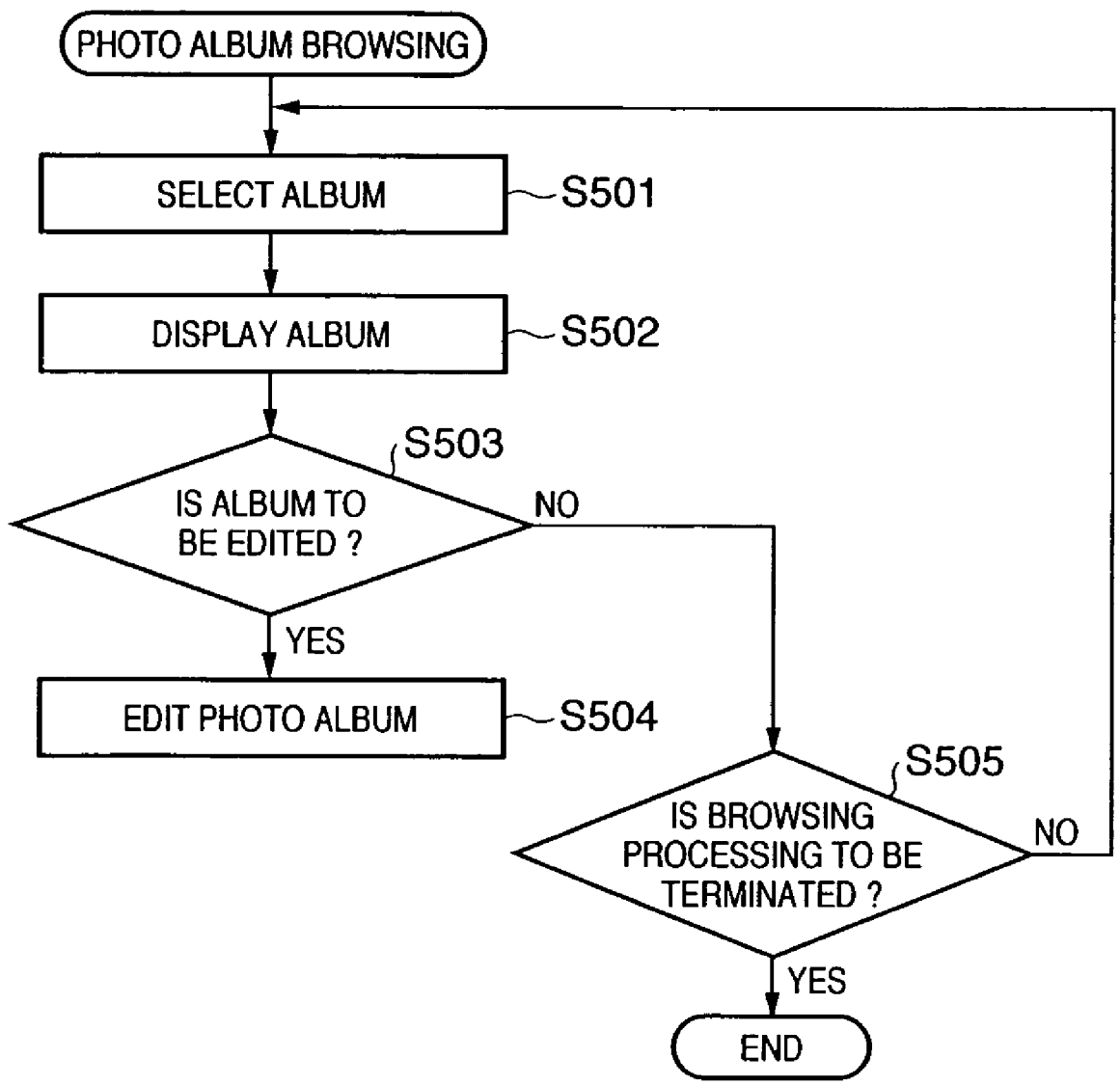
FIG. 13 is a flowchart showing the flow of photo album browsing processing in the first embodiment of the present invention.

The photo album browsing mode will be described next. The photo album browsing mode is started when the current mode of the digital camera is set to the photo album browsing mode with the mode switch 8. FIG. 13 is a flowchart showing processing in the photo album browsing mode. The sequence in FIG. 13 is executed by the control unit 1.

First of all, in step S501, one of the photo albums stored in the recording medium of the recording unit 4 is selected with the photo album selection switch 16. A composite image with image data being placed in each region is generated in accordance with the description of the layout information of the selected photo album, and is displayed on the display unit 7 (step S502). This processing is the same as the display processing described with reference to FIG. 12. When the selected layout information or image data is to be changed (YES in step S503), the current mode is shifted to the album editing mode with the mode switch 8 (step S504). When the current mode is shifted to the album editing mode, the processing in FIG. 2 is executed. If it is checked in step S505 whether or not the browsing processing is terminated by mode switching or the like, and it is determined that the browsing processing is continued, the user can select an album and browse other photo albums at the same time.

<Photo Album Print Mode>

Figure 25:
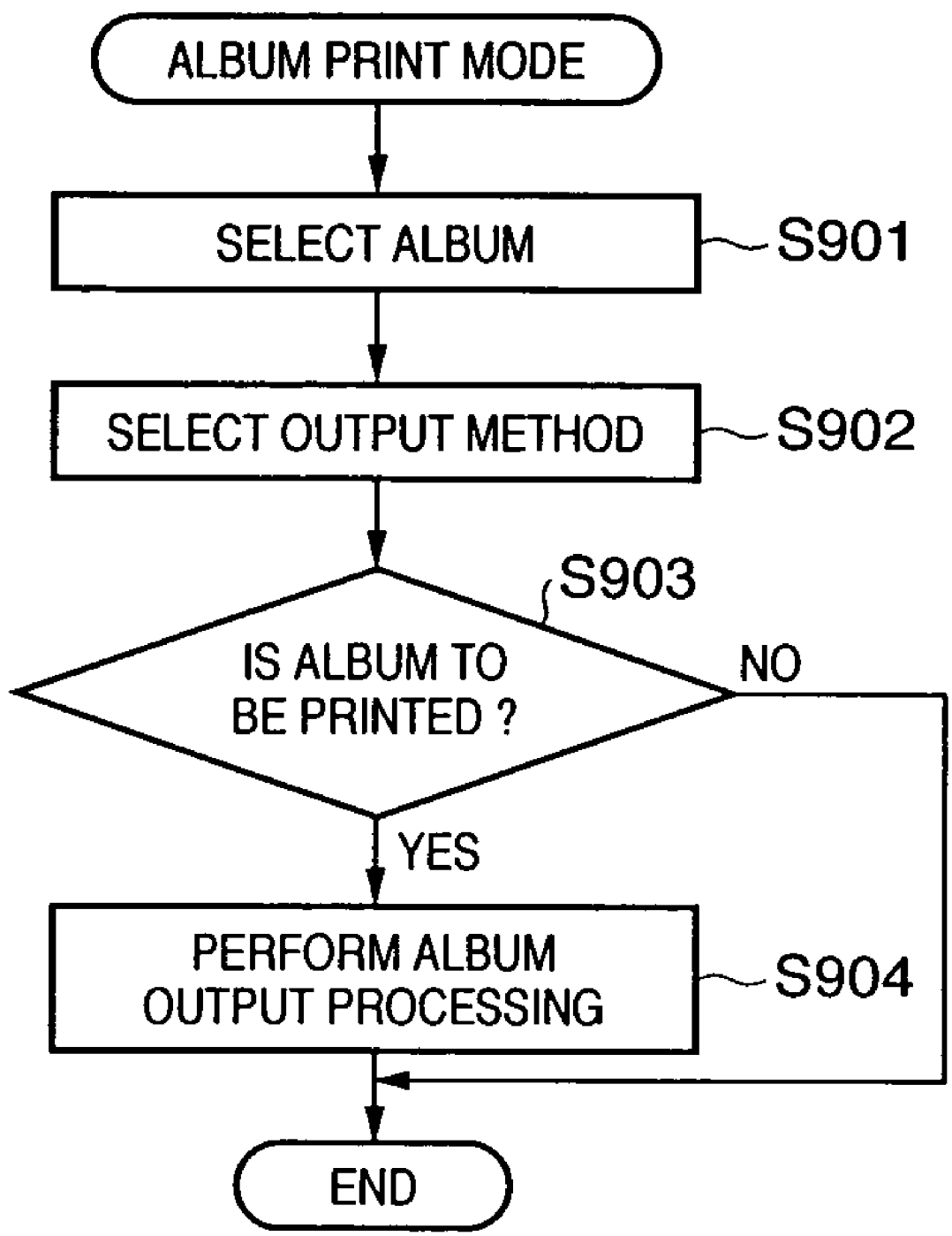
FIG. 25 is a flowchart showing the flow of processing in an album print mode in the modification to the first embodiment of the present invention.

A method of printing a generated album will be described next. This method will be described along with the flow of processing shown in FIG. 25. The sequence in FIG. 25 is executed by the control unit 1. First of all, the current mode is switched to the album print mode with the mode switch 8. In step S901, an album to be printed is selected from a recording medium 31 with the photo album selection switch 16. The thumbnails of the selected images are displayed on the display unit 7. When an album to be printed is selected, an output method for the printer 25 is selected in step S902. An output method can be selected from methods using communication interfaces such as USB and IEEE1394 and wired and wireless network interfaces.

Upon checking the connection between the device used in the selected printing method and the printer by which the album is to be printed, it is checked in step S903 whether the album is to be printed. If YES in step S903, the layout information and its image data are output to the printer in step S904. The processing is then terminated. If NO in step S903, the processing is immediately terminated. When the printer interprets the contents described according to the SVG standard, the album is printed in the same layout expression as intended by the creator.

With the above arrangement, the single digital camera allows photos obtained by image sensing to be laid out and also allows the laid-out images to be displayed or printed. Defining a template in advance makes it possible to arrange photos in accordance with a desired layout and display or print them without using an external apparatus such as a personal computer.

Modification to First Embodiment

Figure 14:
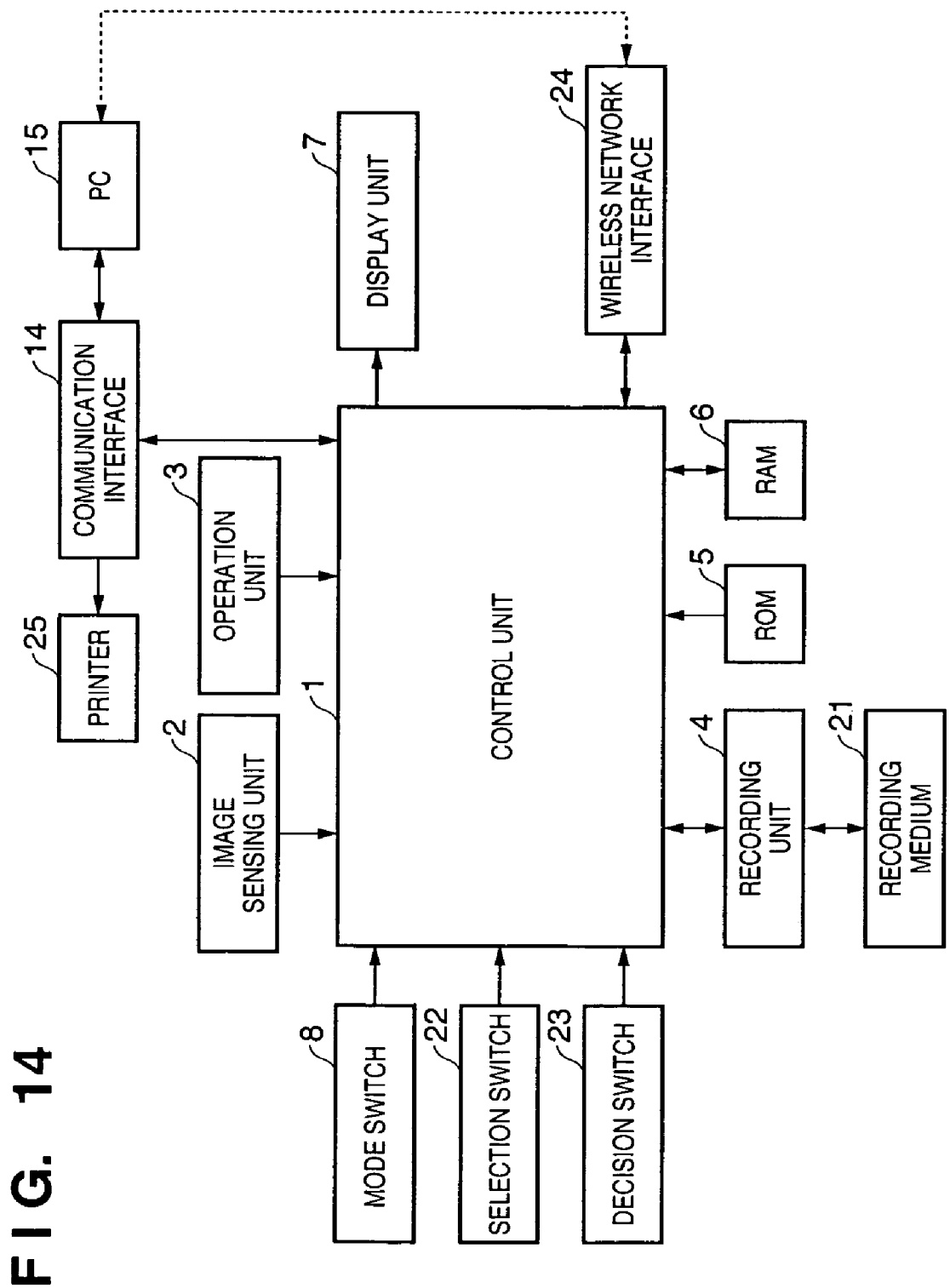
FIG. 14 is a block diagram showing the arrangement of a digital camera according to a modification to the first embodiment of the present invention.

FIG. 14 is a block diagram showing the arrangement obtained by changing the arrangement of the digital camera according to the first embodiment of the present invention. Referring to FIG. 14, the control unit 1 receives signals from the image sensing unit 2, the operation unit 3, the mode switch 8, a selection switch 22, a decision switch 23, the PC 15, and a wireless network interface 24. The control unit 1 outputs, to the recording unit 4, display unit 7, communication interface 14, and wireless network interface 24, signals representing images and the like which are to be recorded, displayed, and transmitted. The recording unit 4 is connected to the recording medium 21. The control unit 1 is connected to the ROM 5 and RAM 6.

Of the above components, the control unit 1, image sensing unit 2, operation unit 3, recording unit 4, ROM 5, RAM 6, display unit 7, mode switch 8, selection switch 22, and decision switch 23 are provided for the main body of the digital camera.

Of the above components, the image sensing unit 2 converts an object image into a digital signal and inputs it to the control unit 1. The operation unit 3 can send an operation signal to the control unit 1 upon operation of the switch. The mode switch 8 is a switch which switches the current mode of the digital camera to a photographing mode or playback mode. The playback mode includes a layout transfer mode, album creation mode, and album print mode as well as a normal playback mode. The selection switch 22 has a function of selecting layout information or image data. The decision switch 23 has a function of deciding the selected layout information or image data.

The recording unit 4 is an interface for writing and reading image data in and from the recording medium 21. The recording unit 4 also loads and writes layout information and a photo album. The communication interface 14 and wireless network interface 24 are interfaces for acquiring layout information from external units and connected to the PC 15. They are also interfaces for outputting photo albums to an external display and printer apparatus.

The display unit 7 serves both as the finder of the digital camera and a display in the playback mode. The display unit 7 also displays file names and other pieces of setting information, thereby providing information for setting layout information and issuing an instruction to execute a function.

The arrangement in FIG. 14 differs from that in FIG. 1 in that the various selection switches are integrated into the selection switch 22, the various decision switches are integrated into the decision switch 23, and the PC 15 and control unit 1 are connected to each other through the wireless network interface 24. The selection switch and decision switch can each have a plurality of functions by setting functions in accordance with the internal states in the modes in which the switch is used, processing stages in the modes, and the like.

<Layout Information>

Figure 15:
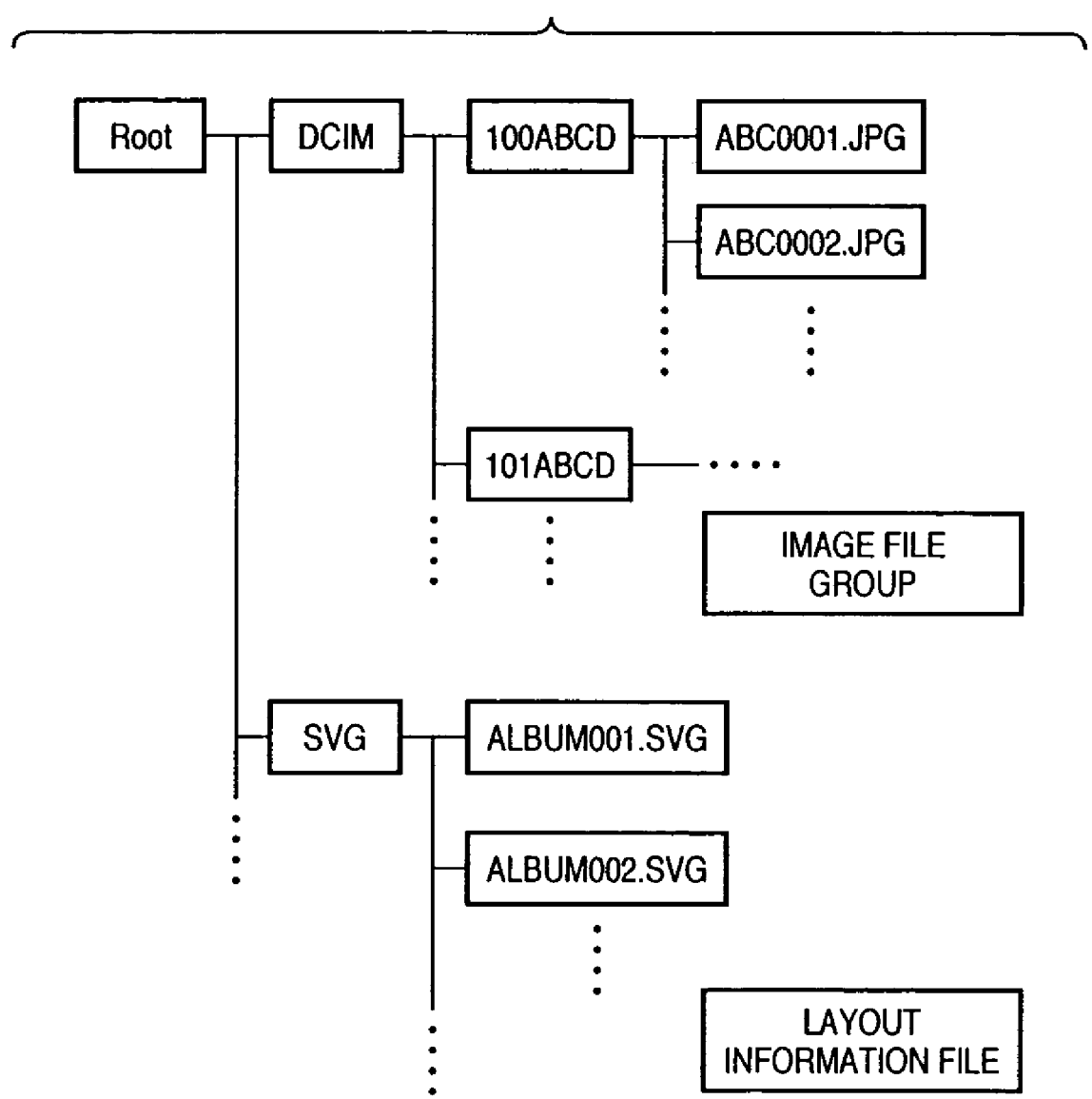
FIG. 15 is a view showing the directory arrangement of a layout information file in the modification to the first embodiment of the present invention.

FIG. 15 shows the directory arrangement of a layout information file stored in the recording medium 21. As shown in FIG. 15, a layout information file is stored in an "SVG" directory (ALBUM001.SVG or ALBUM002.SVG in FIG. 15) created as a subdirectory of the root directory in the recording medium 21.

Layout information is described by using the SVG standard and is stored as a file in the recording medium 21. FIG. 16 shows an example of a layout information template described by SVG. The information of the <title> and <desc> elements is displayed on the display unit 7 and serves as information for helping the user to determine the contents of a layout. The information of the <rect> element shows a case wherein an ornamental frame is set by setting upper left coordinates and vertical and horizontal sizes. Likewise, in the layout information, the upper left coordinates and vertical and horizontal sizes of a region are set as attributes of each <image> element. An id attribute is added to each <image> element and is serially numbered from 1 to set each image region. Such a number serves as the identifier of a region to be placed. In the layout information template, the initial value of the "xlink:href" of each <image> element is made blank. The meanings of elements other than the <title>, <desc>, and <rect> elements are the same as those in the first embodiment.

Layout information template is acquired by downloading it from a Web site on the Internet or the like into a personal computer or transferring it from a CD-ROM or the like in which it is stored. The acquired layout information is transmitted to the control unit 1 of the digital camera and stored in the RAM 6, recording medium 21, or the like.

FIG. 17 shows a state wherein the user is performing browsing operation by using the Web browser in a personal computer to externally acquire layout information. In this modification, as shown in FIG. 17, the id attributes of image data to be laid out are serially numbered from the upper left to the lower right. Setting a rule in this manner allows the user to decide the positions of photos in editing an album on the camera as well without seeing any images of the layout.

Figure 18:
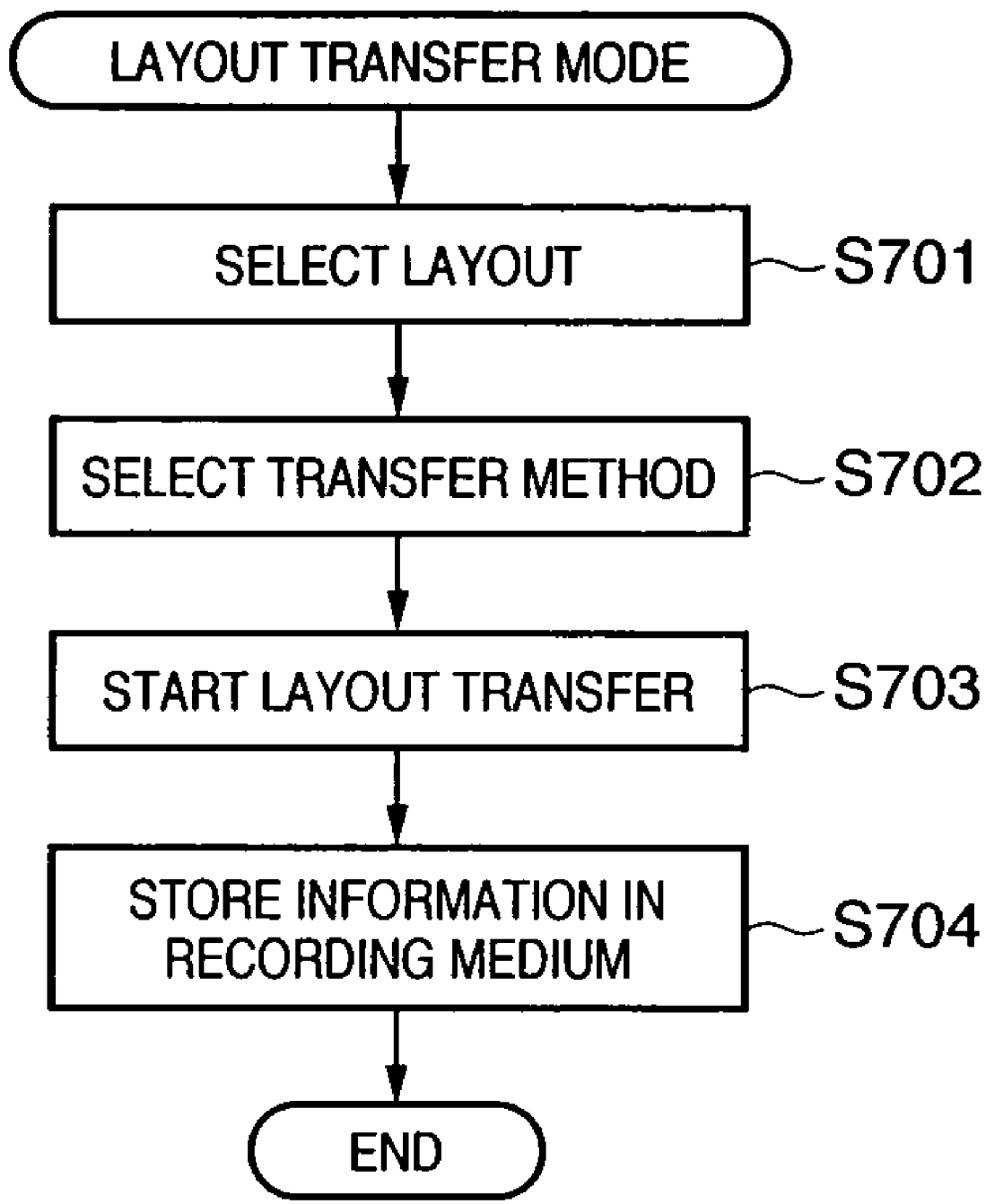
FIG. 18 is a flowchart showing the flow of layout transfer mode in the modification to the first embodiment of the present invention.

FIG. 18 shows the flow of processing in externally acquiring layout information. In this case, layout information is transferred from a personal computer to the digital camera apparatus. FIG. 18 shows the processing executed by the control unit 1 of the digital camera at the time of transfer. Prior to the execution of the processing in FIG. 18, the current mode of the digital camera is switched to the layout transfer mode with the mode switch 8 in advance.

In step S701, layout information to be transferred is selected in the personal computer. This selection may be made from the digital camera side. In step S702, the control unit 1 selects an interface to be used for transfer from the communication interface 14, wireless network interface 24, and the like, and connects it to the personal computer. Upon checking the connection between the selected transfer interface and the personal computer as a connection target, the control unit 1 starts loading the layout information in step S703, and stores it the information in the recording medium 21 in step S704. When the storage processing is complete, the layout transfer processing is terminated.

<Album Creation Processing>

Figure 19:
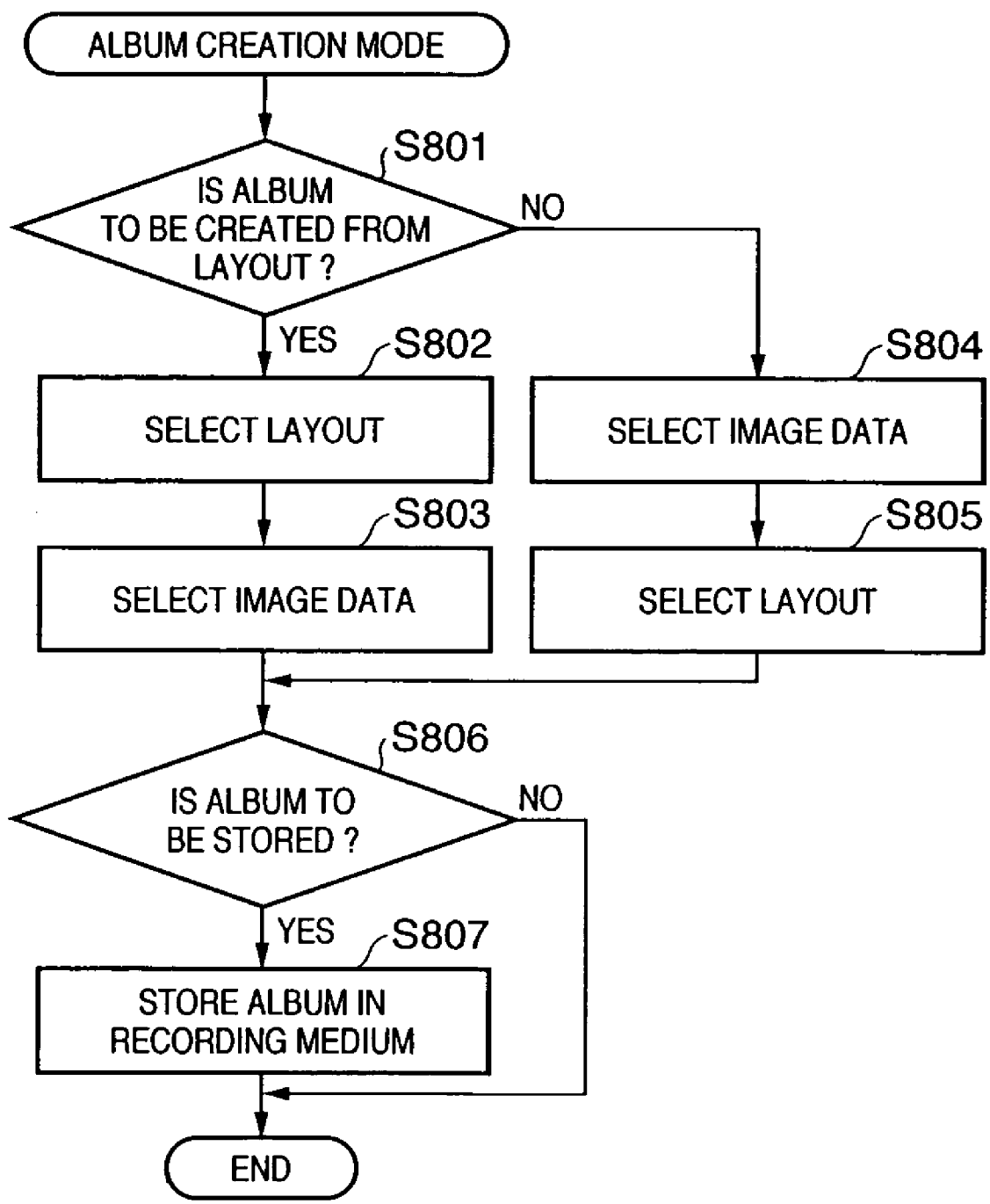
FIG. 19 is a flowchart showing the flow of album creation mode in the modification to the first embodiment of the present invention.

The album creation mode will be described next along with the flow of processing shown in FIG. 19. This processing is started when the current mode of the camera is switched to the album creation mode with the mode switch 8. This processing is executed by the control unit 1.

First of all, in step S801, it is checked whether an album is to be created from a layout or image data. The user performs this selection by deciding, with the decision switch 23, the sequence selected with the selection switch 22.

Figure 20:
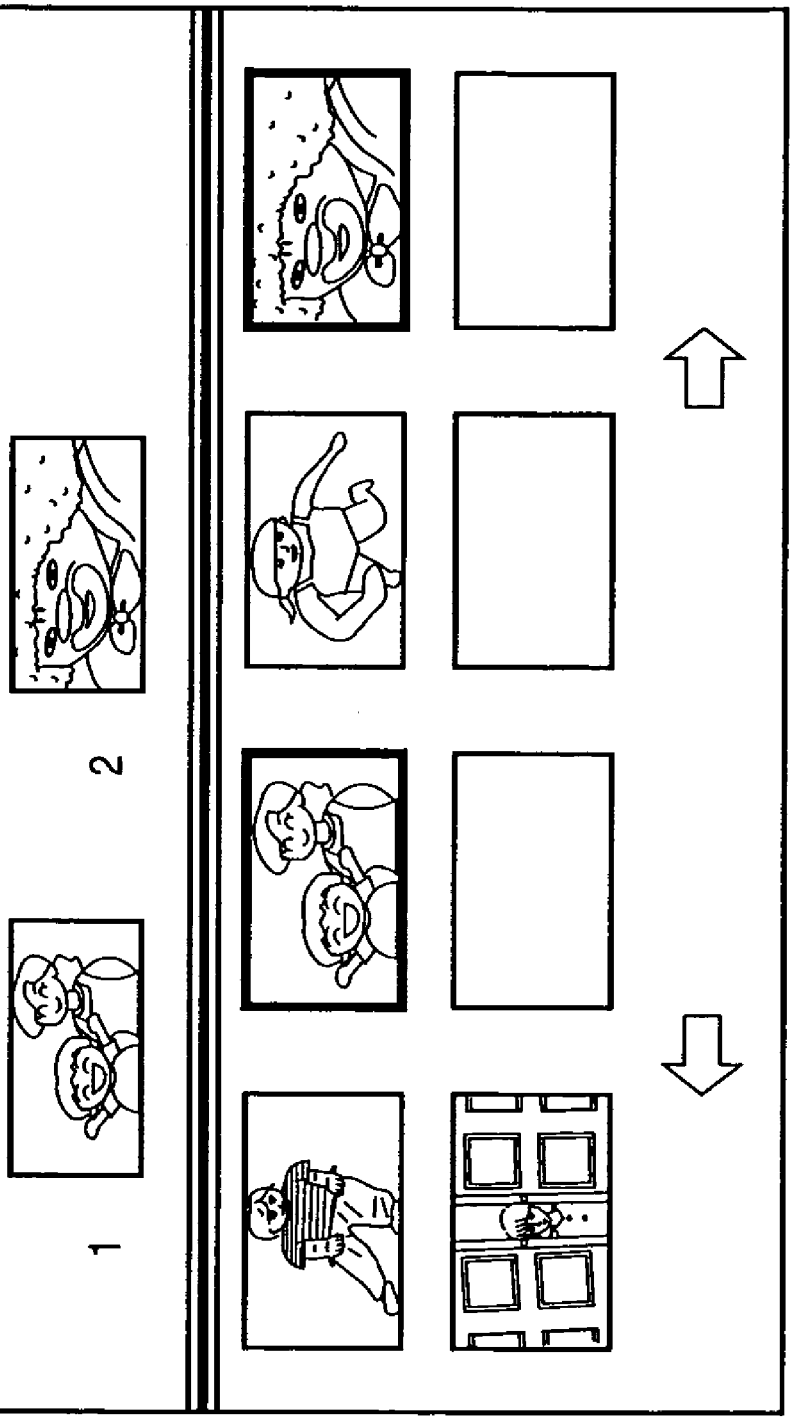
FIG. 20 is a view schematically showing the contents displayed on a window in the modification to the first embodiment of the present invention.
Figure 21:
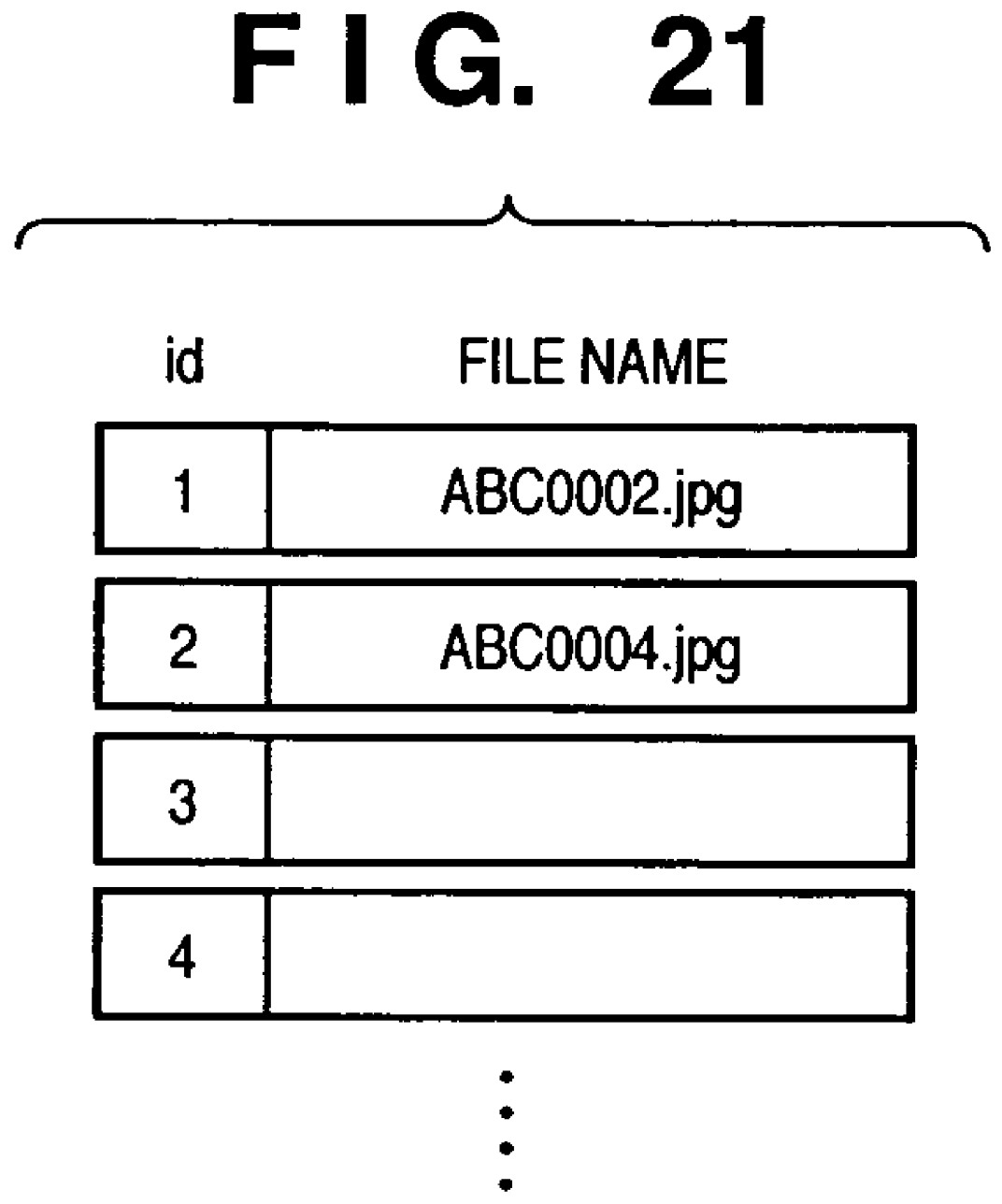

When a layout is to be selected first, the flow shifts to step S802 to select a layout by selecting a template to be used from the layout information stored in the recording medium 21. In step S803, as shown in FIG. 20, the name of the selected layout, i.e., the character string of the <title> element and the number of image data required for the layout, i.e., the number of the <image> elements are displayed on the upper part of the display unit 7, whereas the thumbnails of the images stored in the recording medium 21 are displayed on the lower part. Images to be laid out are selected from the thumbnail images. The selected images are displayed on the upper part, and the thumbnails of the selected images are framed and highlighted on the lower part. The file names of the selected images are temporarily stored in the form of a list in the RAM 6, together with the ordinal numbers in the sequence of selection, as shown in FIG. 21. The sequence of selection is made to correspond to the id attribute values of the <image> elements. The values of xlink:href of the <image> elements contained in the layout information in the recording medium 21, which have been blank, are changed to the image file names which are made to correspond to the same id attributes as the id attribute values of the <image> elements. FIG. 22 shows an example of the description of the layout information after the change. Referring to FIG. 22, the file names "ABC0002.JPG" and "ABC0004.JPG" of the file names of the selected image data are written in xlink:href of the <image> elements in FIG. 16.

Figure 24:
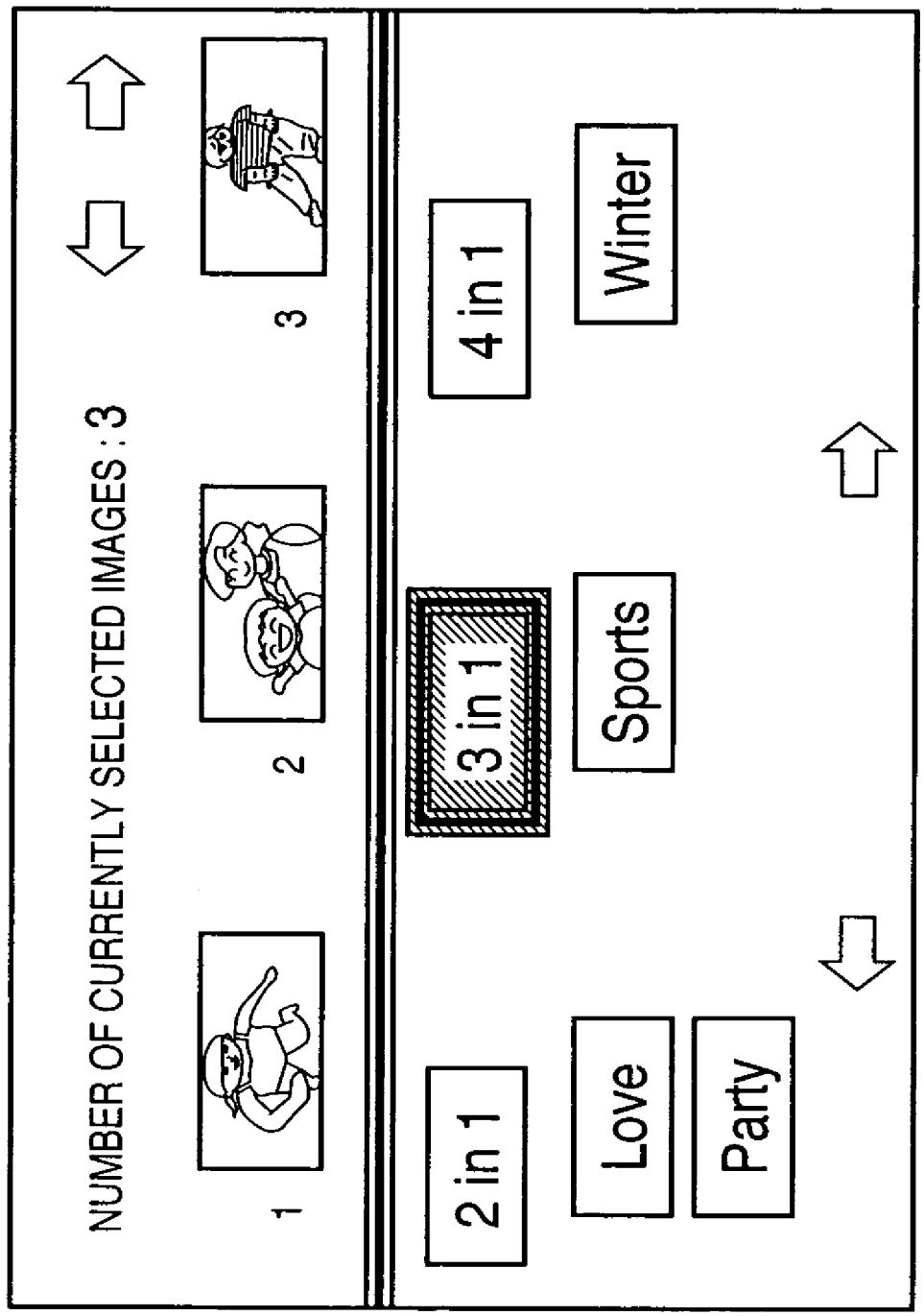
FIG. 24 is a view schematically showing the contents displayed on a window in the modification to the first embodiment of the present invention.

When image data are to be selected first, images to be laid out are selected from the image data stored in the recording medium 21 in step S804. As shown in FIG. 23, on the display unit 7, the thumbnails of candidate images are displayed on the lower part, and the thumbnails of the selected images, the ordinal numbers in the sequence of selection, and the number of images selected are displayed on the upper part. The user selects image data while referring to the images in FIG. 23. The file names of the selected images are temporarily stored in the form of a list in the RAM 6, together with the ordinal numbers in the sequence of selection, as shown in FIG. 21. In the layout selection in step S805, as shown in FIG. 24, the number of selected image data and the values of the <title> and <desc> elements, e.g., the tile and description of the template stored in the recording medium 21, are displayed. The images of the templates are not displayed. The user selects a template corresponding to the number of selected image data from the displayed templates. In the case shown in FIG. 24, since three images are selected, template "Sports" for a three-image layout is highlighted as a candidate. When layout information is selected, the values of xlink:href of the <image> elements contained in the layout information in the recording medium 21, which have been blank, are changed to the image file names which are made to correspond to the same id attributes as the id attributes values of the <image> elements.

In both the cases wherein a layout is to be selected first and wherein image data are to be selected first, it is checked in step S806 whether or not the created album is to be stored. If YES in step S806, i.e., an instruction to store the album is issued by the user, the album is stored in the recording medium 21 in step S807, and the processing is terminated. The data to be stored is the album file in the SVG format which is created in step S803 or S805. If NO in step S806, the processing is terminated without storing the album.

If the user cannot find any favorite layout even in the process of creating an album, he/she externally receives new layout information by the above layout transfer method.

In this modification, an externally received layout information template is used without any change. However, layout information is in the text format and is described by using a known description language. The layout information can therefore be edited by using the text editor in a general personal computer. Even if, for example, a favorite layout information template does not match with the number of image data to be laid out, the user can freely customize the layout information and transfer the resultant information to the digital camera.

<Photo Album Print Mode>

Figure 26:
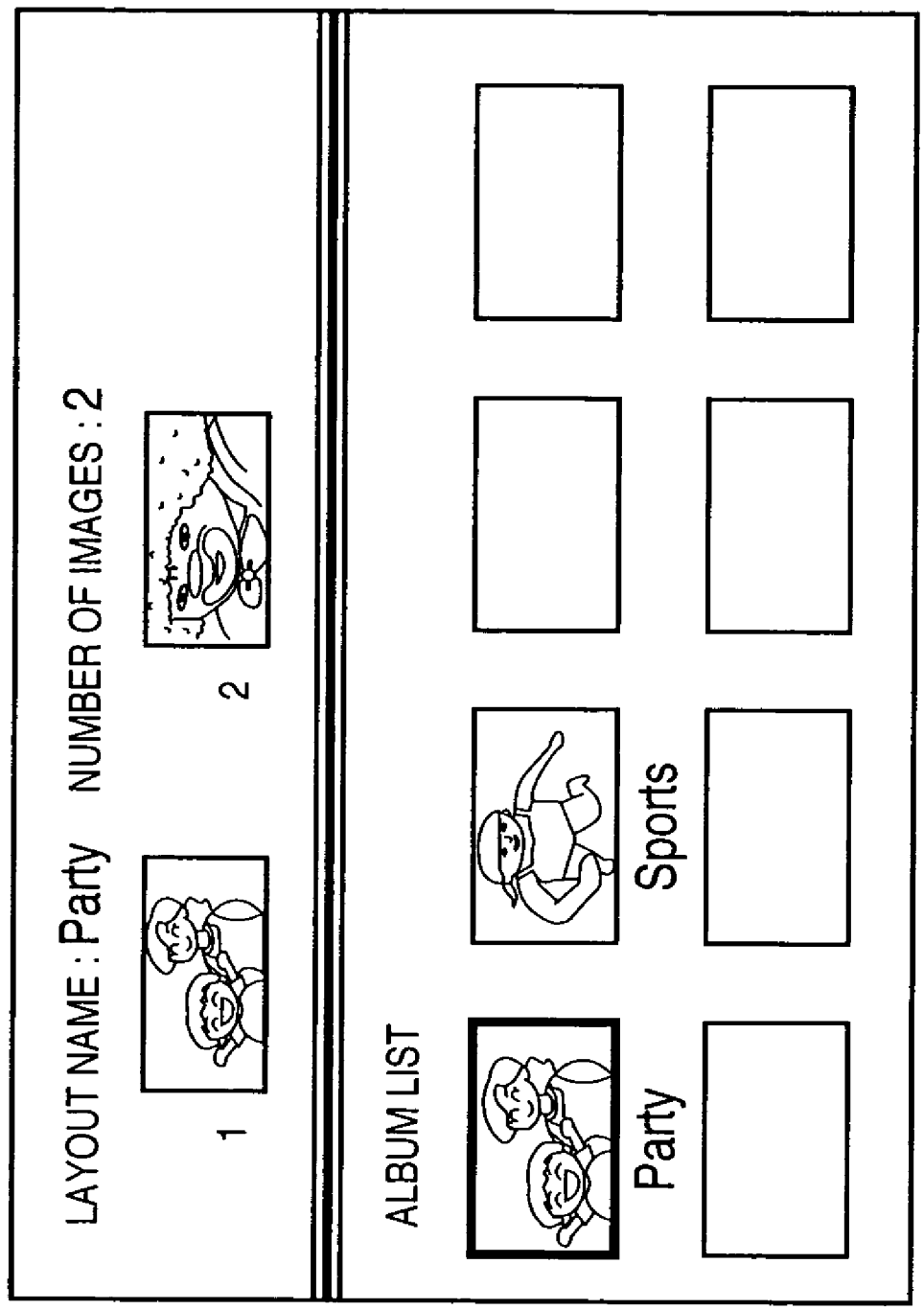
FIG. 26 is a view schematically showing the contents displayed on a window in the modification to the first embodiment of the present invention.

A method of printing a created album will be described next. This method will be described along with the flow of processing shown in FIG. 25 as in the first embodiment. The sequence in FIG. 25 is executed by the control unit 1. First of all, the current mode of the camera is switched to the album print mode with the mode switch 8. In step S901, the user selects an album to be printed from the recording medium 31 with the photo album selection switch 16. As shown in FIG. 26, album names and the thumbnails of laid out images are displayed on the display unit 7. When an album to be printed is decided, an output method for the printer 25 is selected in step S902. An output method can be selected from methods using communication interfaces such as USB and IEEE1394 and wired and wireless network interfaces.

Upon checking the connection between the device used in the selected printing method and the printer by which the album is to be printed, it is checked in step S903 whether the album is to be printed. If YES in step S903, the layout information and its image data are output to the printer in step S904. The processing is then terminated. If NO in step S903, the processing is immediately terminated. When the printer interprets the contents described according to the SVG standard, the album is printed in the same layout expression as intended by the creator.

With the above arrangement and processing sequence, the single digital camera allows photos obtained by image sensing to be laid out and also allows the laid-out images to be displayed or printed. Defining a template in advance makes it possible to arrange photos in accordance with a desired layout and display or print them without using an external apparatus such as a personal computer. In addition, in this modification, since a layout itself is not imaged, the user can lay out images even in a small display area of the digital camera while checking them. In addition, in the digital camera body, the contents of only specific elements such as a title and description are interpreted, but the description of a layout is not interpreted or imaged, and hence the processing load can be reduced.

Second Embodiment

Figure 27:
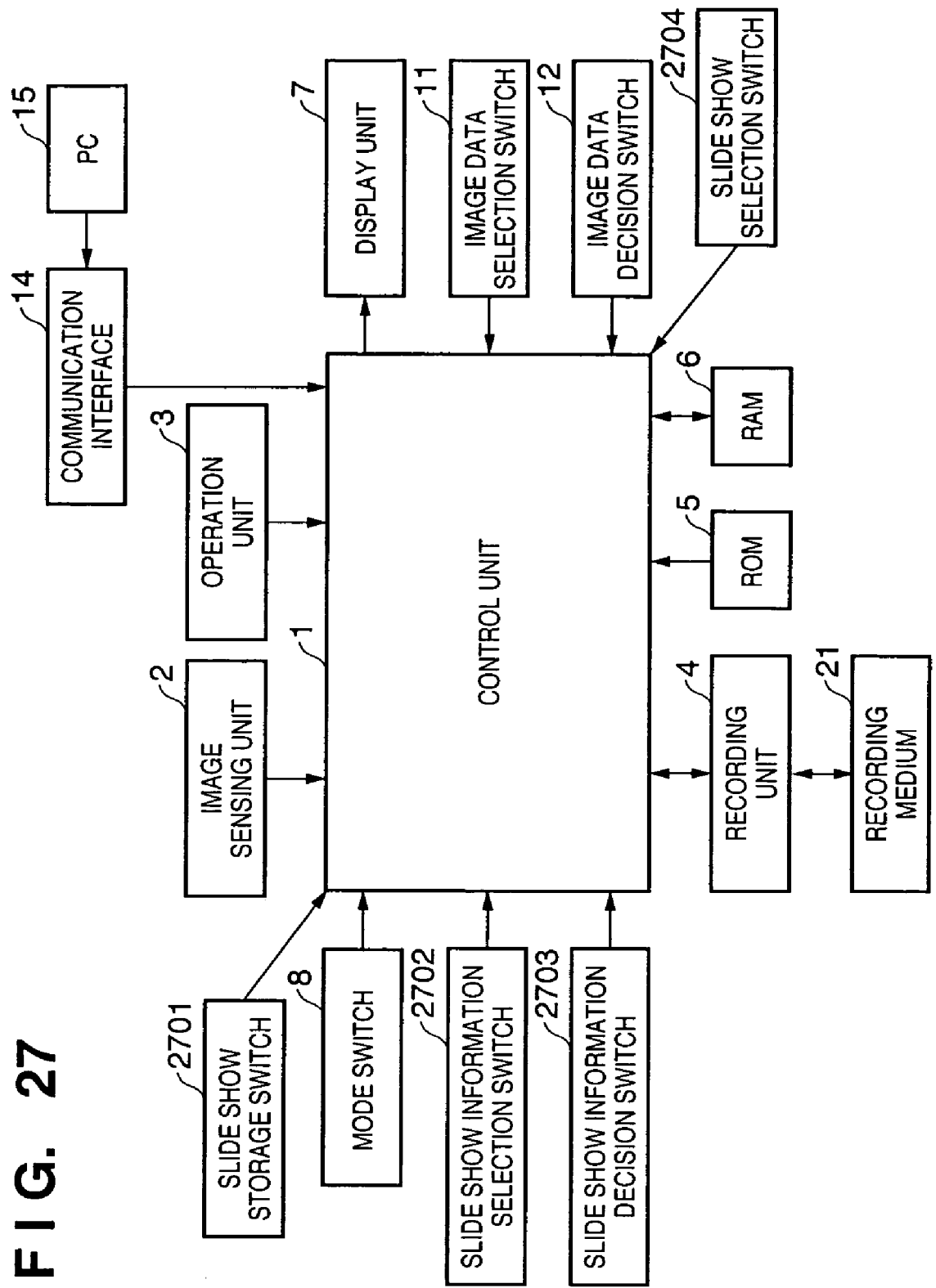
FIG. 27 is a block diagram showing the arrangement of a digital camera according to the second embodiment of the present invention.

The second embodiment of the present invention will be described below with reference to the accompanying drawings. FIG. 27 is a block diagram showing the arrangement of a digital camera according to the second embodiment of the present invention. Referring to FIG. 27, a control unit 1 receives signals from an image sensing unit 2, operation unit 3, mode switch 8, slide show information selection switch 2702, slide show information decision switch 2703, image data selection switch 11, image data decision switch 12, slide show selection switch 2704, communication interface 14, and slide show storage switch 2701. The control unit 1 outputs, to a display unit 7 and recording unit 4, signals associated with images and the like to be displayed or recorded. The control unit 1 is connected to a ROM 5 and RAM 6.

Of the above components, the control unit 1, image sensing unit 2, operation unit 3, recording unit 4, ROM 5, RAM 6, display unit 7, mode switch 8, slide show information selection switch 2702, slide show information decision switch 2703, image data selection switch 11, image data decision switch 12, slide show storage switch 2701, and slide show selection switch 2704 are provided for the main body of the digital camera.

Of the above components, the control unit 1 includes a processor, bus, I/O, and the like and controls the overall digital camera. The control unit 1 performs layout processing, a slide show, title image compositing operation, and the like as well as control for image sensing operation or predetermined image processing and the like. The image sensing unit 2 converts an object image into a digital signal and inputs it to the control unit 1. The operation unit 3 can send an operation signal to the control unit 1 upon operation of a switch. The mode switch 8 is a switch which switches the current mode of the digital camera to one of a photographing mode, playback mode, slide show creation mode, and slide show playback mode. The slide show information selection switch 2702 has a function of selecting one piece of slide show information. The slide show information decision switch 2703 has a function of deciding slide show information. The image data selection switch 11 has a function of selecting one image data. The image data decision switch 12 has a function of deciding image data. The slide show selection switch 2704 has a function of selecting one slide show. The slide show storage switch 2701 has a function of storing a slide show in the recording medium of the recording unit 4.

The recording unit 4 is an interface for recording imaged data on a recording medium 21 and loading image data from the recording medium 21. The recording unit 4 can load slide show information and can write and load a slide show. The communication interface 14 is an interface for acquiring data such as layout information from an external unit, and is connected to a PC 15 through a communication cable or radio.

The display unit 7 serves not only as the finder of the digital camera but also as a display in the playback mode. The display unit 7 also has a function of interpreting the contents described according to the SVG standard, dynamically generating an image, and displaying it. The display unit 7 therefore includes a controller including, for example, a processor and memory, independently of the control unit 1.

<Slide Show Creation Processing>

Figure 28:
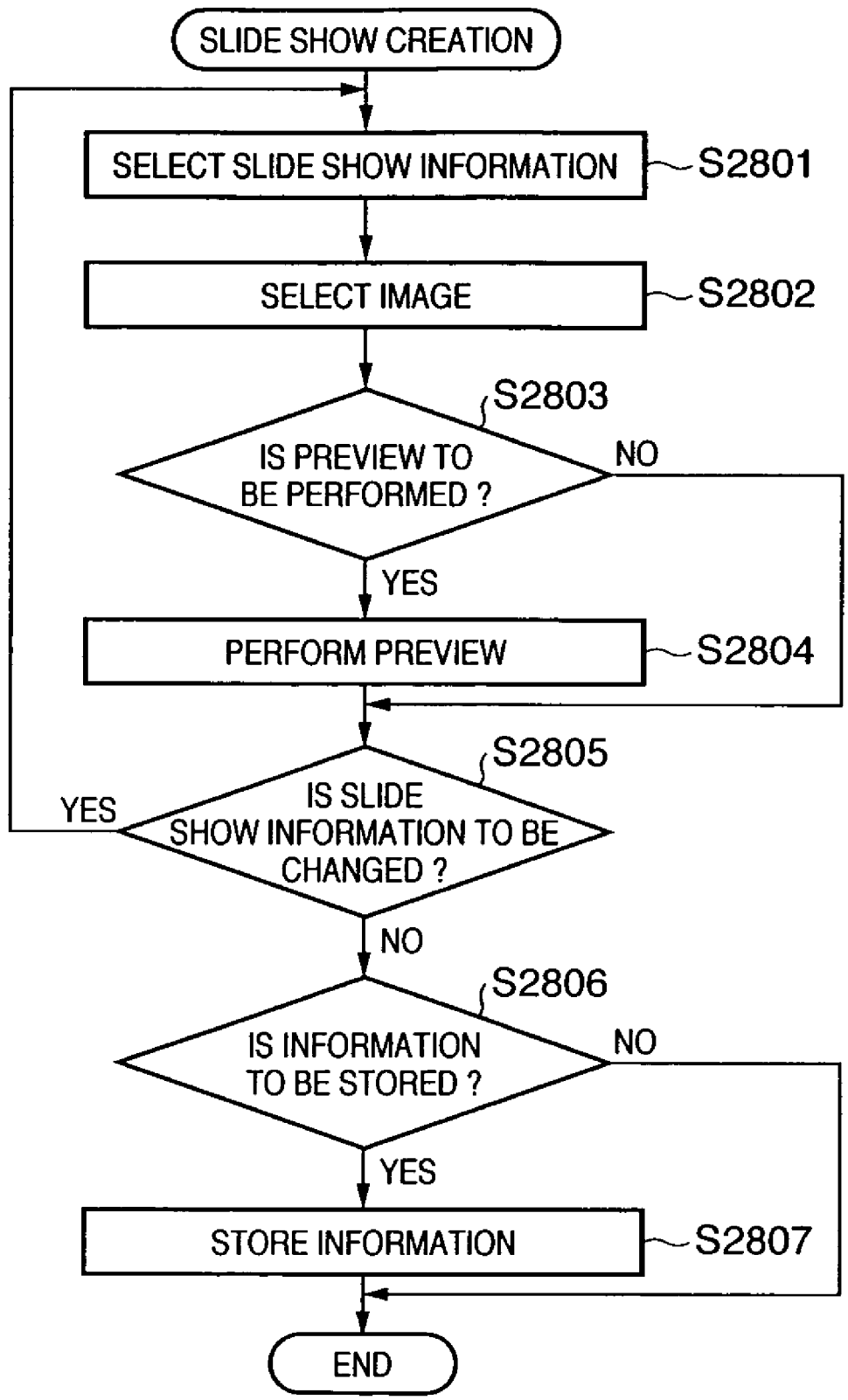
FIG. 28 is a flowchart showing the flow of slide show creation processing in the second embodiment of the present invention.

The slide show creation mode of the digital camera having the above arrangement according to this embodiment will be described next. Slide show creation processing is started when the current mode of the digital camera is set to the slide show creation mode with the mode switch 8. FIG. 28 shows the flow of slide show creation processing.

Figure 29:
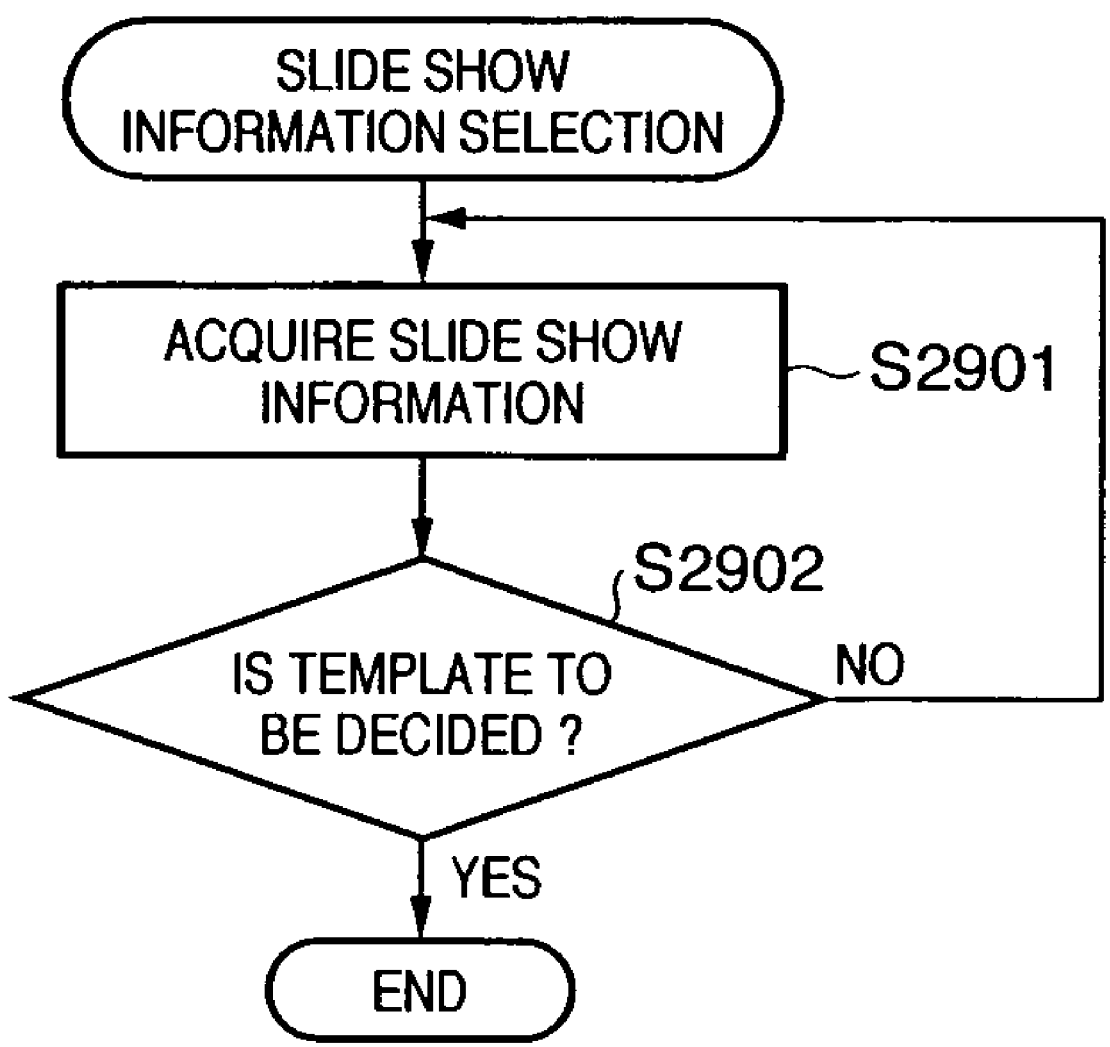
FIG. 29 is a flowchart showing the flow of slide show information selection processing in the second embodiment of the present invention.

A slide show information selection step (step S2801) will be described first along with the flow of the slide show information selection processing shown in FIG. 29. Slide show information is described by using the SVG standard. FIG. 30 shows an example of the slide show template described in SVG. Referring to FIG. 30, each <image> element represents each image data displayed in a slide show. The attribute values of the id attributes of the <image> elements are serially numbered from 1 in the order in which they are processed in the slide show. The attribute value of each xlink:href attribute indicates image data, which is made blank (" ") in the template. The effect and timing of slide switching are described by the <animateTransform> elements as the child elements of the respective <image> elements. According to an example of the slide show information shown in FIG. 30, the first slide is shown first, and the second slide slides in from the left in one sec, two sec after the first slide. The third slide slides in from the right in two sec, 3 sec after the start of the slide show. Note that a template means slide show information which defines one slide show.

A plurality of slide show templates are stored in the ROM 5 or recording unit 4. Referring to FIG. 29, of these pieces of slide show information, one piece of information, i.e., a template, is input to the control unit 1 with a slide show information selection switch 9, and stored in the RAM 6 (step S2901). A template to be used is decided with a slide show information decision switch 10 (step S2902). This processing is then terminated.

Figure 32:
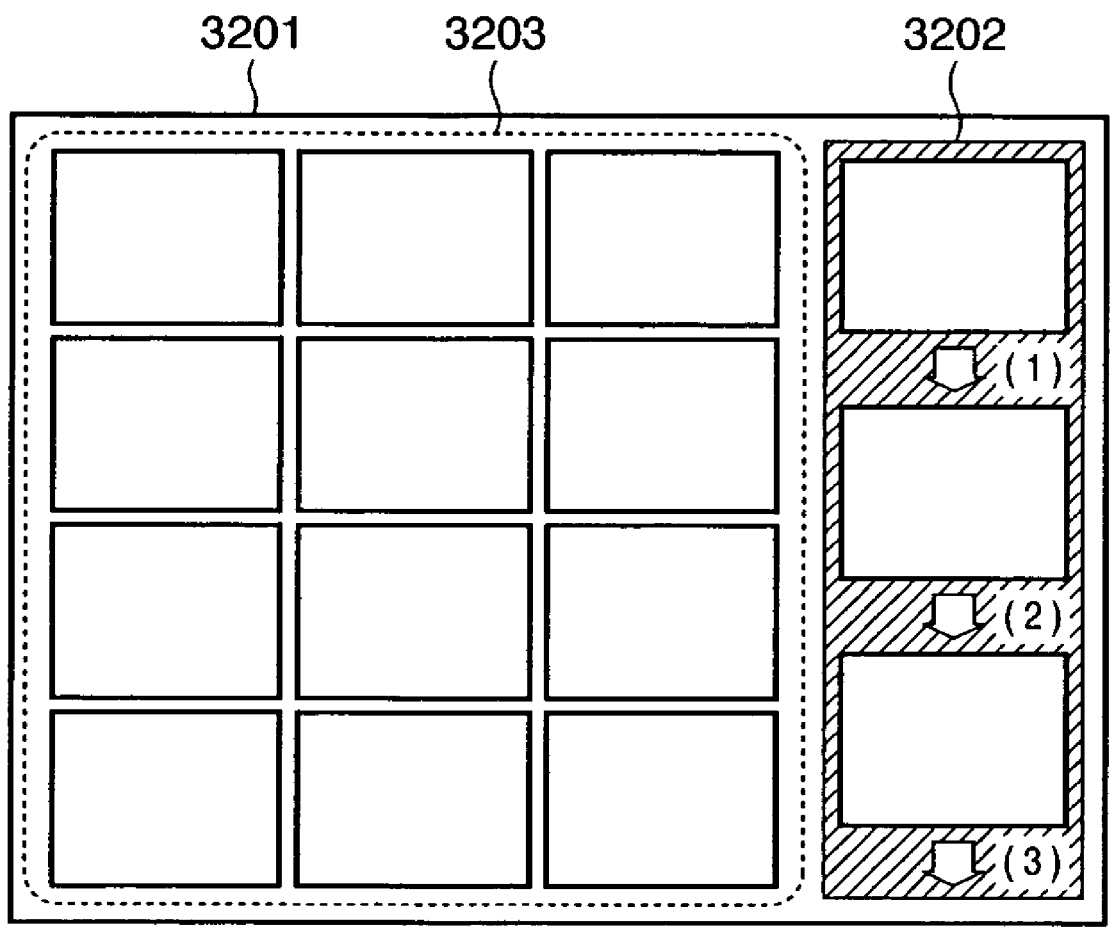
FIG. 32 is a view schematically showing the contents displayed on a window in the second embodiment of the present invention.

Subsequently, image data selection (step S2802) is performed. The image data selection step in step S2802 will be described along with the flow of the image data selection processing shown FIG. 31. First of all, the number of slides is acquired from the slide show information in the RAM 6 (step S3101). The number of slides is given by the number of <image> tags. The thumbnails of the photographic images stored in the recording medium of the recording unit 4 and the thumbnails of image data set as slides are displayed (step S3102). FIG. 32 shows a display window for thumbnails. This display window is comprised of a display unit 3201, a display portion 3202 for the thumbnails of images set as slides, and a thumbnail display portion 3203 for image data stored in the recording medium of the recording unit. Referring back to FIG. 31, the user selects one of the images displayed on the thumbnail display portion 3203 with the image data selection switch 11 and decides the selected image with the image data decision switch 12 (step S3104). In accordance with decision operation, the file names of the selected image data and slide numbers in a slide show are stored in pairs in the format shown in FIG. 33 in the RAM 6 (step S3105). As slide numbers, for example, ordinal numbers may be provided in order of selection. The slide numbers are recorded as "id"s in the RAM 6. If images have not been selected for all the slides contained in the template or image data need to be changed, the flow returns to image data selection processing (step S3104). If images have been selected for all the slides and no image data need be changed, this processing is terminated (NO in step S3105).

When the above image selection processing (step S2802) is completed, the user is made to designate in step S2803 whether to provide preview display. If it is determined that preview display is designated (YES in step S2803), preview display is provided in step S2804.

Figure 33:
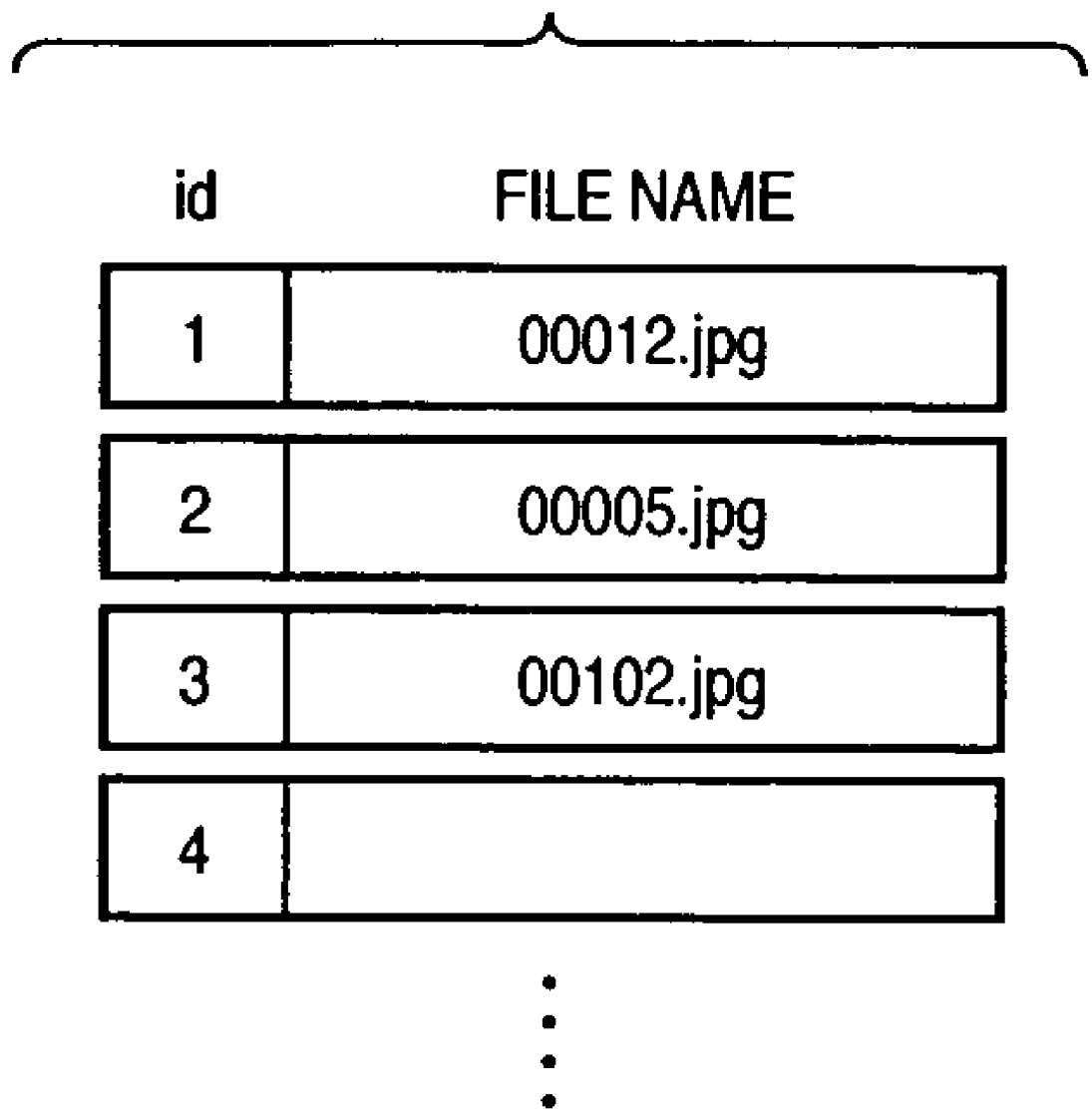
FIG. 33 is a view showing a method of storing file names in the second embodiment of the present invention.
Figure 34:
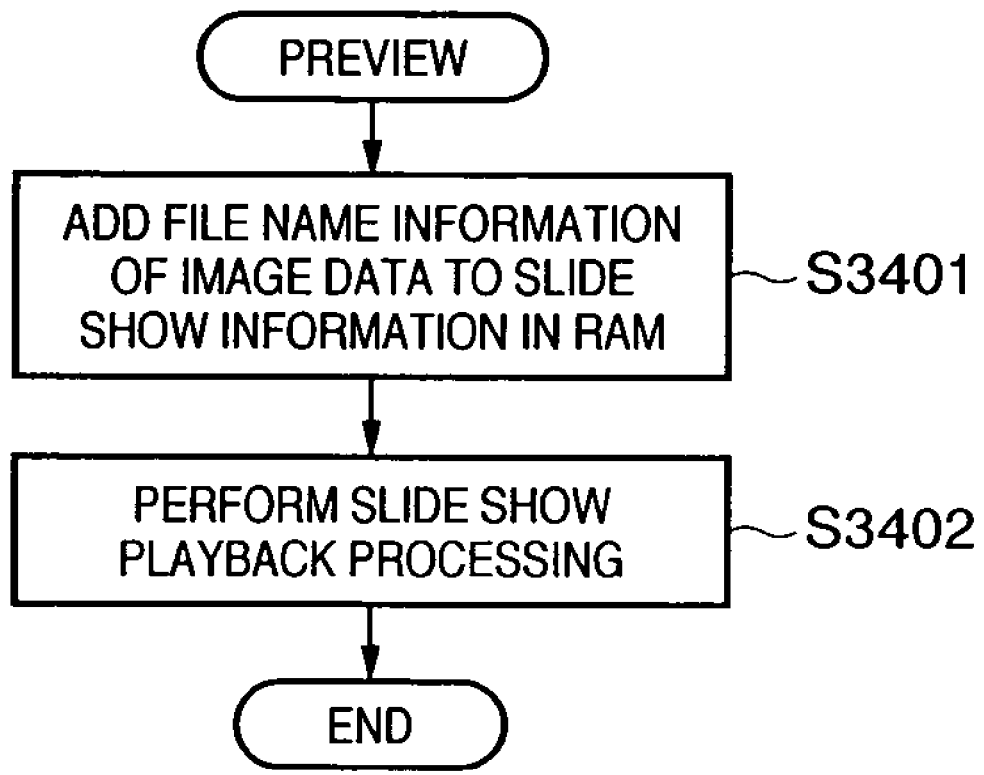
FIG. 34 is a flowchart showing the flow of slide show preview display processing in the second embodiment of the present invention.

The preview display of a slide show (step S2804) will be described along with the flow of processing shown in FIG. 34. First of all, the values of xlink:href of the <image> elements contained in the slide show information stored in the RAM 6, which have been blank, are changed to the image file names which are made to correspond to the same id attributes as the id attributes values of the <image> elements (step S3401). The information with each id being made to correspond to a file name is present in a structure like the one shown in FIG. 33 in the RAM 6. For example, the file name "0012.jpg" which is an image file with id=1 in FIG. 33 is written as the xlink:href attribute value of the <image> element with id attribute value=1 in FIG. 30. In the same manner, file names are written in the xlink:href attribute values of all the <image> elements. Slide show playback processing is then performed (step S3402) on the basis of the slide show information constructed in the RAM 6. The slide show playback processing will be described below. A slide show is described according to the SVG standard. Upon receiving information as an input, the display unit 7 interprets the description in SVG and starts playing back the slide show in accordance with the description. FIG. 35 shows an example of a slide show existing in the RAM 6. As compared with the template shown in FIG. 30, the xlink:href attribute of the <image> element is changed into the file name of the selected image data.

When the preview display is complete in this manner, it is checked whether or not the slide show information is to be changed (step S2805). If the information is to be changed, i.e., the user operates a selection switch or the like to change image data or the template, the flow returns to step S2801 to perform slide show information selection. In this case, leaving a list in which the slide numbers in the RAM 6 are associated with image file names (see FIG. 33) makes it possible to use the ordinal numbers of images in the slide show even if the slide show information is changed.

It is then checked whether or not the slide show is stored (step S2806). If it is determined that a storage instruction has been issued, i.e., the user has operated the slide show storage switch 2701, storage processing is performed (step S2807). In the storage processing, if there is slide show information constructed in the RAM 6, the information is output to the recording unit 4 to be stored as a file in the recording medium of the recording unit 4. In the above sequence, however, if preview is not to be performed, no slide show information in which selected image file names are written is created in the RAM 6. If slide show information is not completed at the time of storage, slide show information is created in the same manner as in step S3401 and stored. Obviously, slide show information may be newly created to be stored.

Note that in this embodiment, a slide show information template is present in the ROM 5 or the recording medium of the recording unit 4. However, slide show information may be acquired from an external input apparatus through a communication interface. The slide show information is in the text format, and a known description language is used. For this reason, slide show information can be edited by using a commercially available personal computer. Referring to FIG. 27, slide show information is edited by using the PC 15, and the PC 15 is connected to the communication interface 14 to transfer the slide show information to the control unit 1. The information is then stored in the RAM 6. This slide show information can be handled in the same manner as the slide show information stored in the ROM 5 or the recording medium of the recording unit 4.

<Slide Show Playback Processing>

Figure 36:
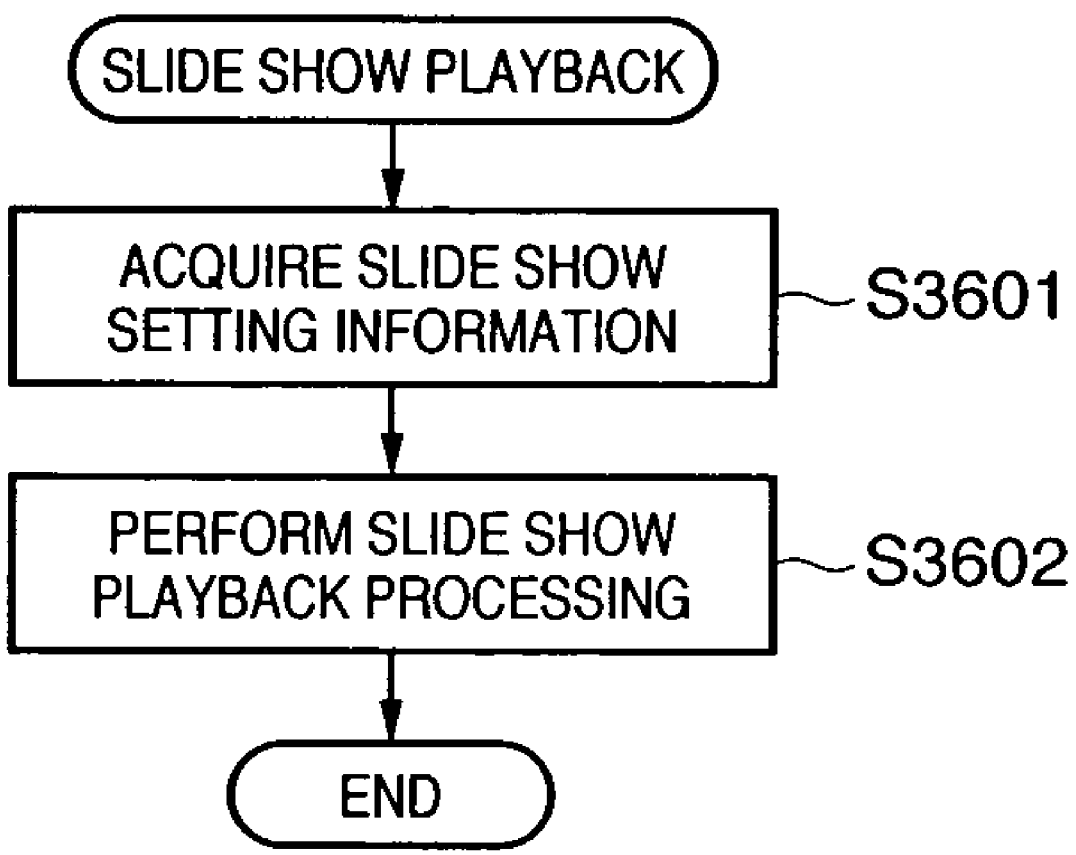
FIG. 36 is a flowchart showing the flow of slide show playback processing in the second embodiment of the present invention.

The slide show playback mode will be described next. Processing at the time of slide show playback is started when the current mode of the digital camera is set to the slide show playback mode with the mode switch 8. FIG. 36 shows the flow of slide show playback processing. By operating the slide show selection switch 2704, the slide show stored in the recording medium of the recording unit 4 is transferred to the RAM 6 (step S3601). The slide show is described according to the SVG standard. Upon receiving the information as an input, the display unit 7 interprets the description in SVG, and starts playing back a slide show in accordance with the description (step S3602). Playback processing is the same as that in step S3402 in FIG. 34. However, a display unit for playback may be an external device connected to the digital camera in playback processing.

With the above arrangement and sequence, the single digital camera of this embodiment can create a slide show from photos obtained by image sensing, and display images in the form of a slide show. Defining a slide show template in advance makes it possible to display a slide show to which a desired visual effect is given at a desired timing and in a desired sequence.

Modification to Second Embodiment

A digital camera according to a modification to the second embodiment of the present invention has the arrangement shown in FIG. 14 like the modification to the first embodiment. A description of the arrangement will therefore be omitted.

Figure 37:
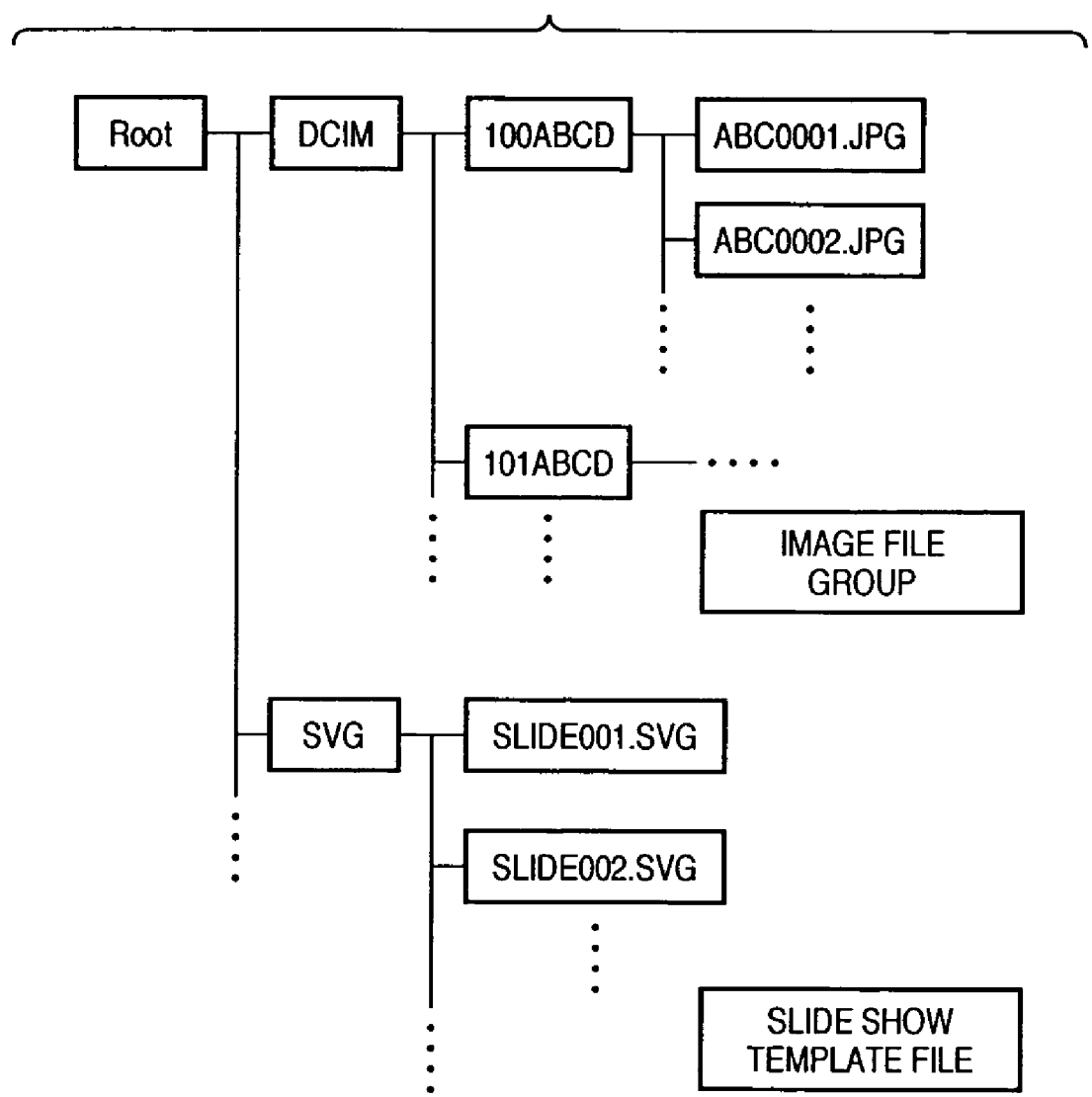
FIG. 37 is a view showing the directory arrangement of a slide show information file in a modification to the second embodiment of the present invention.

FIG. 37 shows the directory arrangement of a slide show information file stored in a recording medium 21 of the digital camera in FIG. 14. As shown in FIG. 37, the file of the slide show information is stored in the "SVG" directory created as a subdirectory of the root directory in the recording medium 21.

Slide show information is described by using the SMIL standard or SVG standard, and is stored as a file in the recording medium 21. FIG. 38 shows an example of the slide show information template described in SVG. The information of the <title> and <desc> elements is displayed on a display unit 7. This information helps the user to determine the contents of the slide show. The respective <image> element are assigned id attributes, which are serially numbered from 1. These numbers serve as identifiers representing the sequence of playback in the slide show. In the slide show information template, the initial value of the xlink:href attribute of each <image> element is made blank. The effect and timing of slide switching are described by the <animatetransform> elements as the child elements of the respective <image> elements. According to an example of the slide show information shown in FIG. 38, an image with the id attribute "1" is displayed first, and an image with the id attribute "2" slides in from the left to the right in one sec, three sec after the first image. A slide show information template is acquired by downloading it from a Web site on the Internet or the like or transferring it from a CD-ROM or the like in which slide show information is stored.

Figure 39:
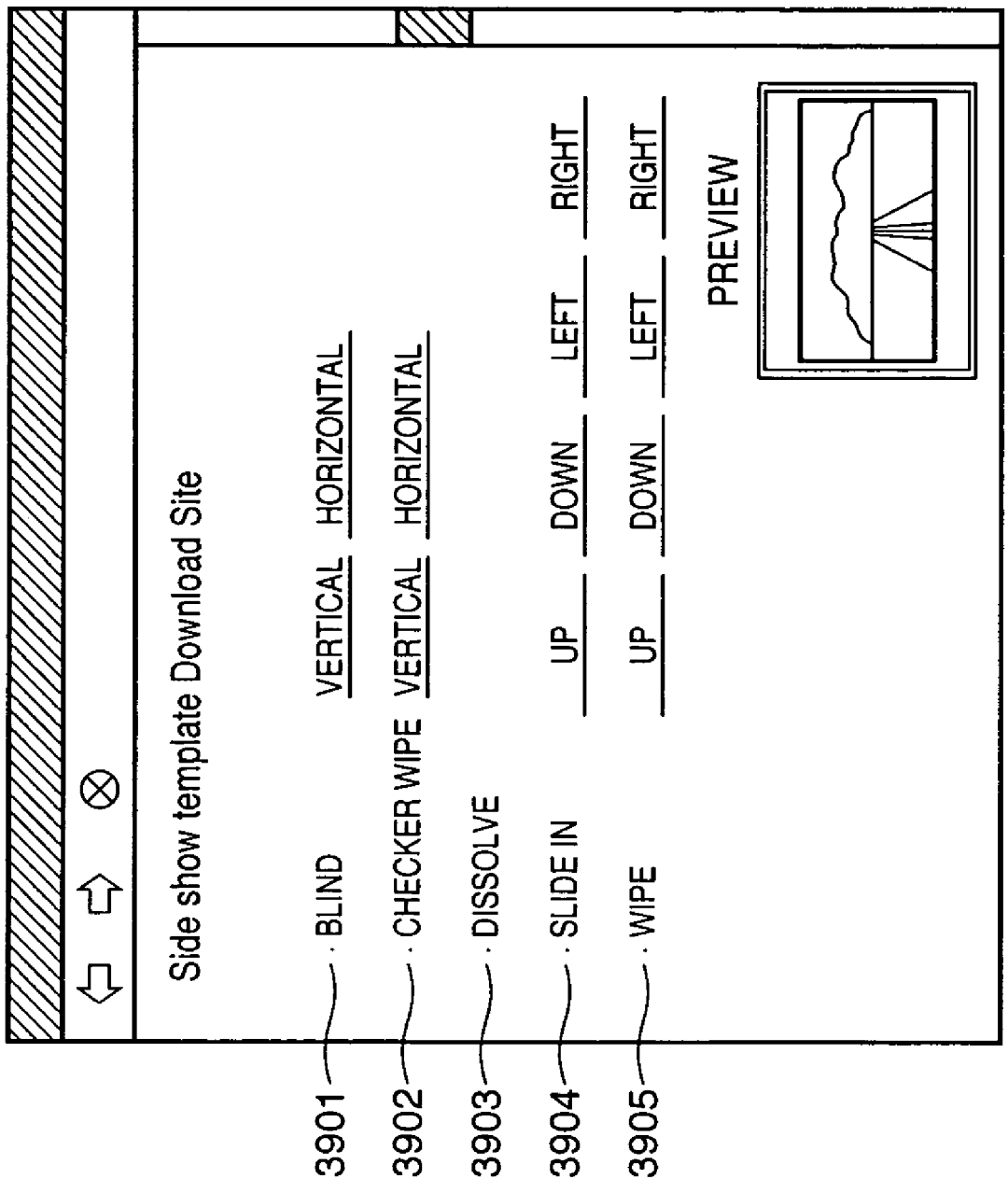
FIG. 39 is a view schematically showing a method of acquiring slide show information in the modification to the second embodiment of the present invention.

FIG. 39 shows a state wherein the user is performing browsing operation by using the Web browser in a personal computer to externally acquire slide show information. The user checks the effect of a slide show on the Web browser, and downloads the information into the personal computer. Referring to FIG. 39, a template can be selected by designating one of bars corresponding to the following effects: blind 3901, checker wipe 3902, dissolve 3903, slide in 3904, and wipe 3905, and the direction of the selected effect. The visual effect selected on a preview window can be displayed as a preview image. Referring to FIG. 39, templates corresponding to the respective effects are prepared. Obviously, however, a new template can be created by using a text editor or the like.

Figure 40:
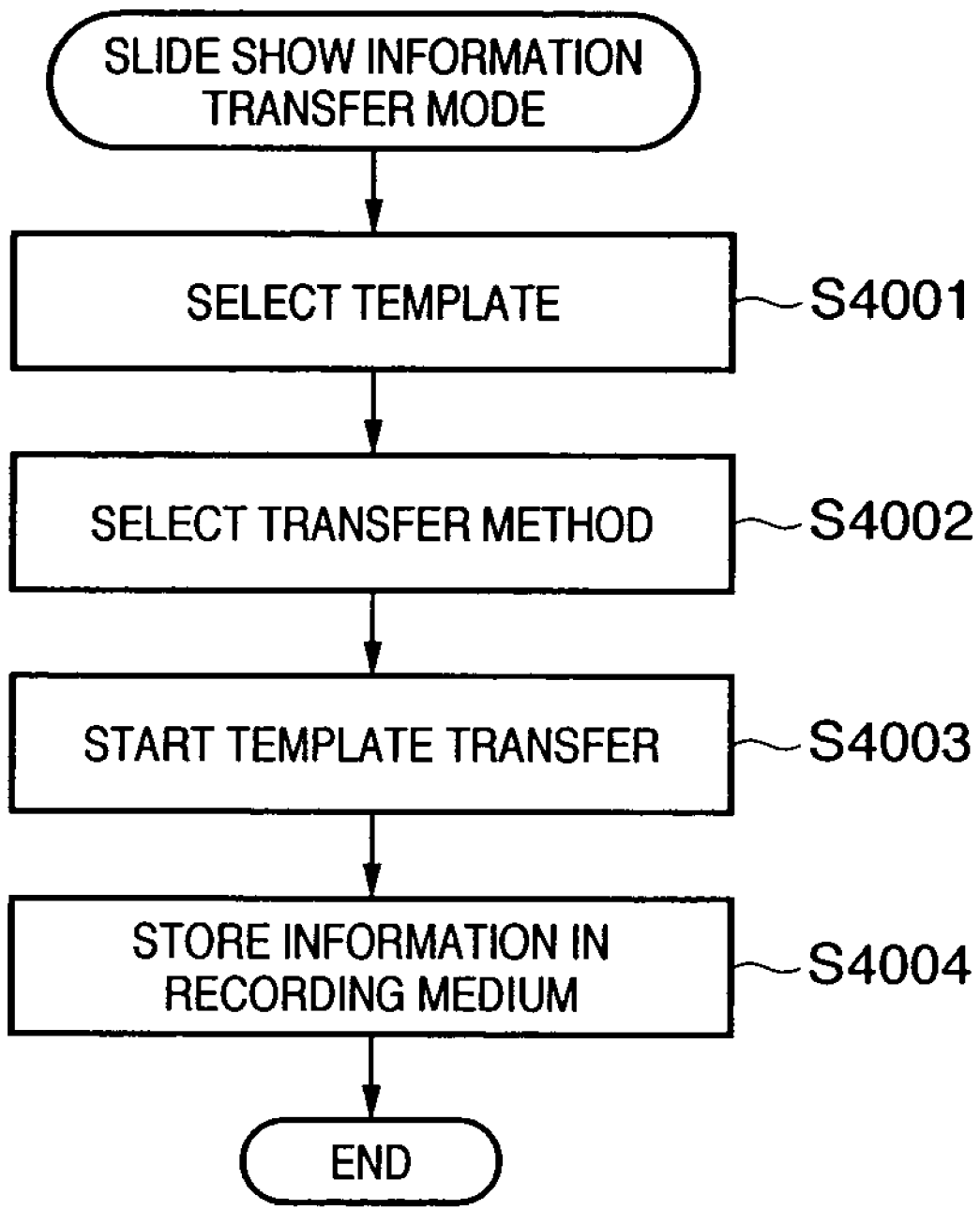
FIG. 40 is a flowchart showing the flow of processing in a slide show information transfer mode according to the modification to the second embodiment of the present invention.

FIG. 40 shows the flow of processing to be executed when the digital camera is to externally acquire slide show information. In this case, the user is to operate the personal computer to transfer slide show information to the digital camera apparatus. The current mode of the camera is switched to the slide show information transfer mode in advance with a mode switch 8. In step S4001, the user operates the personal computer to select slide show information to be transferred. This information may be designated from the digital camera. After the selection of slide show information, a control unit 1 selects an interface to be used for transfer from a communication interface 14 and wireless network interface 24 in step S4002, and connects the selected interface to the personal computer. Upon checking the connection between the selected transfer interface and the personal computer as a connection target, the control unit 1 starts transferring the slide show information in step S4003. In step S4004, the downloaded slide show information is stored in the recording medium 21. When the storage processing is complete, the slide show information transfer processing is terminated.

<Slide Show Creation Processing>

Figure 41:
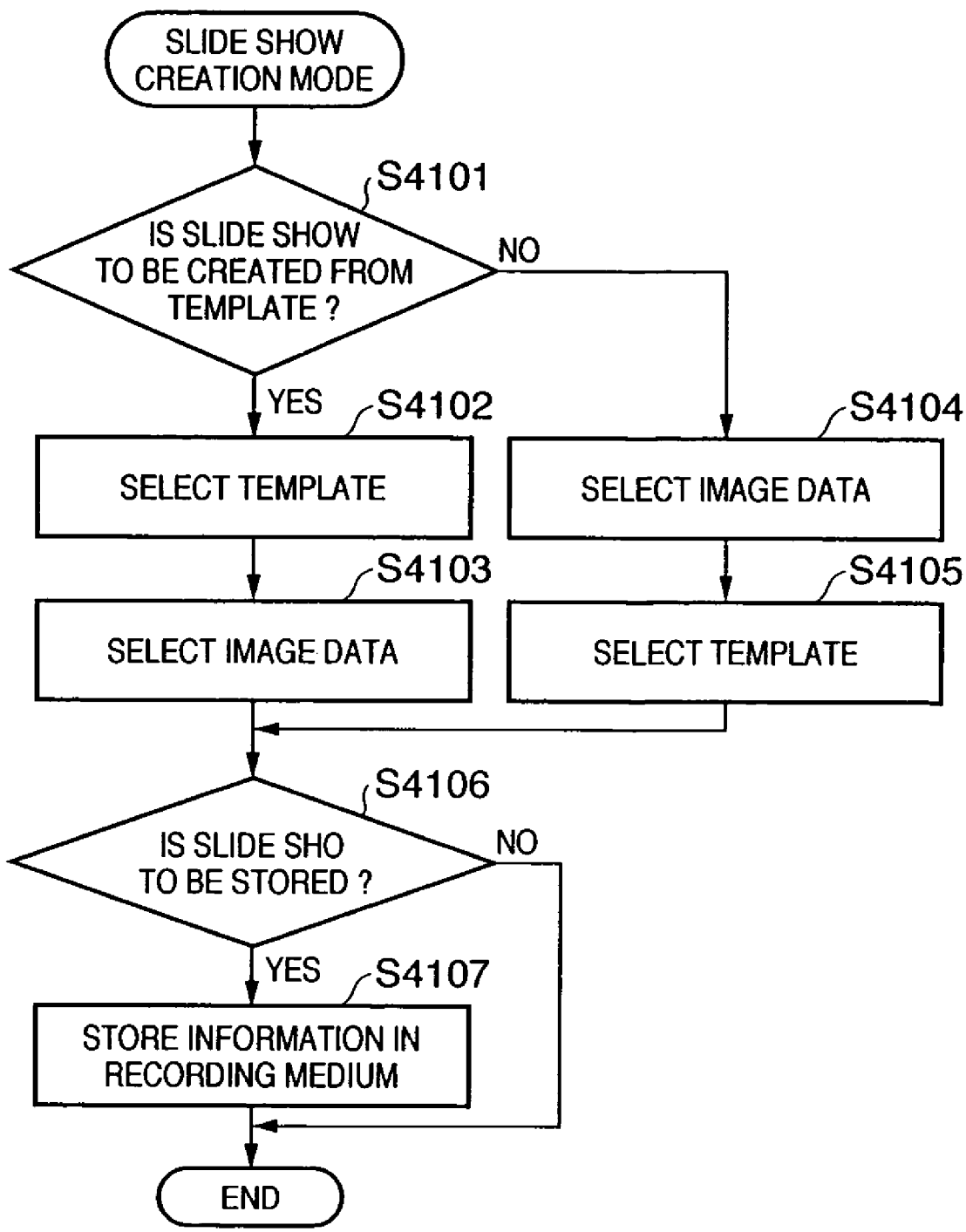
FIG. 41 is a flowchart showing the flow of processing in a slide show creation mode in the modification to the second embodiment of the present invention.

The slide show creation mode will be described next along with the flow of processing shown in FIG. 41. First of all, the current mode of the digital camera is switched to the slide show creation mode with the mode switch 8. With this operation, the processing in FIG. 41 is started. First of all, in step S4101, it is checked whether a slide show is created from a template or image data. This determination is performed on the basis of selection made by the user with a selection switch or the like.

Figure 42:
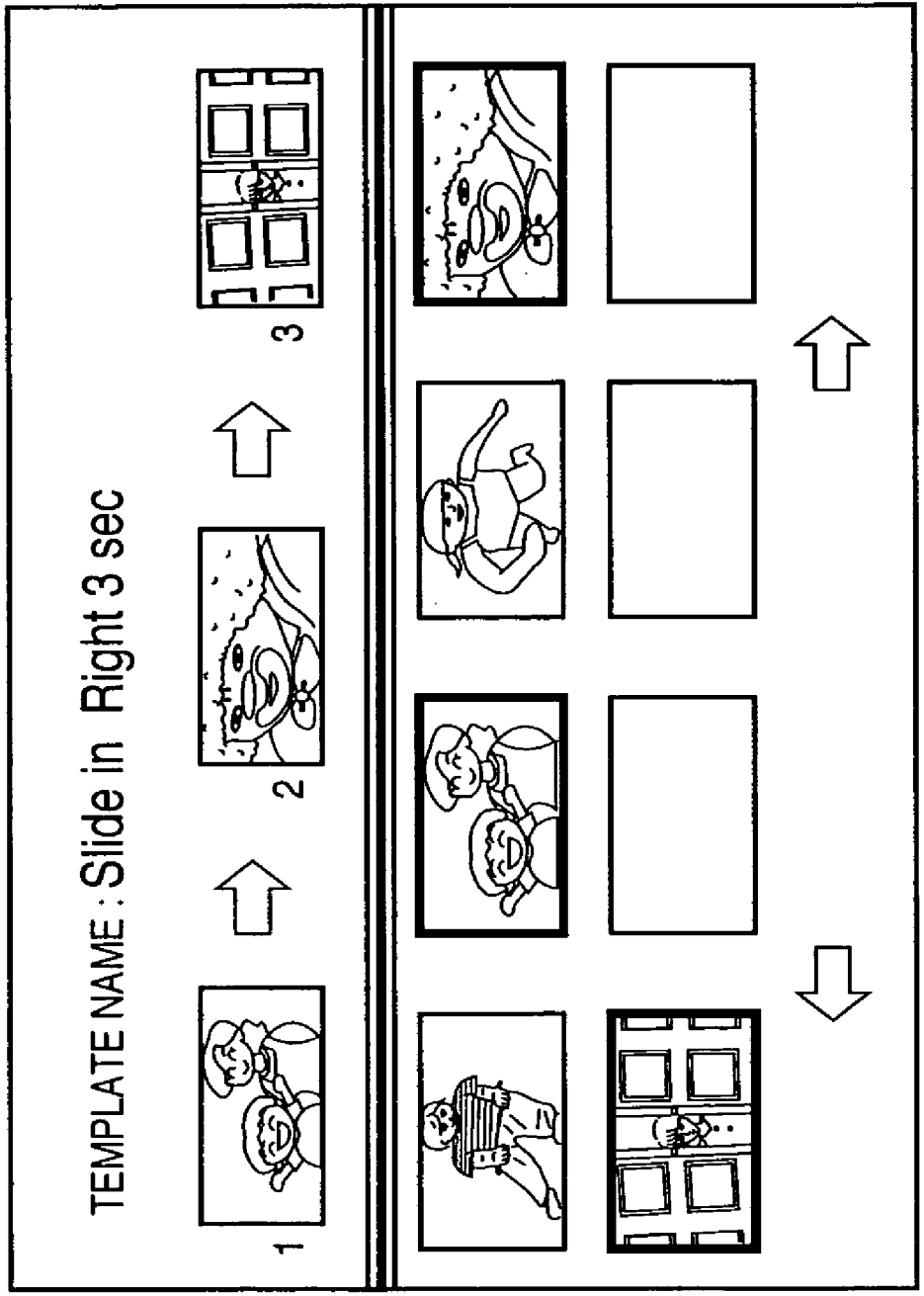
FIG. 42 is a view schematically showing the contents displayed on a window in the modification to the second embodiment of the present invention.

If it is determined that a slide show is to be created from a template, the flow advances to step S4102 to select a slide show information template stored in the recording medium 21. In step S4103, as shown in FIG. 42, the name of the selected template, other information, and the frames of the respective slides are displayed on the upper part of the display unit 7, and the thumbnails of the images stored in the recording medium 21 are displayed on the lower part. The user selects images for setting a slide show from the thumbnail images. The selected images are displayed on the upper part, the selected thumbnails are then framed and highlighted on the lower part. The file names of the selected images are assigned in the order of selection as "id"s of the image files. A list of file names which are made to correspond to "id"s is temporarily stored in the RAM 6. The values of xlink:href of the <image> elements contained in the slide show information stored in the recording medium 21, which have been blank, are changed to the image file names which are made to correspond to the same id attributes as the id attributes values of the <image> elements. FIG. 44 shows an example of the description of slide show information after the change.

First of all, when a slide show is to be created from image data, the user selects images for which slide show setting is to be made from the image data stored in the recording medium 21 in step S4104. The display unit 7 displays data similar to that shown in FIG. 23 in the first embodiment. The user selects image data from the images displayed on the lower part. The file names of the selected images are temporarily stored, as a list together with ordinal numbers as shown in FIG. 43, in the RAM 6. In template selection in step S4105, the number of selected image data and the names of the slide show information templates stored in the recording medium 21 are displayed, as shown in FIG. 45. The user selects an arbitrary template from the displayed templates. In the example shown in FIG. 45, "slide in to right" has been selected, and the corresponding portion is highlighted. The values of xlink:href of the <image> elements contained in the slide show information in the selected template are changed to the image file names which are made to correspond to the same id attributes as the id attributes values of the <image> elements.

In both the cases wherein a template is selected first and wherein image data are selected first, it is checked in step S4106 whether or not the created slide show is to be stored. If YES in step S4106, the slide show information temporarily stored in the RAM 6 (i.e., the slide show information created in step S4103 or S4105) is stored in the recording medium 21 in step S4107. The processing is then terminated. If NO in step S4106, the processing is immediately terminated.

If the user cannot find any favorite template even in the process of creating a slide show, he/she externally receives new slide show information by the above slide show information transfer method.

In this modification, an externally received slide show information template is used without any change. However, slide show information is in the text format and is described by using a known description language. The slide show information can therefore be edited by using the text editor in a general personal computer.

FIG. 46 shows the flow of processing to be performed when a created slide show is transmitted from the digital camera to a computer or the like by e-mail. The digital camera has, in a ROM or the like, a user agent program for the transmission of e-mail, and transmits e-mail by causing the control unit 1 to execute the program. First of all, the current mode of the camera is switched to the mail transmission mode in advance with the mode switch 8. With this operation, the processing in FIG. 46 is started.

In step S4601, the user selects a slide show which he/she wants to transmit from the recording medium 21. In step S4601, the thumbnails of images set in a slide show and the slide show name are displayed on the lower part of the display unit 7, and the effect and the number of images of the selected slide show are displayed on the upper part, as shown in FIG. 47. When a slide show to be transmitted is decided by operating the selection switch and decision switch, a connection means for the personal computer is selected in accordance with the designation by the user or the like. A connection means includes communication interfaces such as USB and IEEE1394 and wired and wireless network interfaces, and is selected therefrom.

When the connection between the selected connection means and the personal computer is checked, mail transmission is checked in step S4603. More specifically, a message for prompting a check is displayed on the display unit or the like to prompt the user to make a check. When the user inputs information indicating the completion of the check, the slide show information and image data selected as slides therein are transmitted in the form of an attached file from the digital camera to the destination of the mail in step S4604. The processing is then terminated. If no data is to be transmitted, the processing is immediately terminated. Since the slide show information is described by using the SMIL standard or SVG standard, the person who receives the mail can enjoy the slide show expression as intended by the creator by using general Internet browser software complying with SMIL or SVG.

With the above sequence, in the modification to this embodiment, the digital camera can singly edit photos obtained by image sensing into a slide show and display it. Defining a slide show template in advance makes it possible to display photos in accordance with a desired sequence, timing, and visual effect without using any external apparatus such as a personal computer. In addition, in this modification, since a template itself is not imaged, the user can create a slide show even in a small display area of the digital camera while checking images. In addition, in the digital camera body, the contents of only specific elements such as a title and description are interpreted, but the description of a slide show is not interpreted and imaged, and hence the processing load can be reduced.

In addition, since e-mail transmission can be selected as an output method, a created slide show can be transmitted to even a remote computer or the like. With regard to this e-mail transmission, this method can also be applied to an album in the first embodiment.

Third Embodiment

<Arrangement of Digital Camera>

Figure 48:
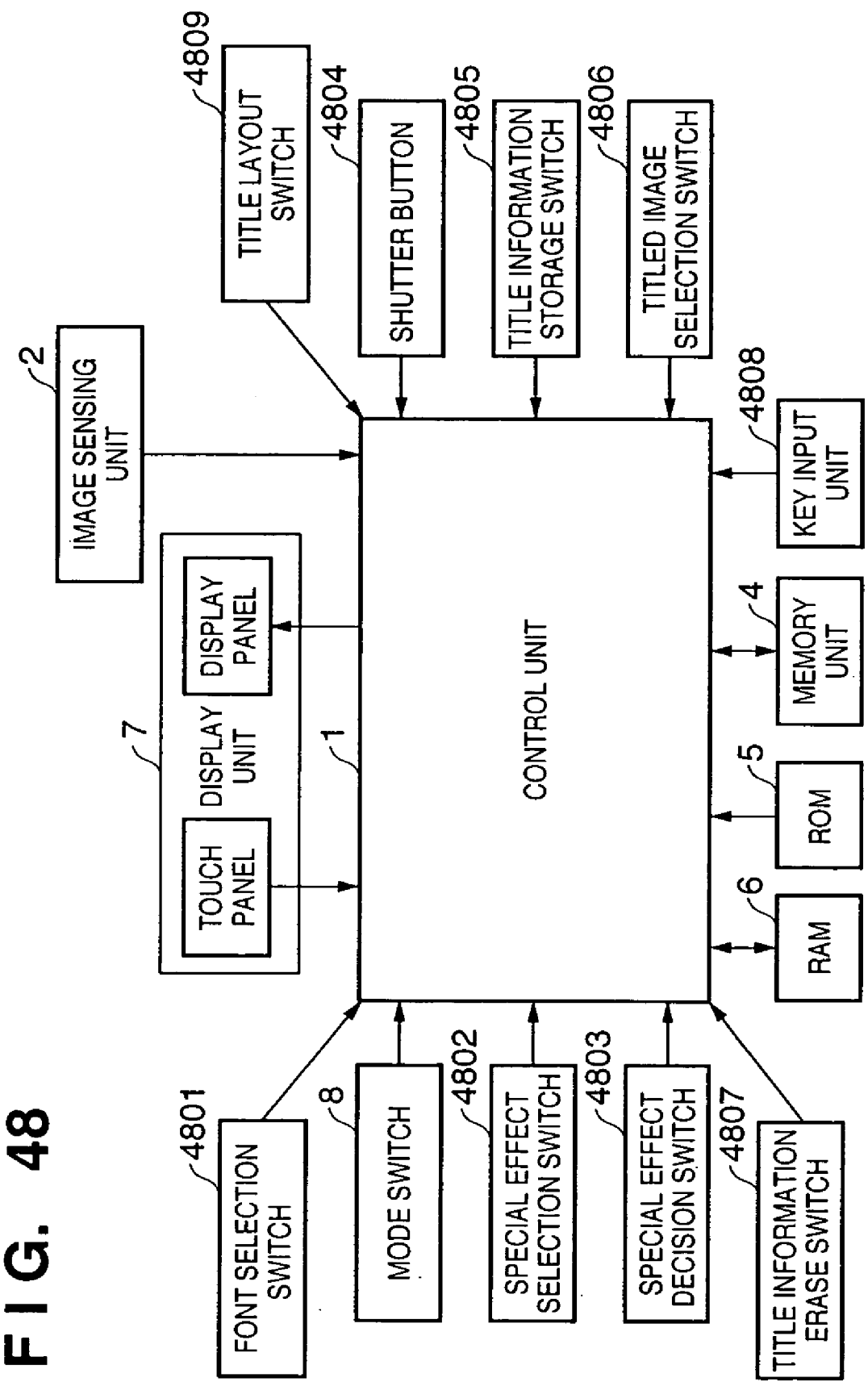
FIG. 48 is a block diagram showing the arrangement of a digital camera according to the third embodiment of the present invention.

FIG. 48 is a block diagram showing the arrangement of a digital camera according to the third embodiment of the present invention. Referring to FIG. 48, a control unit 1 receives signals from an image sensing unit 2, mode switch 8, special effect selection switch 4802, special effect decision switch 4803, shutter button 4804, title information storage switch 4805, titled image selection switch 4806, title information erase switch 4807, font selection switch 4801, key input unit 4808, and title layout switch 4809. The control unit 1 outputs data to a recording unit 4. The control unit 1 is connected to a RAM 6 and ROM 5, and controls the overall digital camera by executing the programs stored in the ROM 5.

Of the above components, the image sensing unit 2 converts an object image into a digital signal and inputs it to the control unit 1. The mode switch 8 is a switch for switching the current mode of the digital camera to a photographing mode or playback mode.

The recording unit 4 is an interface for recording and loading image data on and from a recording medium. The recording unit 4 can write and load title information.

The display unit 7 is divided into two portions, namely a touch panel and display panel. The display panel portion is the finder of the digital camera and also serves as a display in the playback mode. The display unit 7 also has a function of interpreting the contents described according to the SVG standard, dynamically creating an image, and displaying it. The display unit 7 therefore includes a processor and memory independently of the control unit 1. The other portion, i.e., the touch panel portion, has a function of converting a contact with an input device such as a pen into a digital signal, and outputting it to the control unit 1.

The key input unit 4808 is a device which is incorporated in the camera body and is used to input characters with the digital camera. It suffices if this device is implemented by hardware or implemented by software like a so-called a virtual keyboard.

<Title Creation Processing>

Figure 49:
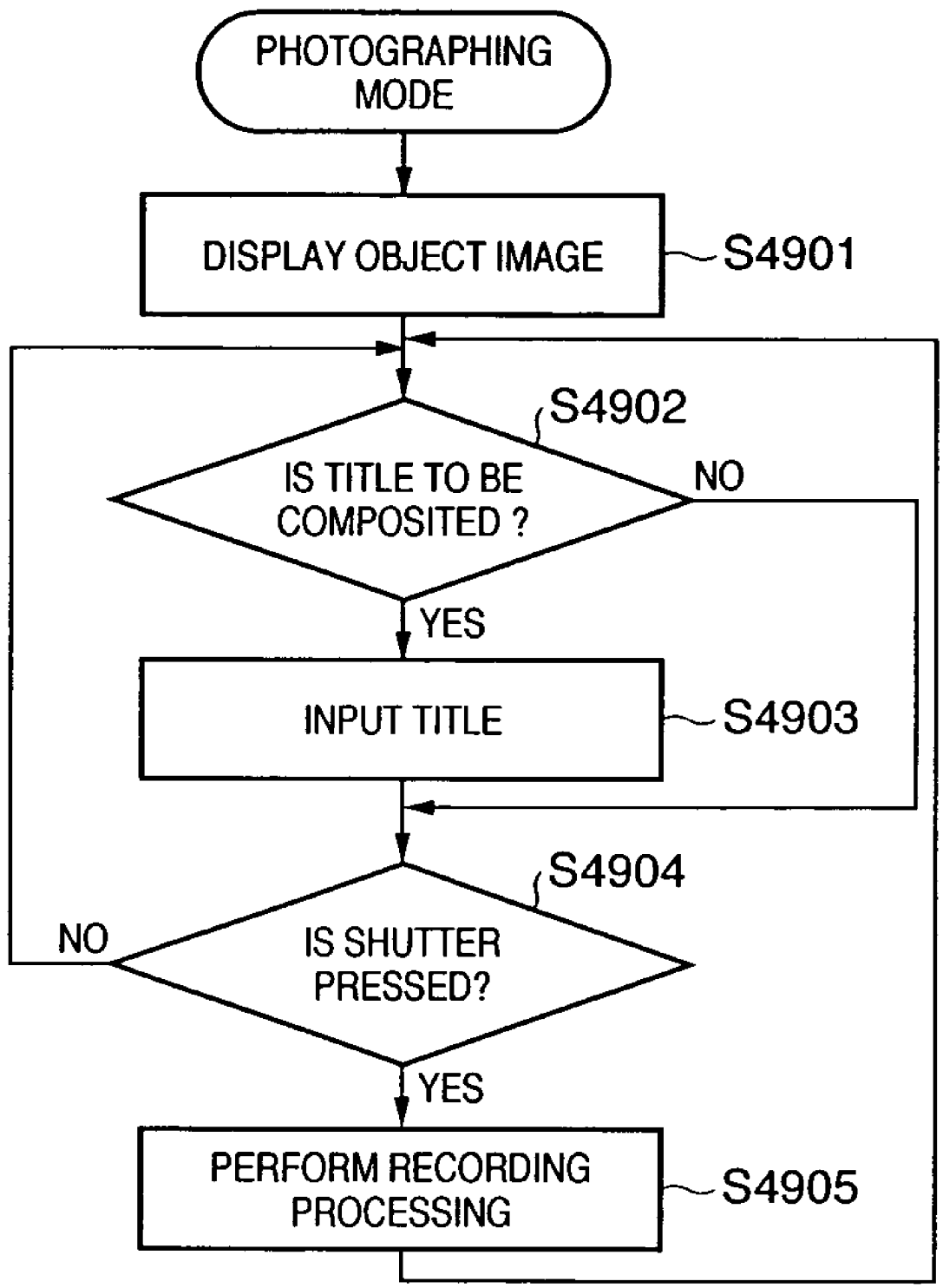
FIG. 49 is a flowchart showing the flow of processing at the time of photographing operation in the third embodiment of the present invention.

The photographing mode in the digital camera having the above arrangement according to this embodiment will be described next. Processing in the photographing mode is started by the control unit 1 when the current mode of the digital camera is set to the photographing mode with the mode switch 8. FIG. 49 shows the flow of processing in the photographing mode.

First of all, the image sensing unit 2 converts an object image into a digital signal and inputs it to the control unit 1. The image sensing unit 2 further transfers the signal to the display panel of the display unit 7. The display unit 7 displays the digital image signal as an image on the display panel (step S4901). It is then checked whether or not a title is composited (step S4902). If the title is composited, an SVG document (see FIG. 51) which is a title information template in the ROM 5 is transferred to the RAM 6 to store it as title information. The flow then advances to step S4903. Note that a check on whether or not to composite the title can be realized by checking whether or not predetermined key input is made by the user with the key input unit 4808, by determining a signal or data corresponding to the key. The SVG document of the title information template contains one <image> element. The title is then input to the title information template (step S4903).

Figure 50:
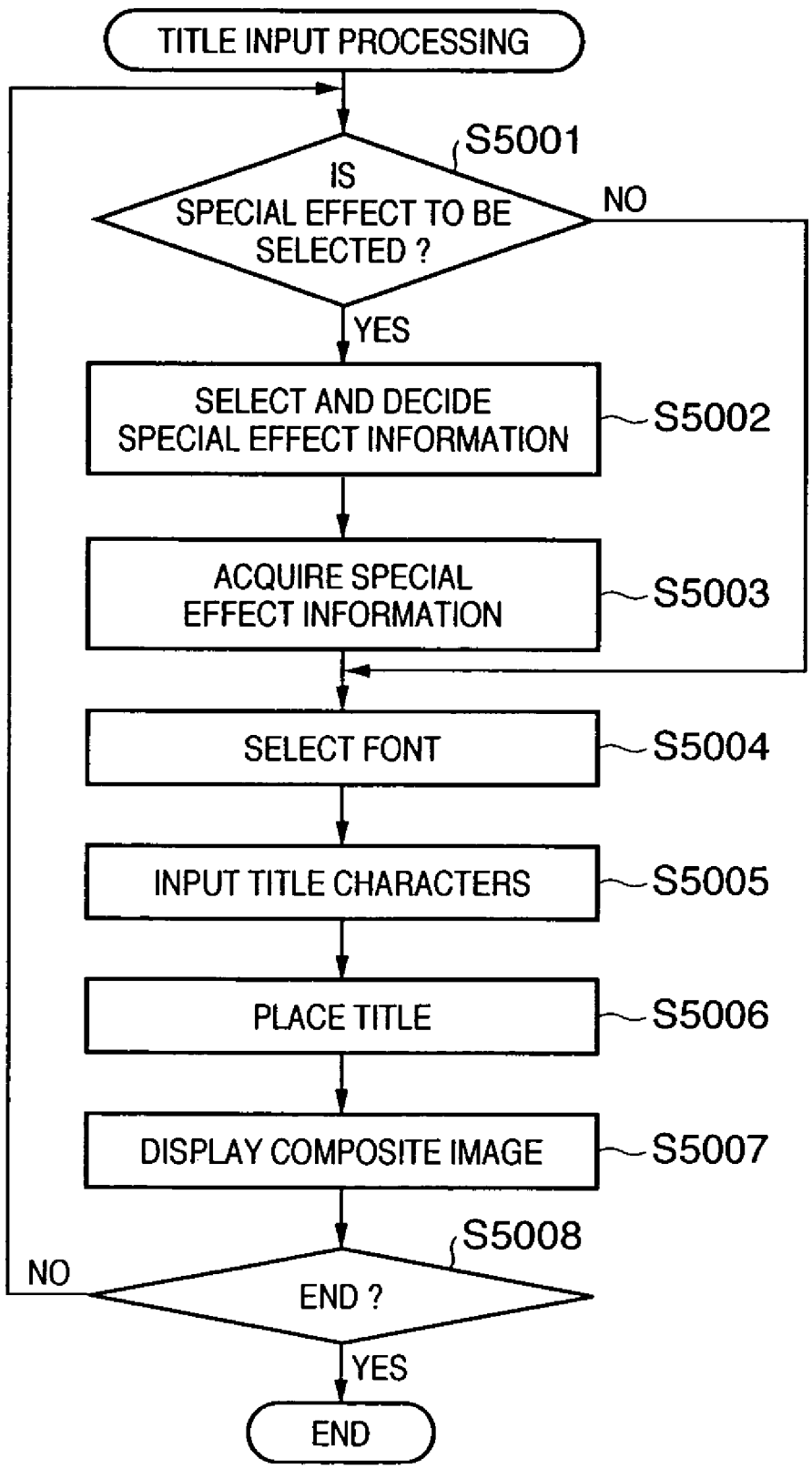
FIG. 50 is a flowchart showing the flow of title input processing in the third embodiment of the present invention.

The title input processing in step S4903 will be described with reference to FIG. 50. First of all, the control unit 1 checks whether or not a special effect is applied to title information (step S5001). If a special effect is to be applied, the flow advances to step S5002. If a special effect is not to be applied, the flow advances to step S5004. In step S5001, if the user operates the special effect selection switch 4802, it is determined that a special effect is applied.

Special effect information is described in accordance with the SVG standard. A plurality of pieces of such information are stored as files in the ROM 5 or the recording medium of the recording unit 4. These special effect information files are stored in the recording medium in advance. The user selects one of the files with the special effect selection switch 4802, and decides the special effect to be applied with the special effect decision switch 4803 (step S5002). The control unit 1 loads the special effect information file decided with the special effect decision switch 4803, and transfers the contents described in the special effect information file (see FIG. 52) to the RAM 6, thereby adding the contents to the title information (step S5003).

In step S5004, the user selects a font by using the font selection switch 4801. In this case, each font is defined by an SVG font defining function, and is stored in the recording medium of the recording unit 4 or the ROM 5. In step S5005, the user inputs the character data of the title with the key input unit 4808. The font style and character string designed in this manner are created as character string data (see FIG. 53) in the RAM 6, which is described as character data in accordance with the SVG standard. The created character string data is added to the title information shown in FIG. 51. Referring to FIG. 53, a font called "HGSoeiKakupoptai" is designated, and the character string "Athletic Meeting" is described. A character string can be input by, for example, providing a soft keyboard using the display unit 7 and performing kana-kanji conversion of the input character string. For example, the font types stored in the ROM or recording medium of the digital camera are displayed, and the user is made to select a font style from the displayed font types. For example, standardized data obtained by excluding an input character string or character strings which can be set by the user, e.g., a font type name or character size, from the character strings in FIG. 53 is prepared, and the user is made to write an input character string, font style name, character size, and the like in the standardized data, thereby creating character data. In this case, if a special effect is selected, the special effect is set as a character attribute. More specifically, in step S5003, the contents of the special effect information file stored in the RAM 6 are added as the character attribute of the character string data to the character data.

Figure 57:
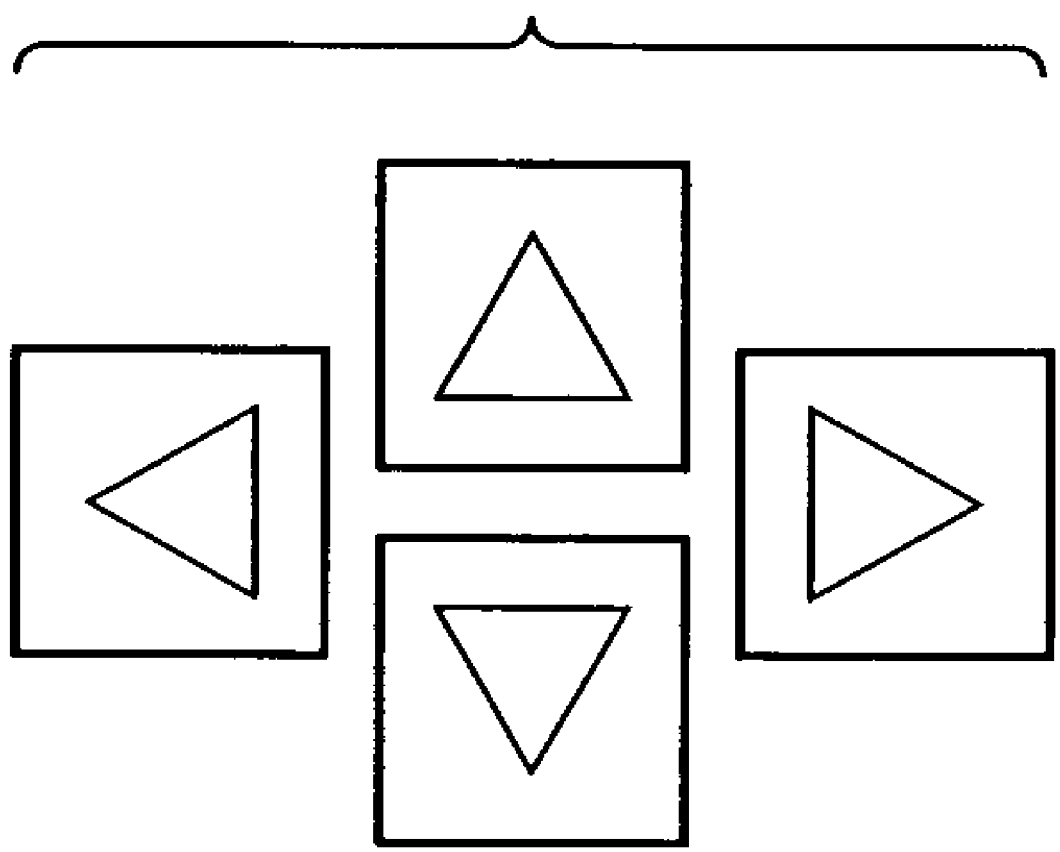
FIG. 57 is a view showing a title layout switch in the third embodiment of the present invention.

In step S5006, the title is placed. In this processing, the placement of the title is changed by using the title layout switch 4809 like the one shown in FIG. 57.

Figure 55:
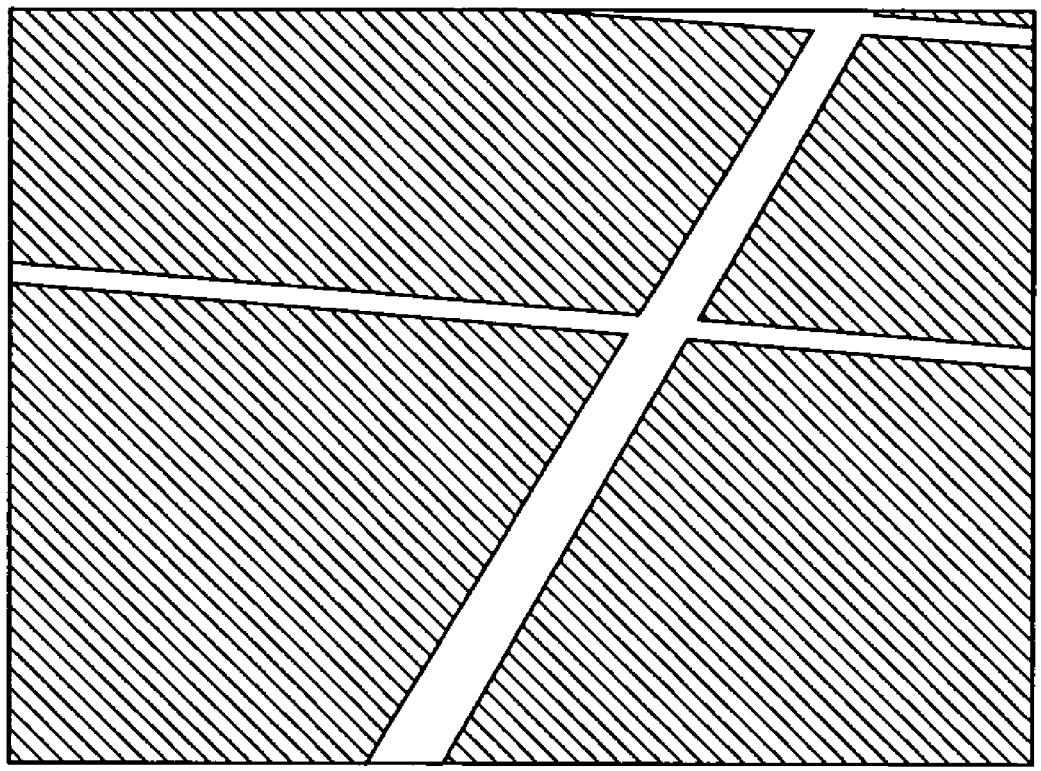
FIG. 55 is a view showing an example of how a titled image is displayed in the third embodiment of the present invention.

Composite image display processing (step S5007) will be described next. In this processing, the title information in the RAM 6 is analyzed, and composite image data is created on the basis of the analysis and output to the display unit 7. FIG. 54 shows an example of the title information existing in the RAM 6. FIG. 54 shows an example of the title information in which the character string described with reference to FIG. 53 is inserted. FIG. 55 shows an image obtained as a result of adding the title information in FIG. 54 to the object image. In step S5007, the title defined by the title information is composited with the image displayed on the display unit 7, and the composite image is displayed.

When title information is to be further input, the flow returns to step S5001, and the processing is repeated until title input operation is complete.

Recording processing for image data and title information (step S4905) will be described by referring back to FIG. 49. Even if a title is input, the flow returns to step S4902 until the 4804 is pressed. In step S4904, it is checked whether the shutter button 4804 is pressed. If the shutter is pressed, the image sensing unit 2 converts an object image into a digital signal, which is stored as an image data file in the recording medium of the recording unit 4. The file name of the stored image data file is acquired, and the attribute value of the xlink:href attribute of the <image> element of the title information stored in the RAM 6 is changed to the file name. The title information created in the RAM 6 is output to the recording unit 4 and is stored in the recoding medium. The flow then returns to step S102 again. Since the example shown in FIG. 54 is created only for display, this title information contains no <image> element. However, an <image> element may be left for storage. In this case, title information (see, for example, FIG. 53) inserted immediately before the <image> element of a template (see, for example, FIG. 51) may be created in the RAM 6 instead of the information shown in FIG. 54. In this case, in the composite image display step of step S5007 in FIG. 50, the <image> element is neglected, and only the title information is referred to so as to be composited with an image currently input as an image signal. With this operation, in step S4905, by writing the file name of the recorded image data file as the xlink:href attribute value of the <image> element, title information associated with the image data can be created and stored in the recording medium.

Note that if the title information erase switch 4807 is pressed at any time in each process described above, the handwritten information in the RAM 6 is erased.

<Playback Processing>

Figure 56:
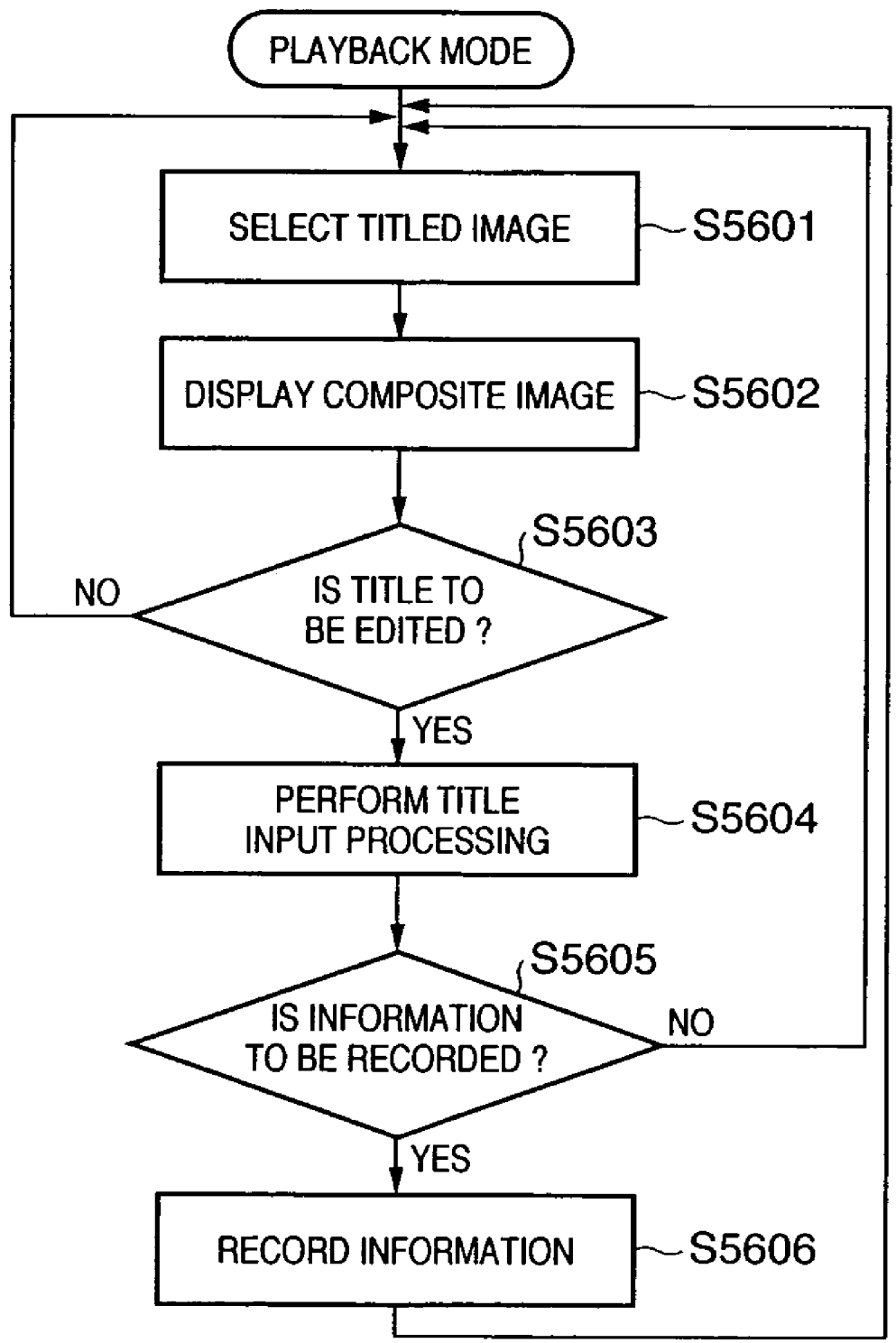
FIG. 56 is a flowchart showing the flow of processing at the time of playback in the third embodiment of the present invention.

The playback mode will be described next. Processing in the playback mode is started when the current mode of the digital camera is set to the playback mode with the mode switch 8. FIG. 56 shows the flow of processing in the playback mode. This processing is performed by the control unit 1.

First of all, when a titled image, i.e., title information described by SVG, which is present in the recording medium of the recording unit 4 is selected with the titled image selection switch 4806, the selected title information is transferred to the RAM 6 (step S5601). The title information in the RAM 6 is then analyzed and composited with image data in the recording medium of the recording unit 4 to create composite image data, which is output to the display unit 7 (step S5602). When the title of the played-back image is to be further edited, the flow shifts to title input processing (step S5603). This processing is the same as that shown in FIG. 50, which is the same as title input processing at the time of image sensing operation. Recording processing of the edited title information is performed by using the title information storage switch 4805. In this processing, the title information created in the RAM 6 is output to the recording unit 4 and stored in the recording medium.

With the above arrangement and processing, according to the digital camera of this embodiment, a title image independent of a sensed image can be composited with the sensed image, and the composite image can be output.

Modification to Third Embodiment

When title information and image data are to be composited with each other, compositing processing can be performed upon setting transparency for each or both of them. In this case, the lower object can be seen through the upper object in accordance with the set transparency. For this purpose, transparency is set for a title or each image by using various setting buttons of the digital camera, and is stored in the storage medium, together with title information. Alternatively, set transparency can be loaded from an external device such as a personal computer.

In addition, compositing processing can be performed after a compositing mode such as exclusion or multiplication is set for the title information and image data. In this case, compositing processing is performed in accordance with the set compositing mode. Assume that exclusive-OR operation is set. In this case, with regard to a portion where a plurality of objects overlap, exclusive-OR operation is performed between pixels located at the same coordinates of the respective objects. If full-color images are to be processed, the operation is performed for each color component. For this purpose, an operation method is set between the title and each image by using various setting buttons of the digital camera, and is stored in the storage medium in advance, together with the title information. Alternatively, a set operation method can be loaded from an external device such as a personal computer.

In addition, compositing processing to which one-dimensional coordinate transformation such as reduction or rotation may be performed for a character string or the like represented by title information can be performed. In this case, the title having undergone the one-dimensional coordinate transformation is added to the image. For this purpose, a title transformation method is set by using various setting buttons of the digital camera and is stored in the storage medium in advance, together with the title information. Alternatively, a set transformation method can be loaded from an external device such as a personal computer.

As described above, according to this modification, a composite image obtained after various processes are applied to a title image can be output. In addition, providing compositing method variations for a title image and sensed image makes it possible to further improve the rendering effect of the output image.

Fourth Embodiment

Figure 58:
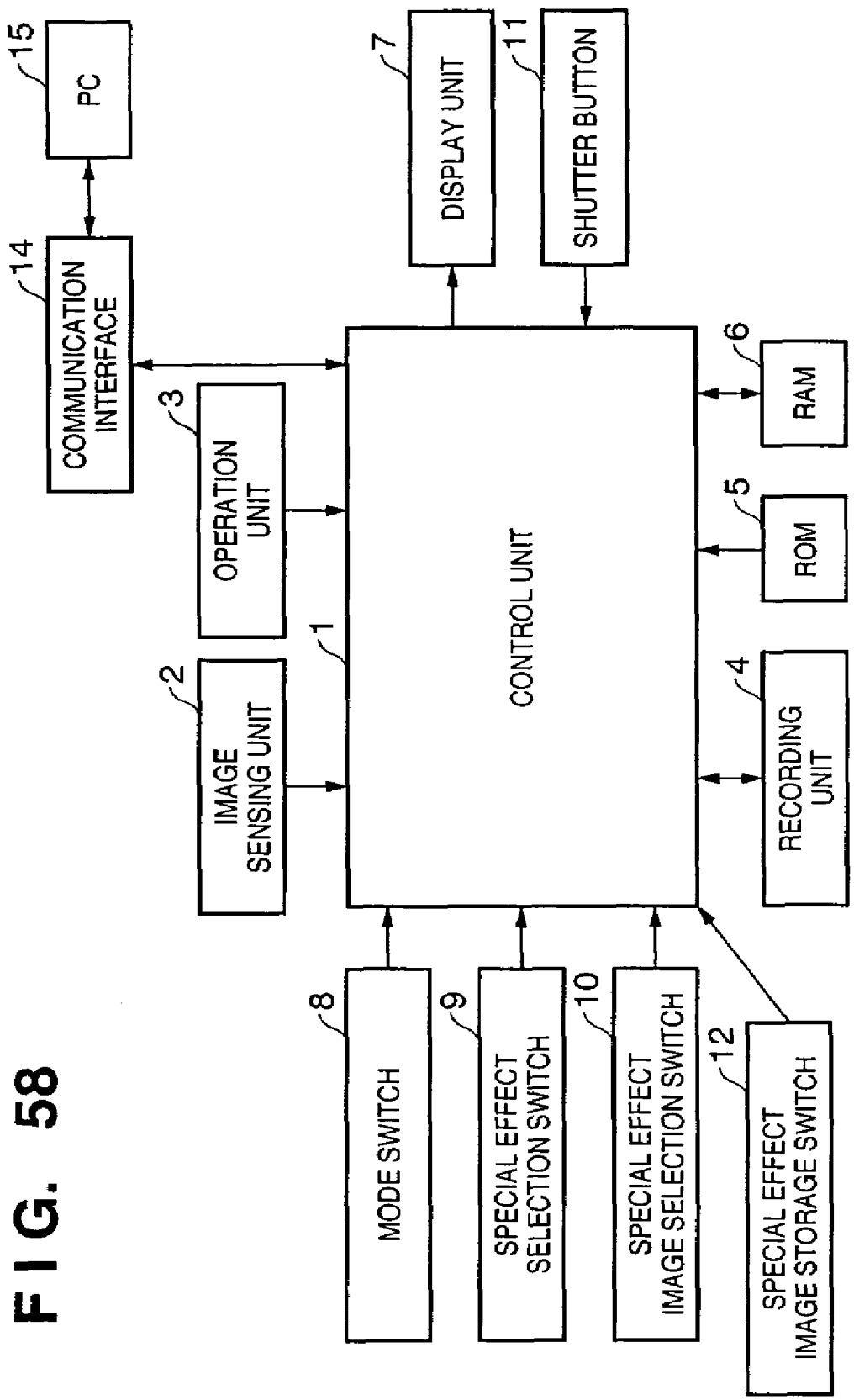
FIG. 58 is a block diagram showing the arrangement of a digital camera according to the fourth embodiment of the present invention.

FIG. 58 is a block diagram for explaining the arrangement of a digital camera according to the fourth embodiment of the present invention.

Referring to FIG. 58, a control unit 1 receives signals from an image sensing unit 2, operation unit 3, recording unit 4, mode switch 8, special effect selection switch 9, special effect image selection switch 10, shutter button 11, special effect image storage switch 12, and communication interface 14. The control unit 1 outputs data to a display unit 7 and the recording unit 4. The control unit 1 is connected to a ROM 5 and RAM 6.

Of the above components, the image sensing unit 2 photoelectrically converts an object image into a digital signal and inputs it to the control unit 1. The operation unit 3 can send an operation signal to the control unit 1 upon operation of the switch. The mode switch 8 is a switch for switching the current mode of the digital camera to a photographing mode or playback mode. The special effect selection switch 9 has a function of selecting one special effect.

The recording unit 4 is an interface for recording and loading image data on and from a recording medium. The recording unit 4 can also load special effect information. The communication interface 14 is an interface for acquiring special effect information from an external unit, and is connected to a personal computer (PC) 15 through a communication cable or wirelessly.

The display unit 7 is the finder of the digital camera and also serves as a display in the playback mode. The display unit 7 also has a function of interpreting the contents described according to the SVG standard, dynamically creating an image, and displaying it.

Figure 59:
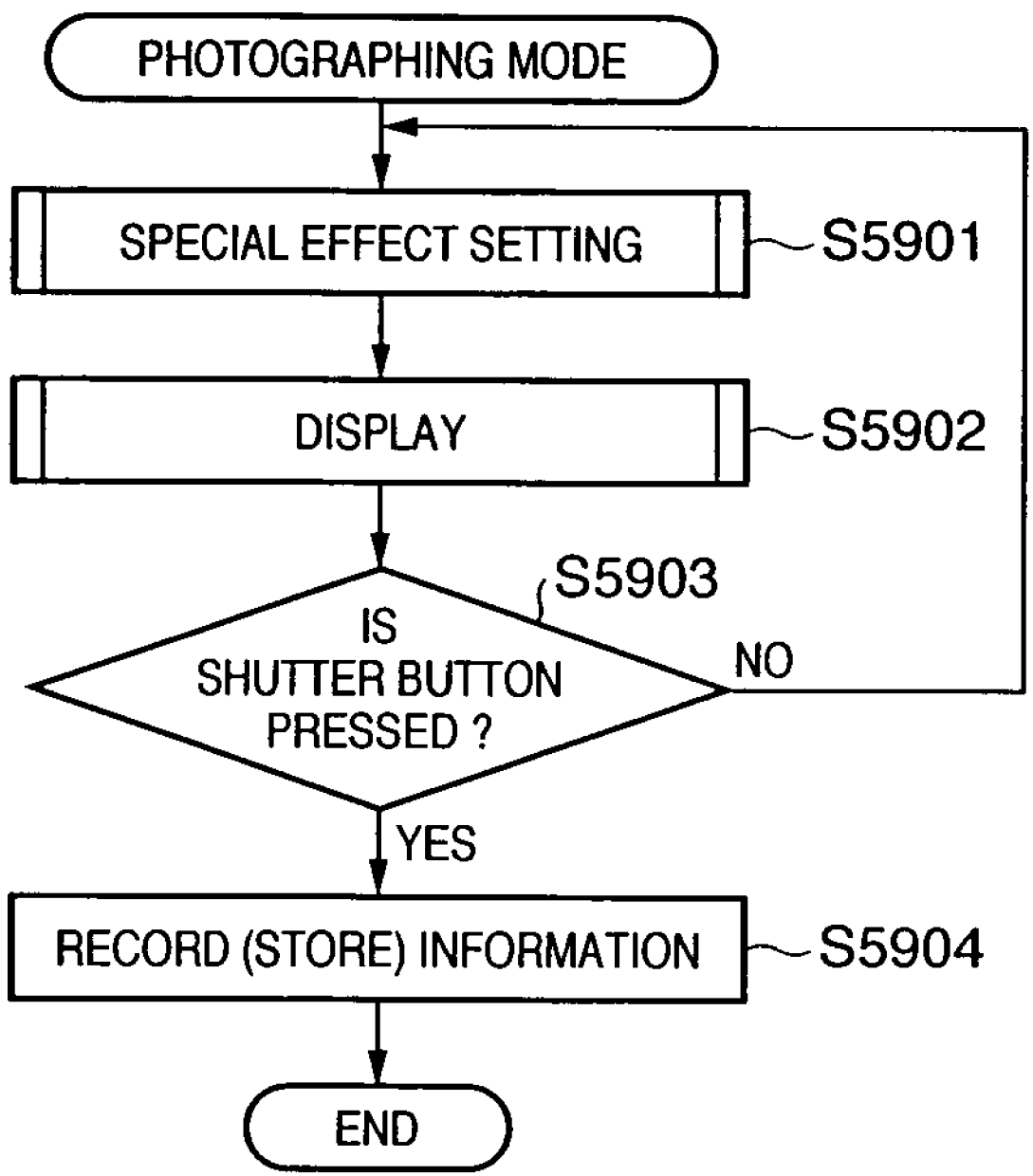
FIG. 59 is a flowchart showing the flow of processing at the time of photographing operation in the fourth embodiment of the present invention.

The photographing mode of the digital camera having the above arrangement according to this embodiment will be described next. FIG. 59 shows the flow of processing in the photographing mode. This processing is started when the current mode of the digital camera is set to the photographing mode with the mode switch 8.

Figure 60:
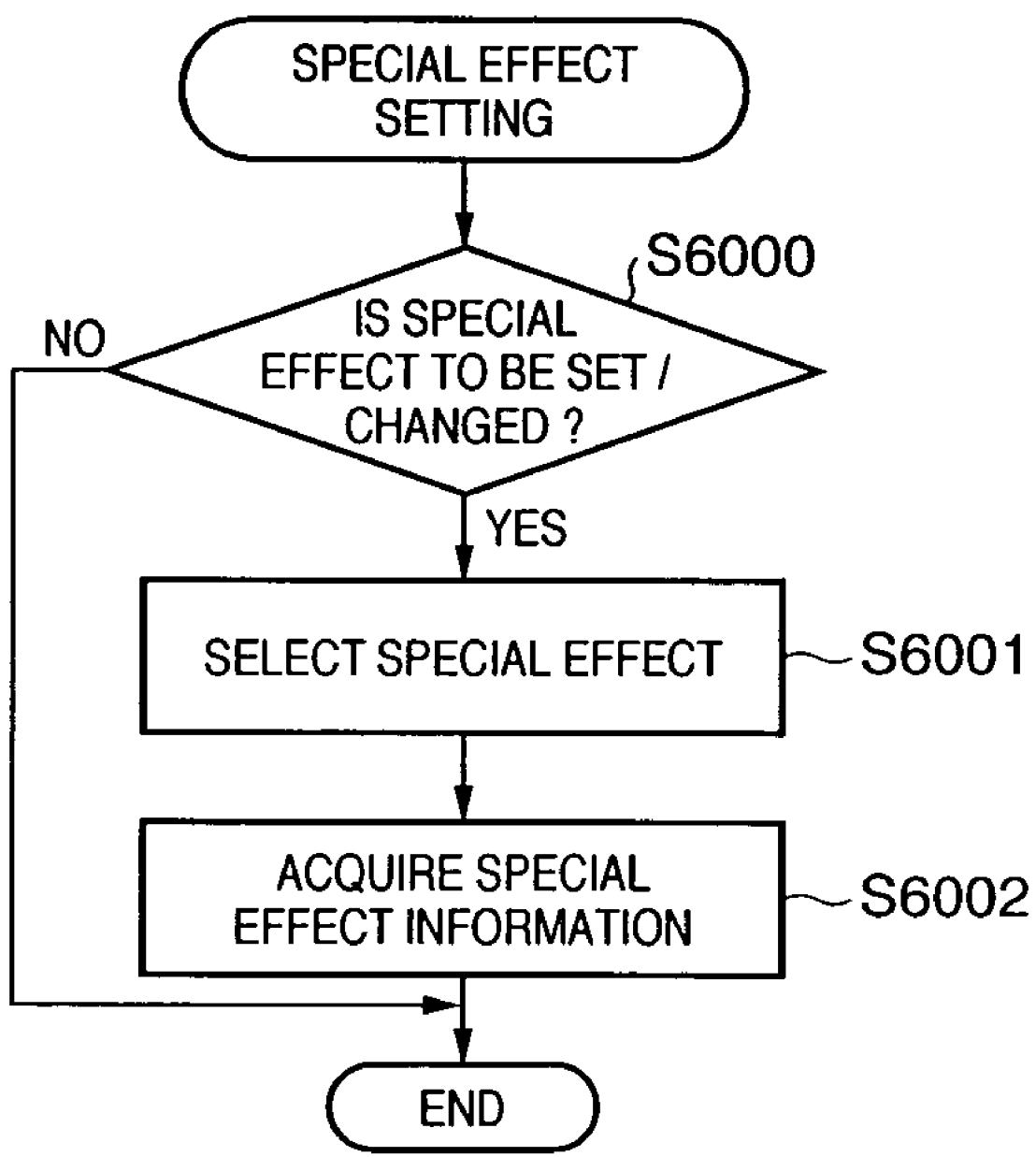
FIG. 60 is a flowchart showing the flow of special effect setting processing in the fourth embodiment of the present invention.

Special effect setting processing (step S5901) will be described along with the flow of the special effect setting processing shown in FIG. 60. A special effect information template is described according to the SVG standard, and is stored in the ROM 5 or the recording medium of the recording unit 4. When a special effect is to be set or changed, a special effect is selected with the special effect selection switch 9 (step S6001). This information is stored in the RAM 6 (step S6002). The special effect setting processing is then terminated.

In the example shown in FIG. 62, special effect information for converting an image into a sepia image is described in SVG. The special effect information template contains only one <image> element, and the xlink:href attribute is blank (" "). A special effect description complies with the SVG standard. In this case, the special effect exemplified is to convert an image into a sepia image. However, various special effects can be set, including, for example, an illumination effect.

Figure 61:
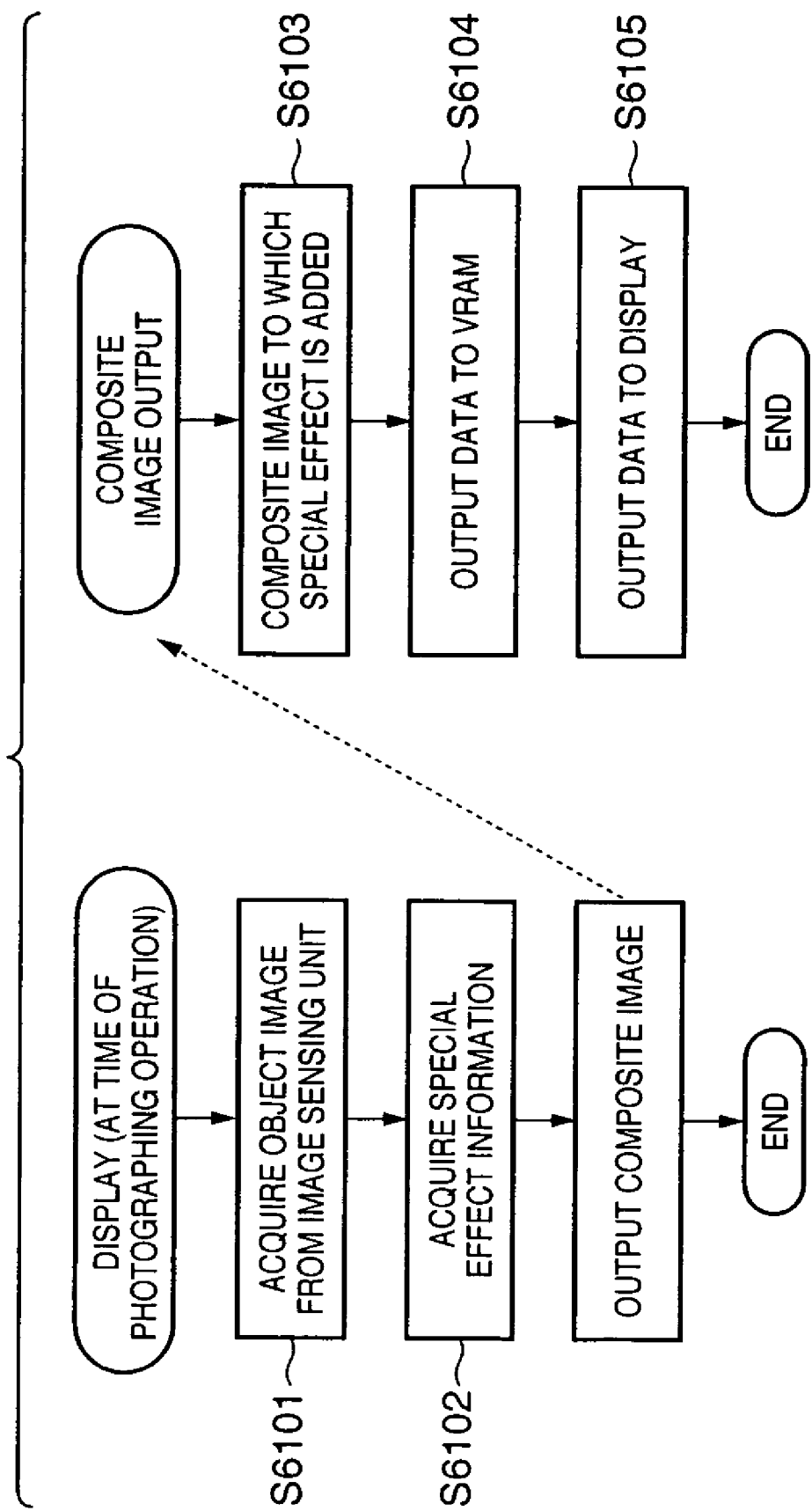
FIG. 61 is a flowchart showing the flow of display processing at the time of photographing operation in the fourth embodiment of the present invention.

Display processing (step S5902) will be described along with the flow of the display processing shown in FIG. 61. The image sensing unit 2 converts an object image into a digital signal, and inputs it to the control unit 1. The control unit 1 then transfers the object image data to the display unit 7 (step S6101). The special effect information is stored in the RAM 6 in the processing in step S101. This information is transferred to the display unit 7 (step S6102). The special effect information is further analyzed to create a composite image upon applying the effect to the object image (step S6103). This image is transferred to the VRAM (step S6104) and is output to the display (step S6105).

Referring back to FIG. 59, it is checked in step S5903 whether or not the shutter button 11 is pressed. If NO in step S5903, the flow returns to step S5901. If YES in step S5903, the flow shifts to the processing in step S5904.

Figure 63:
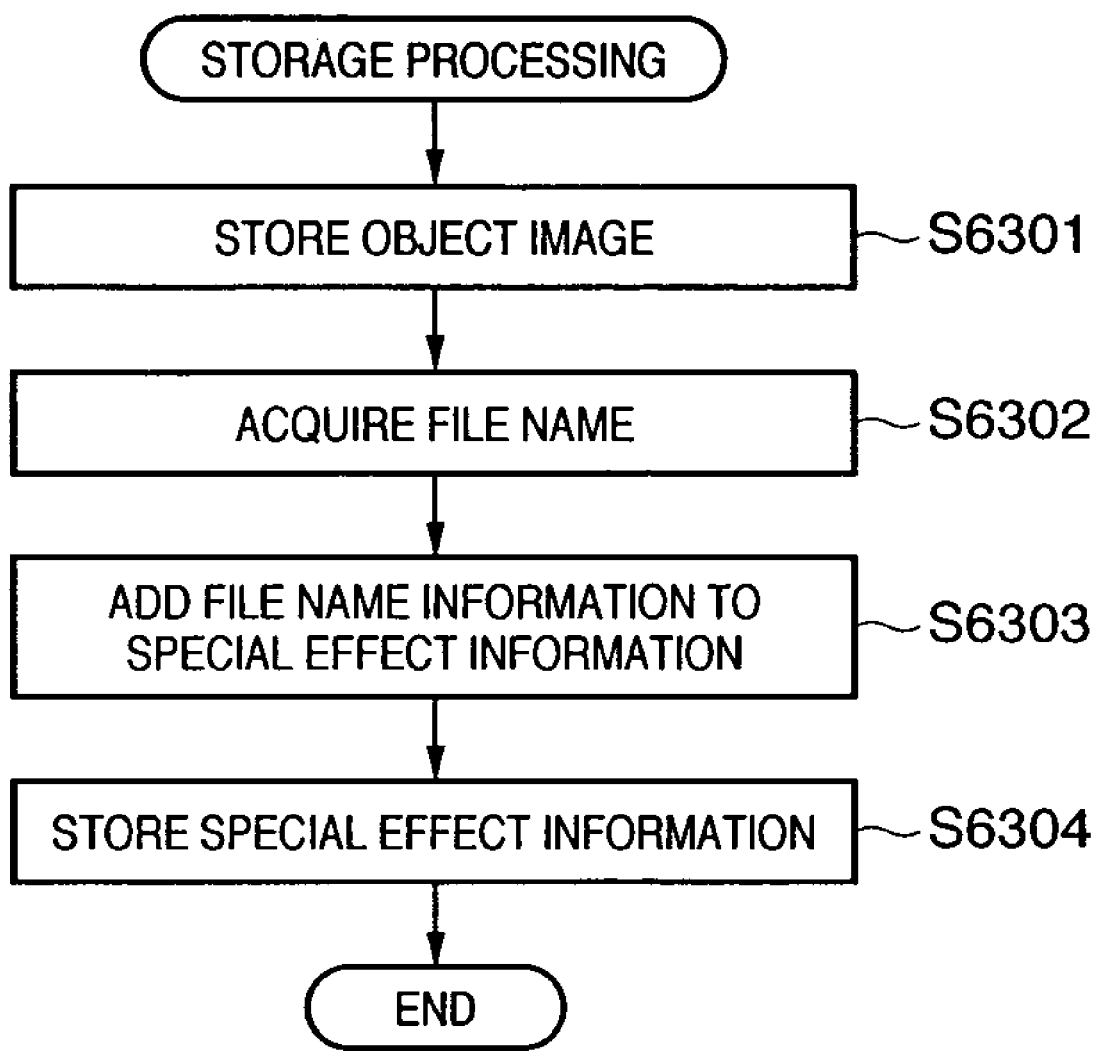
FIG. 63 is a flowchart showing the flow of storage processing in the fourth embodiment of the present invention.

Special effect information storage processing (step S5904) will be described along with the flow of the storage processing shown in FIG. 63. The object image obtained when the shutter button 11 is pressed is converted into a digital signal by the image sensing unit 2. This signal is input to the control unit 1 and stored in the recording unit 4 (step S6301). The file name created when the image is stored is acquired and transferred to the RAM 6 (step S6302). The special effect information to be applied is stored in the RAM 6, and the attribute value of the xlink:href of the <image> element is changed into the acquired file name (step S6303). The special effect information created in this manner is transferred to the recording unit 4 and is stored as a file in the SVG format shown in FIG. 64 (step S6304). The special effect information storage processing is then terminated. That is, the object image and special effect information are associated with each other and stored.

This embodiment has exemplified the case wherein a special effect information template is stored in the ROM 5 or the recording medium of the recording unit 4. However, special effect information may be acquired from an external input apparatus through a communication interface. However, since special effect information is in the text format and is described by using a known description language, the information can be edited by using a commercially available personal computer. Referring to FIG. 58, special effect information is edited by a PC 15 and is transferred to the control unit 1 after the PC 15 is connected to the communication interface 14, thereby storing the information in the RAM 6. This special effect information can be handled in the same manner as the special effect information stored in the ROM 5 or the recording medium of the recording unit 4.

Figure 65:
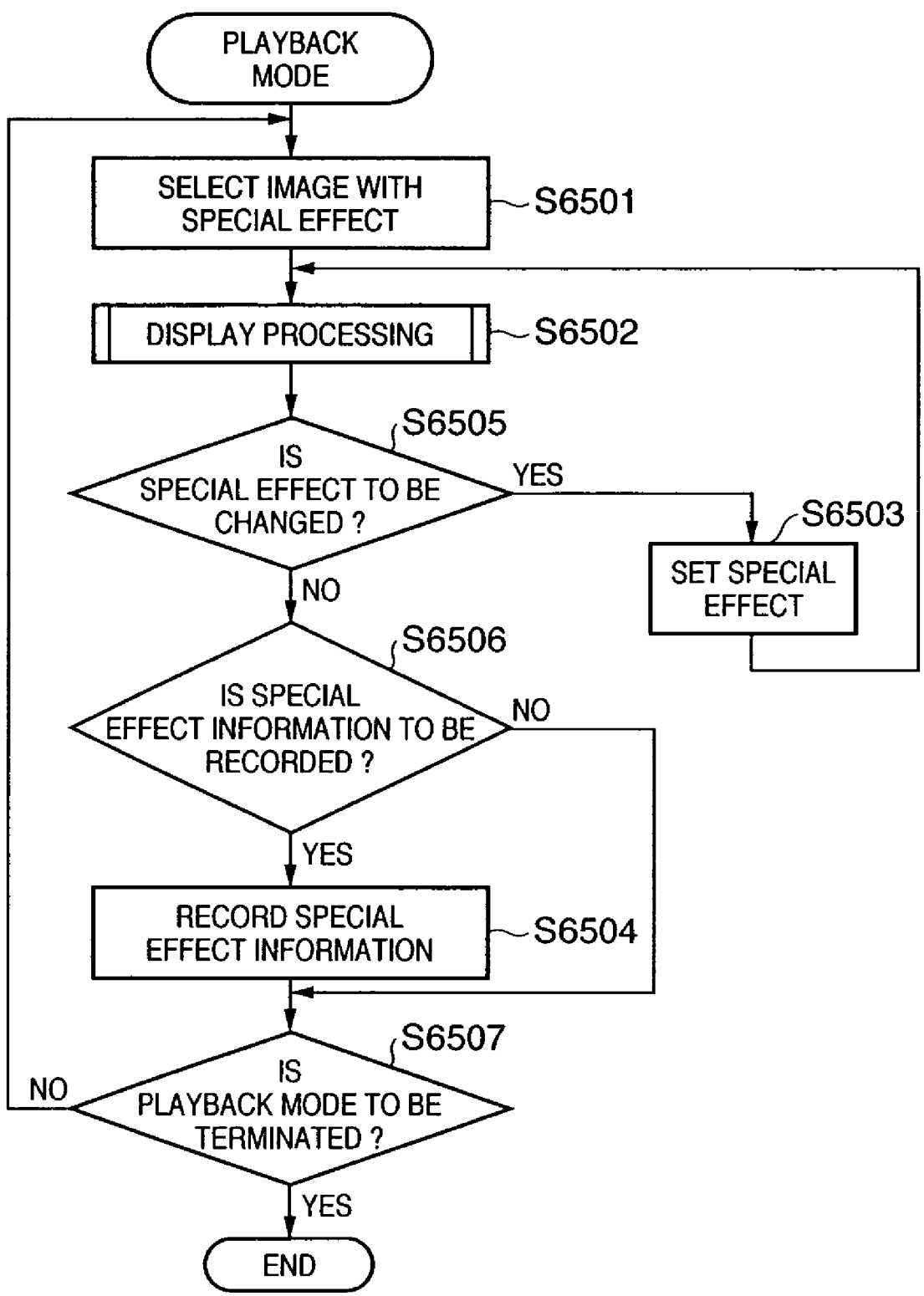
FIG. 65 is a flowchart showing the flow of processing at the time of playback in the fourth embodiment of the present invention.

Processing in the playback mode will be described next with reference to FIG. 65 showing the flow of the processing. This processing is started when the current mode of the digital camera is set to the playback mode with the mode switch 8.

First of all, in step S6501, the special effect information stored in the recording medium of the recording unit 4 or one of a plurality of pieces of special effect information stored therein is selected with the special effect image selection switch 10.

Figure 66:
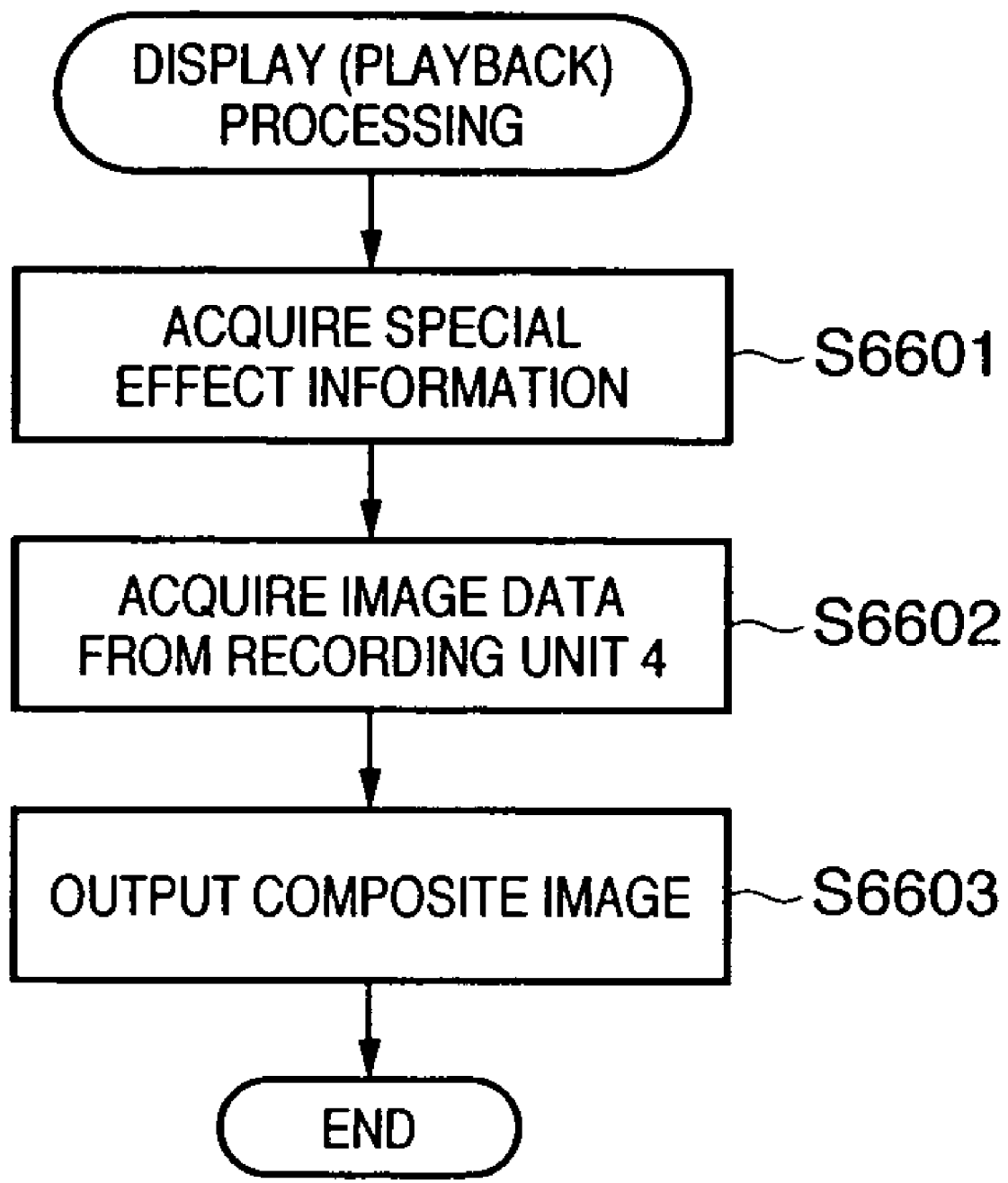
FIG. 66 is a flowchart showing the flow of display processing at the time of playback in the fourth embodiment of the present invention.

Display processing (step S6502) will be described along with the flow of the display processing shown in FIG. 66. The selected special effect information is stored in the SVG format like that shown in FIG. 64. First of all, special effect information and image data to which a special effect is applied are acquired from the recording medium of the recording unit 4 (steps S6601 and S6602). A composite image obtained by applying the special effect to image data is output (step S5603 in FIG. 61), and the processing is terminated.

When the special effect of the selected image with the special effect is to be changed, special effect setting processing is performed (see step S6503 in FIG. 60), and the flow returns to step S6502. In addition, recording processing is performed with a special effect image storage switch 12 (step S6504). With the recording processing, only the special effect information created in the RAM 6 is output to the recording medium of the recording unit 4. In response to an end instruction, the playback mode is terminated.

As described above, the digital camera of this embodiment is not designed to apply a special effect to a sensed image itself and store it, but is designed such that a special effect is stored as data independent of image data described in the SVG format, and is applied to the image data for the first time when the data is output. For this reason, even a sensed image itself to which a special effect has been applied can be stored in advance. This makes it easy to change or cancel a special effect.

Fifth Embodiment

Figure 67:
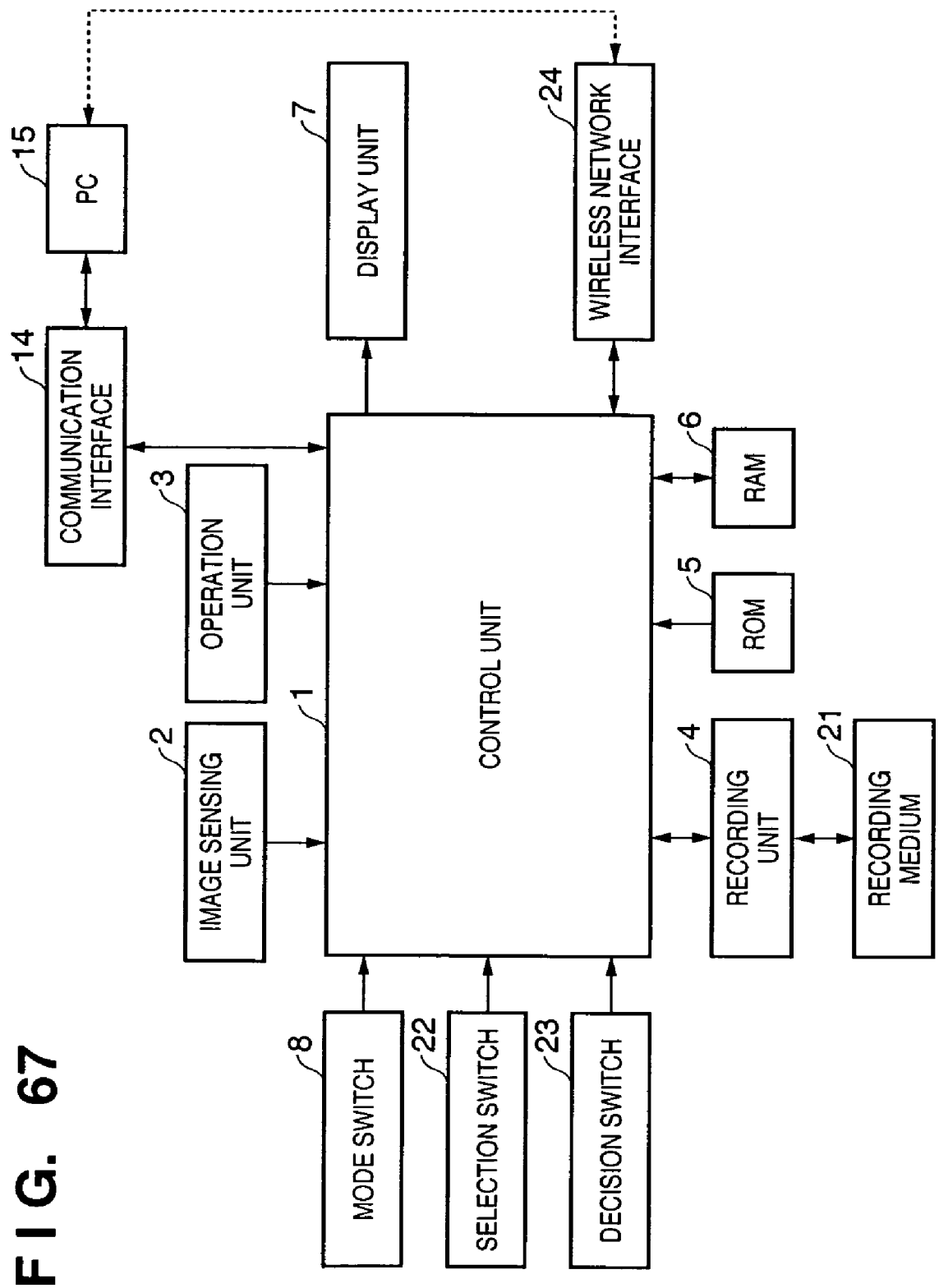
FIG. 67 is a block diagram showing the arrangement of a digital camera according to the fifth embodiment of the present invention.

FIG. 67 is a block diagram for explaining the arrangement of a digital camera according to the fifth embodiment of the present invention.

Referring to FIG. 67, a control unit 1 receives signals from an image sensing unit 2, operation unit 3, recording unit 4, mode switch 8, selection switch 22, decision switch 23, communication interface 14, and wireless network interface 24. The control unit 1 outputs data to the recording unit 4, a display unit 7, the communication interface 14, and the wireless network interface 24. The recording unit 4 is connected to a recording medium 21. The control unit 1 is connected to a ROM 5 and RAM 6.

Of the above components, the control unit 1, image sensing unit 2, operation unit 3, recording unit 4, ROM 5, RAM 6, display unit 7, mode switch 8, selection switch 22, and decision switch 23 are provided for the main body of the digital camera.

Of the above components, the image sensing unit 2 converts an object image into a digital signal and inputs it to the control unit 1. The operation unit 3 can send an operation signal to the control unit 1 upon operation of the switch. The mode switch 8 is a switch for switching the current mode of the digital camera to a photographing mode or playback mode. The playback mode includes a special effect transfer mode, special effect setting mode, and special effect mail transmission mode in addition to a normal playback mode. The selection switch 22 has a function of selecting special effect information or image data. The decision switch 23 has a function of deciding the selected special effect information or image data.

The recording unit 4 is an interface for writing and loading image data in and from the recording medium 21. The recording unit 4 also writes and loads special effect information and an image with a special effect. The communication interface 14 and wireless network interface 24 are interfaces for externally acquiring special effect information, and are connected to a personal computer 15. In addition, they are interfaces for outputting images with special effects to an external display device.

The display unit 7 is the finder of the digital camera and also serves as a display in the playback mode. The display unit 7 displays file names and other setting information to provide information for setting special effect information and issuing instructions to execute functions.

Figure 68:
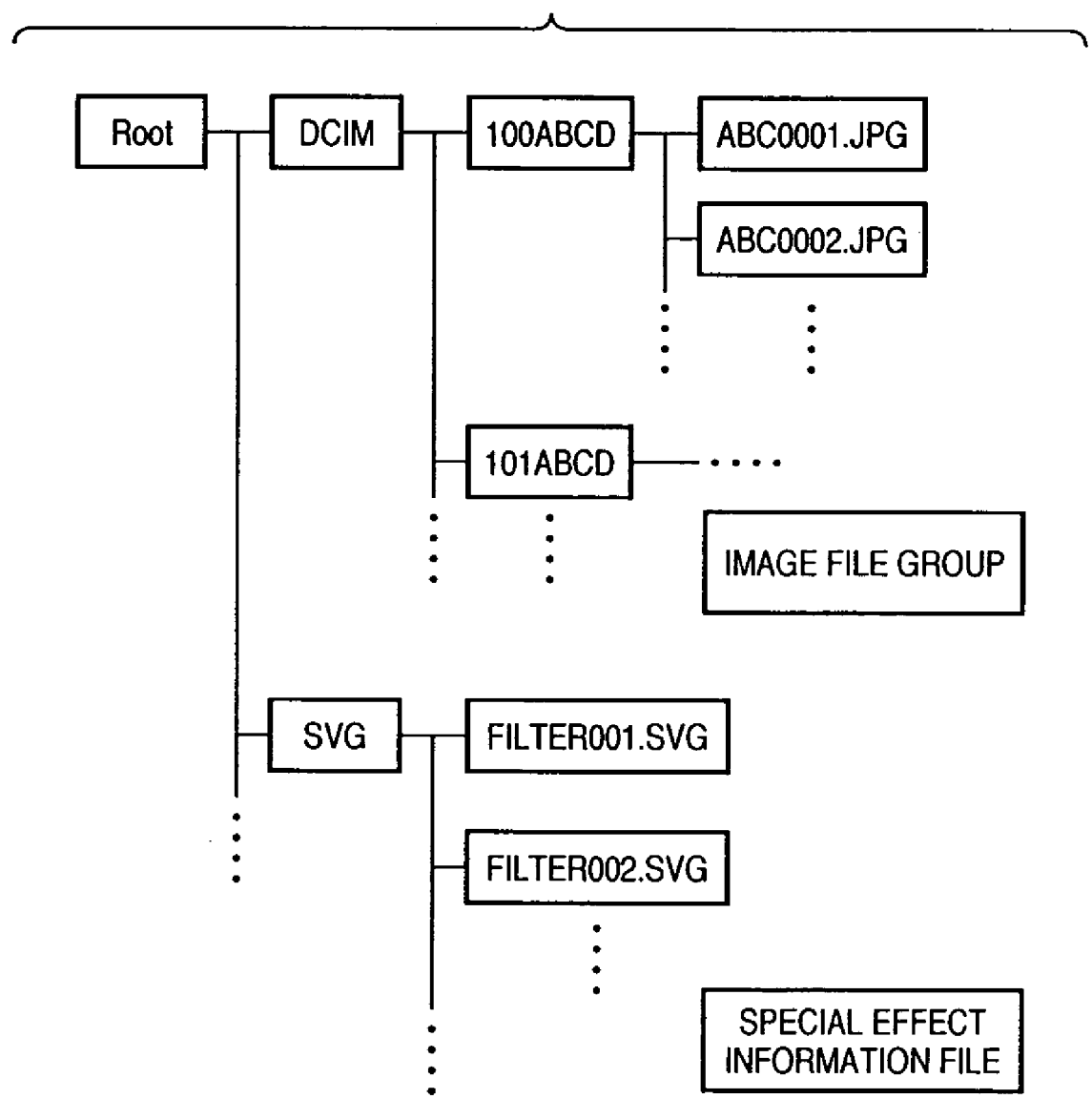
FIG. 68 is a view showing the directory arrangement of a special effect information file in the fifth embodiment of the present invention.

FIG. 68 shows the directory arrangement of a special effect information file stored in the recording medium 21. As shown in FIG. 68, a special effect information file is stored in the "SVG" directory created as a subdirectory of the root directory of the recording medium 21.

Special effect information is described by using the SVG standard and is stored as a file in the recording medium 21. FIG. 69 shows an example of how a special effect information template is described in SVG. This description example exemplifies a special effect by which image data is displayed in gray scale. The information of the <title> and <desc> elements is displayed on the display unit 7 to help the user to determine the contents of a special effect. In this description example, only one <image> element is provided, and the initial value of the xlink:href attribute is set blank.

A special effect information template is acquired by downloading it from a Web site on the Internet or the like or transferring it from a CD-ROM or the like in which special effect information is stored.

Figure 70:
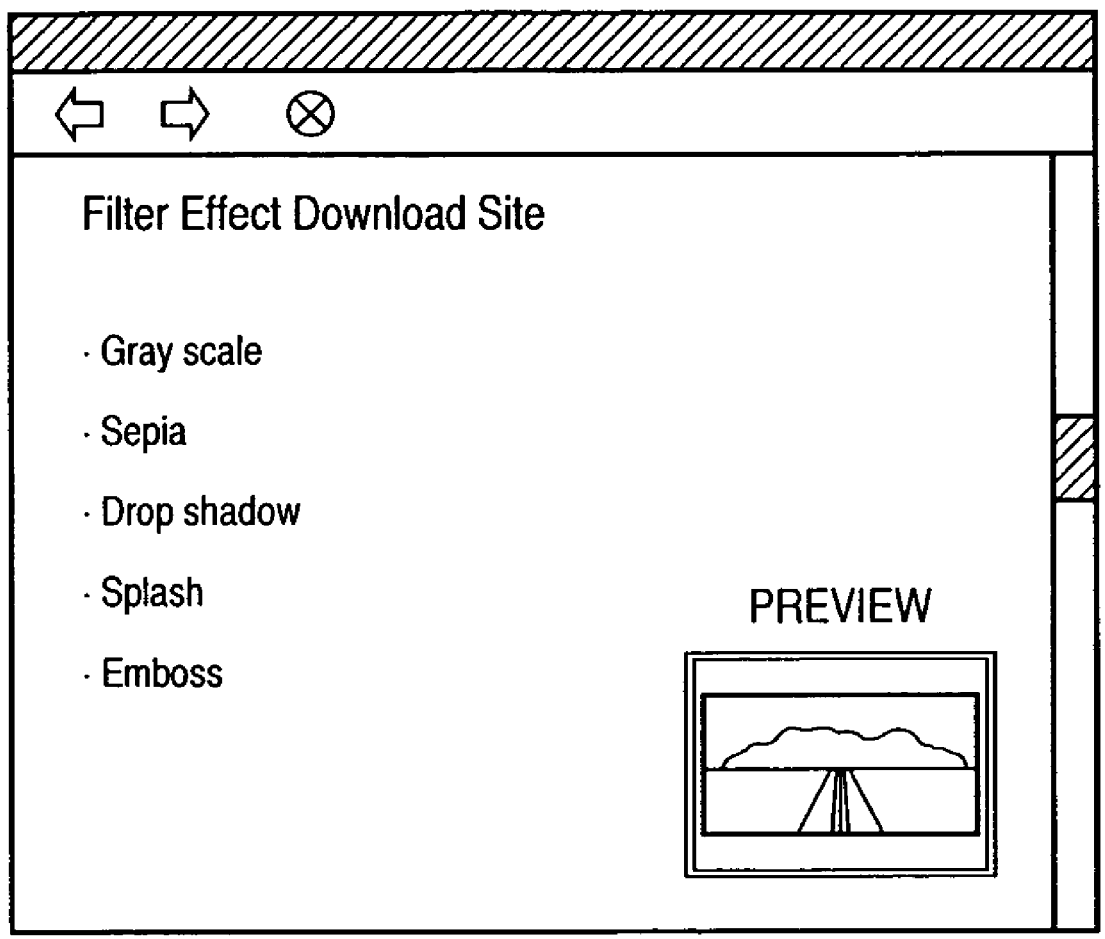
FIG. 70 is a view schematically showing a method of acquiring special effect information in the fifth embodiment of the present invention.

FIG. 70 is a view showing a state wherein the user is performing browsing operation by using the Web browser in a personal computer to externally acquire special effect information. The user checks the effect of special effect information provided by the server on the Web browser, and downloads the special effect information into the personal computer.

Figure 71:
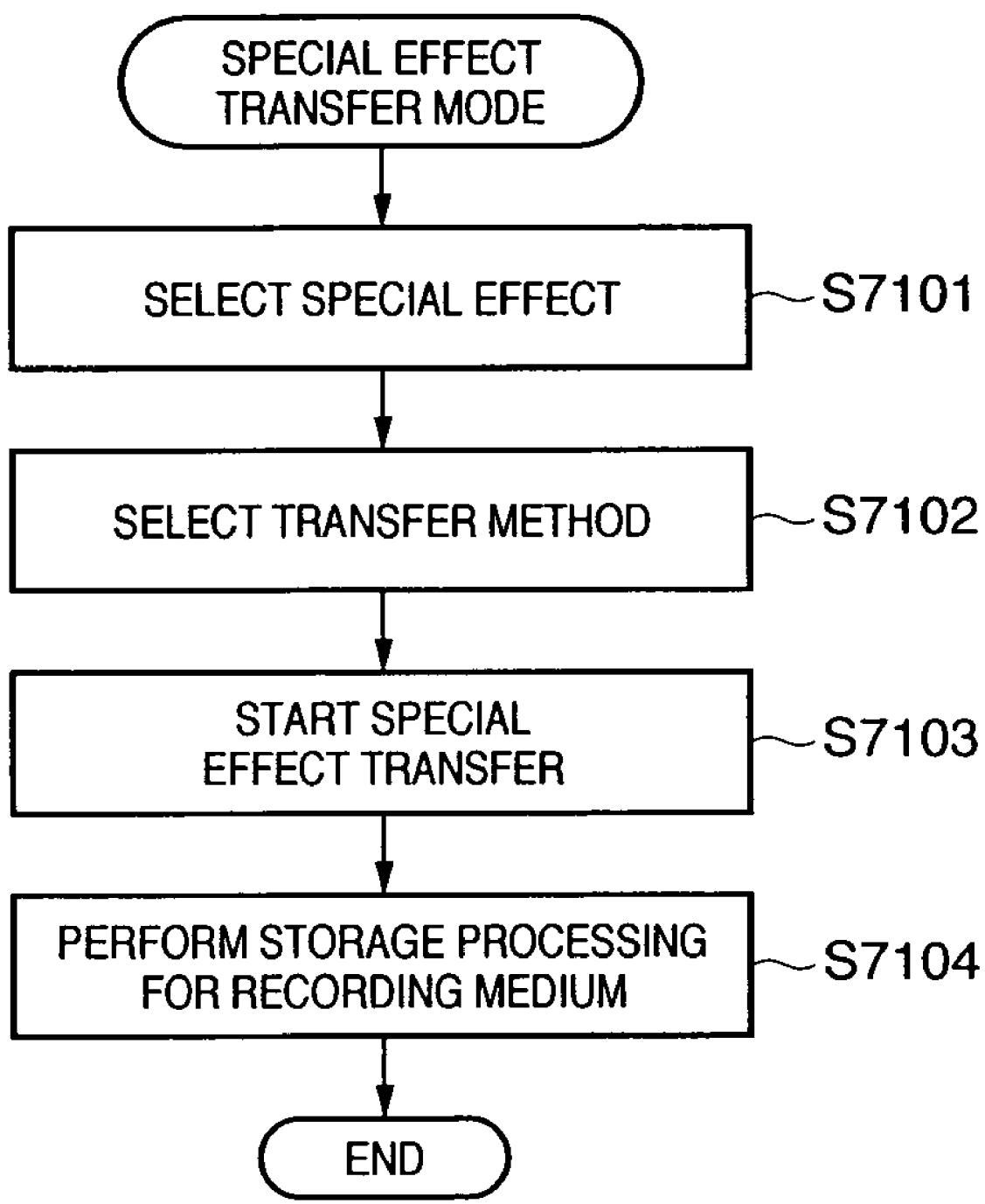
FIG. 71 is a flowchart showing the flow of processing in a special effect transfer mode in the fifth embodiment of the present invention.

FIG. 71 is a view showing the flow of processing to be performed when special effect information is to be acquired from an external unit. Assume that the user operates the personal computer to transfer special effect information to the digital camera. First of all, the current mode of the camera is switched to the special effect transfer mode with the mode switch 8. In step S7101, the user selects, on the personal computer, special effect information which he/she wants to transfer. In step S7102, an interface to be used for transfer is selected from the communication interface 14, wireless network interface 24, and the like and is connected to the personal computer. After the connection between the selected transfer interface and the personal computer as the connection target is checked, the transfer of the special effect information is started in step S7103. In step S7104, the information is stored in the recording medium 21. When the storage processing is completed, the special effect transfer processing is terminated.

Figure 72:
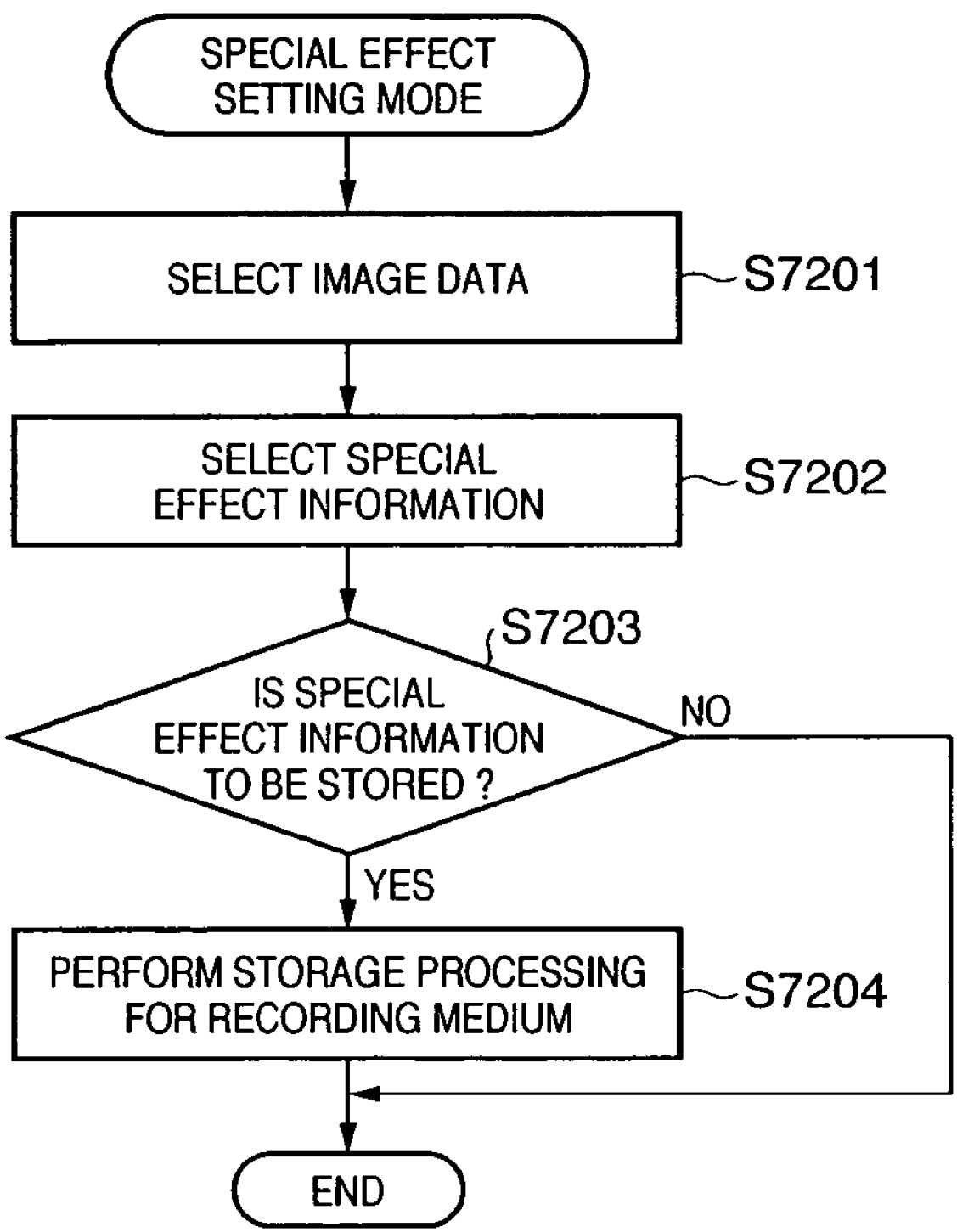
FIG. 72 is a flowchart showing the flow of processing in a special effect setting mode in the fifth embodiment of the present invention.

The special effect setting mode will be described next along with the flow of the processing shown in FIG. 72. First of all, the current mode of the camera is switched to the special effect setting mode with the mode switch 8. In step S7201, a window like that shown in FIG. 73 is displayed on the display unit 7 to make the user select an image for which a special effect is to be set from the image data stored in the recording medium 21.

The file name of the selected image is temporarily stored in the RAM 6. In special effect selection in step S7202, as shown in FIG. 74, the selected image data is displayed on the upper part of the display unit 7, and the special effect information stored in the recording medium 21 is displayed on the lower part. The user selects a special effect to be set from the displayed special effects. In this case, the value of xlink:href of the special effect information is changed to the file name of the selected image data. FIG. 75 shows an example of the description of the special effect information after the change.

It is checked in step S7203 whether or not the changed special effect information is stored. If YES in step S7203, storage processing for the recording medium 21 is performed in step S7204. The processing is then terminated. If NO in step S7203, the processing is immediately terminated.

If the user cannot find any favorite special effect even in the process of setting a special effect, he/she externally receives new special effect information by the above special effect information transfer method.

In this embodiment, an externally received special effect information template is used without any change. However, special effect information is in the text format and is described by using a known description language. The special effect information can therefore be edited by using the text editor in a general personal computer.

Figure 76:
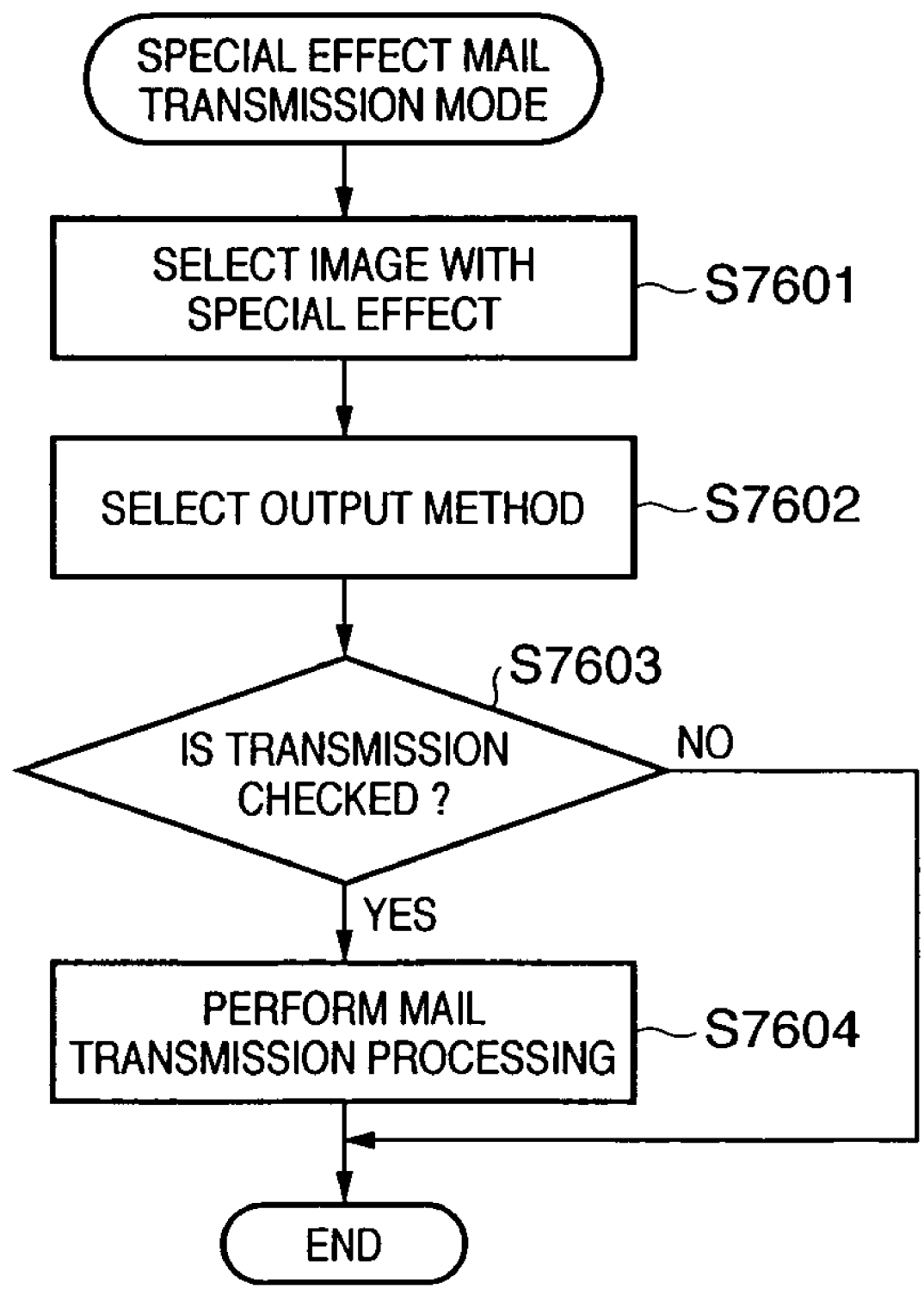
FIG. 76 is a flowchart showing the flow of processing in a special effect mail transmission mode in the fifth embodiment of the present invention.

FIG. 76 is a view showing the flow of processing to be performed when a created image with a special effect is transmitted by mail. First of all, the current mode of the camera is switched to the special effect mail transmission mode with the mode switch 8. In step S7601, the user selects an image with a special effect which he/she wants to transmit from the recording medium 21. As shown in FIG. 77, on the display unit 7, the thumbnails of images for which special effects are set are displayed on the lower part, and a selected special effect name is displayed on the upper part. When the user decides an image with a special effect which he/she wants to transmit, a connection means for the personal computer is selected in step S7602. A connection means is selected from communication interfaces such as USB and IEEE1394 and wired and wireless network interfaces.

After the connection between the selected connection means and the personal computer is checked, it is checked in step S7603 whether or not mail transmission is performed. If YES in step S7603, the special effect information and its set image data are transmitted from the personal computer. The processing is then terminated. If NO in step S7603, the processing is immediately terminated. Since the special effect information is described according to the SVG standard, the mail recipient can enjoy the special effect expression intended by the creator by using a general application complying with SVG.

As described above, according to the fourth and fifth embodiments, the user can easily take an image with a special effect as intended while checking the applied state of a special effect during image sensing operation.

According to the above embodiment, the use can obtain an image to which a special effect is applied without direct processing the image data itself.

In addition, according to the above embodiment, since image data and special effect information can be handled independently, various images with special effects can be obtained by combining different special effects with the same image data.

Furthermore, if special effect information is expressed by using the XML (Extensible Markup Language) standard, since the special effect information can be edited by using a general tool or text editor complying with XML, the load of creating special effect information can be reduced.

Moreover, if special effect information is expressed by using the SVG standard, an image with a special effect can be displayed by using general Internet browsing software complying with SVG. This can improve the convenience of enjoying images with special effects.

Sixth Embodiment

In the sixth embodiment of the present invention, the user can perform image sensing operation while the animation SVG is displayed on a display unit (LCD). An SVG file of animation image which changes with time is stored in advance. When an animation photographing mode is selected, the animation SVG file is read out to make the display unit 7 display the animation in a loop. In this case, a composite image of the animation and the object image data sensed by an image sensing unit 2 is displayed on the display unit 7.

When a shutter button 11 is pressed, the image sensing unit 2 converts the object image at this point of time into digital image data and stores it in a recording unit 4. In addition, SVG information (e.g., information indicating a specific timing in the animation) at this point of time is stored in the recording unit 4 in association with the image data. The SVG information is, for example, a flag indicating a specific frame used at the image sensing timing in the SVG data representing the animation. This makes it possible to composite the frame of the animation at the image sensing timing and the object image data and play back the composite data.

In the playback mode, when a sensed animation-attached image is selected, a frame image at the image sensing timing of the animation is composited with the object image data on the basis of an SVG information file and object image file, and the composite data is displayed on the display unit 7. Note that the display unit 7 may be made to display an image obtained by compositing the object image data with some frames of an animation which changes with time. One of these display methods which is to be used can be determined in accordance with the description method for an SVG file or may be selected by the user.

SVG data representing an animation, i.e., the above "information indicating a specific timing in the animation", is not limited to a flag indicating a specific frame used at the image sensing timing. For example, new SVG data representing a frame displayed at the image sensing timing may be created from animation SVG data and recorded in association with the object image data. That is, new SVG data of a frame of an animation at the image sensing timing designated with the shutter button 11 is created. In addition, if an image sensing timing between frames is designated, new SVG data of an animation frame at the image sensing timing may be created on the basis of the two frames.

In addition, animation SVG data and object image data may be composited in editing processing after image sensing operation instead of compositing of SVG data and object image data at the time of image sensing operation. For example, in the playback mode shown in FIG. 65, a combination of animation SVG data and object image data can be selected and composited. The resultant data can be displayed and recorded on the recording unit 4.

As described above, according to the digital camera of this embodiment, a moving image described in SVG and a sensed still image can be composited and played back. This makes it possible to provide a special effect, e.g., attaching a moving image frame to a sensed image.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

This application claims priority from Japanese Patent Application No. 2003-416723 filed on Dec. 15, 2003, which is hereby incorporated by reference herein. In addition, Japanese Patent Application No. 2003-306854 filed on Aug. 29, 2003 is also hereby incorporated by reference herein.

What is claimed is:

1. A digital camera comprising:
   an image data memory which stores sensed image data;
   a layout data memory which stores a plurality of layout data describing the placement of images;
   an image data selector which selects designated image data as targets to be laid out from the image data stored in said image data memory; and
   a display controller which displays a selection screen for allowing a user to select one layout data from among plural layout data after the image data have been selected by said image data selector, wherein the selection screen contains layout data in which as many designated image data can be laid out as said image data selector has selected and other layout data as choices, and
   wherein said display controller displays the layout data in which as many designated image data can be laid out as said image data selector has selected with a visual effect so as to distinguish the layout data from the other layout data.

2. The digital camera according to claim 1, further comprising:
   a layout unit which lays out image data selected by said image data selector in accordance with the layout data selected on the selection screen.

3. The digital camera according to claim 1, wherein the layout data includes superimposition data describing an image to be superimposed on an image, and said display controller generates display data for displaying the image data corresponding to the image data selected by said image data selector in accordance with the superimposition, data and displays the display data.

4. The digital camera according to claim 2, further comprising an output unit which outputs the image data to a printer connected thereto.

5. The digital camera according to claim 1, wherein the layout data is described by a markup language defined by an SVG grammar.

6. The digital camera according to claim 1, further comprising a storage device which stores the layout data selected on said selection screen and the image data selected by said image data selector in association with each other.

7. The digital camera according to claim 1, further comprising an external input unit which inputs the layout data to be stored in said layout data memory from an external device of the digital camera.

8. A method of controlling a digital camera, comprising the steps of:
   selecting designated image data as targets to be laid out from image data stored in an image data memory so as to select one or more images; and
   displaying a selection screen for allowing a user to select one layout data from among plural layout data describing the placement of image data stored in a layout data memory, after the one or more images have been selected in said selecting step, wherein the selection screen contains layout data in which as many designated image data can be allocated as said selecting step has selected and other layout data as choices, and
   wherein the layout data in which as many designated image data can be laid out as said image data selecting step has selected are displayed in the displaying step with a visual effect so as to distinguish the layout data from the other layout data.

9. A storage medium that can be used for supplying a computer program to a computer and that is readable by the computer, wherein the computer program makes a computer perform a method of controlling a digital camera, said method comprising the steps of:
   selecting designated image data as targets to be laid out from image data stored in an image data memory so as to select one or more images; and
   displaying a selection screen for allowing a user to select one piece of layout data from among layout data describing the placement of image data stored in a layout data memory, after the one or more images have been selected in said selecting step, wherein the selection screen contains layout data in which as many designated image data can be laid out as said selecting step has selected and other layout data as choices, and
   wherein the layout data in which as many designated image data can be allocated as said image data selecting step has selected are displayed in the displaying step with a visual effect so as to distinguish the layout data from the other layout data.

10. The storage medium according to claim 9, further comprising the steps of:

laying out with a layout unit image data selected by said image data selecting step in accordance with the layout data selected on the selection screen.

11. The storage medium according to claim 9, wherein the layout data includes superimposition data describing an image to be superimposed on an image, and said displaying step generates display data for displaying the image data corresponding to the images selected by said image data selecting step in accordance with the superimposition, data and displays the display data.

12. The storage medium according to claim 9, further comprising a step of outputting with an output unit the image data to a printer connected thereto.

13. The storage medium according to claim 9, wherein the layout data is described by a markup language defined by an SVG grammar.

14. The storage medium according to claim 9, further comprising a step of storing with a storage device the layout data selected on the selection screen and the image data selected by said image data selecting step in association with each other.

15. The storage medium according to claim 9, further comprising the step of inputting with an external input unit the layout data to be stored in a layout data memory from an external device of the digital camera.

* * * * *